(12) United States Patent
McDonnell

(10) Patent No.: US 12,241,651 B1
(45) Date of Patent: Mar. 4, 2025

(54) GEOGRAPHIC LOCATION BASED CONTROL OF CLEANER DISPENSING SYSTEM

(71) Applicant: Joseph McDonnell, Miramar, FL (US)

(72) Inventor: Joseph McDonnell, Miramar, FL (US)

( * ) Notice: Subject to any disclaimer, the term of this patent is extended or adjusted under 35 U.S.C. 154(b) by 0 days.

(21) Appl. No.: 18/616,871

(22) Filed: Mar. 26, 2024

(51) Int. Cl.
　　*F24F 13/22*　　(2006.01)
　　*F24F 11/30*　　(2018.01)
　　*H04W 4/029*　　(2018.01)
　　*F24F 110/20*　　(2018.01)
　　*F24F 130/10*　　(2018.01)

(52) U.S. Cl.
　　CPC .............. *F24F 13/22* (2013.01); *F24F 11/30* (2018.01); *H04W 4/029* (2018.02); *F24F 2013/221* (2013.01); *F24F 2110/20* (2018.01); *F24F 2130/10* (2018.01); *F24F 2221/22* (2013.01)

(58) Field of Classification Search
　　CPC ........ F24F 13/22; F24F 11/30; F24F 2130/10; F24F 2013/221; F24F 2221/22; H04W 4/029
　　See application file for complete search history.

(56) References Cited

U.S. PATENT DOCUMENTS

| | | | |
|---|---|---|---|
| 8,277,745 | B2 | 10/2012 | Mehus et al. |
| 9,943,778 | B1 | 4/2018 | Gutierrez et al. |
| 10,006,656 | B1 * | 6/2018 | Parks .................... F24F 13/222 |
| 12,083,238 | B1 | 9/2024 | Thompson |
| 2006/0237806 | A1 | 10/2006 | Martin et al. |
| 2007/0224050 | A1 | 9/2007 | Ward |

(Continued)

FOREIGN PATENT DOCUMENTS

WO　　2011/075324 A1　　6/2011
WO　　2012/164289 A1　　12/2012

OTHER PUBLICATIONS

"iFLO—Apple App Store," webpage <https://apps.apple.com/us/app/iflo/id6446085127>, 3 pages, available on Internet as of Sep. 15, 2023, retrieved from Internet on Feb. 29, 2024.

(Continued)

*Primary Examiner* — Larry L Furdge
(74) *Attorney, Agent, or Firm* — Harness, Dickey & Pierce, P.L.C.

(57) ABSTRACT

A cleaner dispensing system includes a dispenser device and a dispenser controller that operates the dispenser device to dispense a cleaning composition according to one or more dispenser parameters. A computing device includes a device controller that determines a geographic location of the cleaner dispensing system and transmits a signal including geographic information associated with the geographic location to the cleaner dispensing system via a network communication link over at least one communication network to cause the dispenser controller to cause the dispenser processor to configure the dispenser controller to operate the dispenser device according to one or more geographic parameter values of the dispenser parameter. The one or more geographic parameter values are associated with the geographic location of the cleaner dispensing system. The geographic location may be determined based on performing geolocating of the cleaner dispensing system.

22 Claims, 11 Drawing Sheets

(56) References Cited

U.S. PATENT DOCUMENTS

| | | | |
|---|---|---|---|
| 2009/0064698 A1 | 3/2009 | Spanger | |
| 2010/0050756 A1* | 3/2010 | Stewart | F24F 13/22 |
| | | | 73/114.55 |
| 2010/0147876 A1 | 6/2010 | Mehus et al. | |
| 2024/0033790 A1* | 2/2024 | Thornton | B08B 17/02 |

OTHER PUBLICATIONS

"iFLO® Smart Automated AC Drain Line Cleaner," webpage <https://iflo.com>, 6 pages, available on Internet as of Aug. 17, 2023, retrieved from Internet on Feb. 29, 2024.

"iFLO Smart Automated AC Drain Line Cleaning System, Includes 36oz Cleaner Cartridge," webpage <https://iflo.com/products/iflo™-device-starter-kit>, 9 pages, available on Internet as of Dec. 7, 2023, retrieved from Internet on Mar. 20, 2024.

"FAQ—iFLO," webpage <https://iflo.com/pages/faq>, 22 pages, available on Internet as of Dec. 19, 2023, retrieved from Internet on Feb. 29, 2024.

Screen captures of animated video entitled "iFLO—Closed Drain Line Installation Video," 10 pages, retrieved from Internet: <https://cdn.shopify.com/videos/c/o/v/5d1d5d15ffe447cbb31718f246086bdb.mp4>, available on Internet as of Dec. 19, 2023, retrieved from Internet on Feb. 29, 2024.

Screen captures of animated video entitled "iFLO—Open Drain Line Installation Video," 6 pages, retrieved from Internet: <https://cdn.shopify.com/videos/c/o/v/ff6be7a49c6e4943ab0e3a069fc5b209.mp4>, available on Internet as of Dec. 19, 2023, retrieved from Internet on Feb. 29, 2024.

\* cited by examiner

GEOGRAPHIC LOCATION BASED CONTROL OF CLEANER DISPENSING SYSTEM

BACKGROUND

Field

The present inventive concepts relate generally to cleaner dispenser systems to dispense cleaning compositions, and more particularly to selectively controlling operation of dispenser devices of cleaner dispensing systems based on geographical locations associated with cleaner dispensing system, which may be determined based on geolocating the cleaner dispenser systems.

Description of Related Art

Air-conditioning systems may include an air handler, also referred to as an air handling unit (AHU) that may circulate and cool air within a space and/or structure. An air handler may move air, via operation of an air mover such as a blower or fan, to flow in thermal communication with a heat exchanger such as an air coil. The air handler may circulate a refrigerant through the heat exchanger to absorb (e.g., remove) heat from the flow of air to cool the air, and the air-conditioning system may circulate the refrigerant through a heat exchanger to discharge the absorbed heat into a heat sink (e.g., the ambient environment).

In some cases, cooling air due to the heat exchanger absorbing heat from the air may result in condensation of moisture (e.g., condensate) out of the cooled air at the heat exchanger. The condensate may be collected and discharged from the air handler via a condensate drain line.

SUMMARY

According to some example embodiments, a system may include a cleaner dispensing system and a computing device. The cleaner dispensing system may include a dispenser device, a dispenser controller, and a dispenser network communication interface. The dispenser device may be configured to operate to dispense a cleaning composition. The dispenser controller may include a dispenser memory storing a program of dispenser instructions, and a dispenser processor configured to execute the program of dispenser instructions to operate the dispenser device to dispense the cleaning composition according to one or more dispenser parameters. The computing device may include a device network communication interface configured to establish a network communication link with the dispenser network communication interface of the cleaner dispensing system over at least one communication network. The computing device may include a device controller, the device controller including a device memory storing a program of device instructions, and a device processor configured to execute the program of device instructions to determine a geographic location of the cleaner dispensing system, and control the device network communication interface to transmit a signal including geographic information associated with the geographic location to the cleaner dispensing system via the network communication link to cause the dispenser processor to configure the dispenser controller to operate the dispenser device according to one or more geographic parameter values of the one or more dispenser parameters, the one or more geographic parameter values associated with the geographic location of the cleaner dispensing system.

The geographic information included in the signal may include at least one of the one or more geographic parameter values, or weather data associated with the geographic location.

The device processor may be configured to execute the program of device instructions to determine the geographic location based on performing geolocating of the cleaner dispensing system.

The device processor may be configured to execute the program of device instructions to determine the one or more geographic parameter values based on determining the geographic location, and transmit the signal based on determining the one or more geographic parameter values, such that the geographic information included in the signal indicates the one or more geographic parameter values.

The device processor may be configured to execute the program of device instructions to determine the geographic information based on controlling the device network communication interface to obtain the weather data based on communication with a remote weather monitoring system via at least one network communication link.

The weather data may include at least one of a temperature value associated with the geographic location, or a humidity value associated with the geographic location.

The weather data may include information indicating variation of at least one of a temperature value or a humidity value associated with the geographic location over a period of time.

The dispenser processor may be configured to execute the program of dispenser instructions to operate the dispenser device according to one or more local parameter values of the one or more dispenser parameters, the one or more local parameter values stored at the cleaner dispensing system. The dispenser processor may be further configured to execute the program of dispenser instructions to determine the one or more geographic parameter values based on processing the geographic information included in the signal, and update the one or more local parameter values stored at the cleaner dispensing system to be the one or more geographic parameter values, to configure the dispenser controller to operate the dispenser device according to the one or more geographic parameter values.

The device processor may be configured to execute the program of device instructions to control the device network communication interface to transmit the signal in response to at least one of an elapse of a signal time interval, or a determination that the one or more geographic parameter values have changed, or a determination that the geographic location has changed, or a determination that the geographical information has changed.

The dispenser processor may be configured to execute the program of dispenser instructions to operate the dispenser device for a dispensing duration in response to an elapse of a dispensing time interval, and the one or more geographic parameter values may include at least one of a value indicating a magnitude of the dispensing time interval, or a value indicating a magnitude of the dispensing duration.

The dispenser processor may be configured to execute the program of dispenser instructions to control the dispenser network communication interface to transmit a moisture warning signal to the computing device via the network communication link in response to detection of a moisture signal from a moisture sensor, the moisture signal indicating a presence of a fluid in at least a portion of an air conditioning system. The device processor may be configured to execute the program of device instructions to control the device network communication interface to transmit an update signal to the cleaner dispensing system via the network communication link based on processing the moisture warning signal to cause the dispenser processor to configure the dispenser controller to operate the dispenser device according to an updated one or more geographic parameter values. The updated one or more geographic parameter values may be different from the one or more geographic parameter values.

The system may further include a plurality of cleaner dispensing systems, the plurality of cleaner dispensing systems including the cleaner dispensing system and at least one separate cleaner dispensing system, the plurality of cleaner dispensing systems communicatively coupled to the computing device via the at least one communication network. The device processor may be configured to execute the program of device instructions to control the device network communication interface to transmit the update signal to the at least one separate cleaner dispensing system via the at least one communication network based on processing the moisture warning signal to cause the at least one separate cleaner dispensing system to be configured to operate a dispenser device of the at least one separate cleaner dispensing system according to the updated one or more geographic parameter values.

According to some example embodiments, a computing device may be configured to establish a network communication link with a cleaner dispensing system, the cleaner dispensing system configured to operate a dispenser device to dispense a cleaning composition according to one or more dispenser parameters. The computing device may include a device network communication interface configured to establish the network communication link with the cleaner dispensing system. The computing device may include a device controller. The device controller may include a device memory storing a program of device instructions, and a device processor configured to execute the program of device instructions to determine a geographic location of the cleaner dispensing system, and control the device network communication interface to transmit a signal including geographic information associated with the geographic location to the cleaner dispensing system via the network communication link to cause the cleaner dispensing system to be configured to operate the dispenser device according to one or more geographic parameter values of the one or more dispenser parameters, the one or more geographic parameter values associated with the geographic location of the cleaner dispensing system.

The geographic information included in the signal may include at least one of the one or more geographic parameter values, or weather data associated with the geographic location.

The device processor may be configured to execute the program of device instructions to determine the geographic location based on performing geolocating of the cleaner dispensing system.

The device processor may be configured to execute the program of device instructions to determine the one or more geographic parameter values based on determining the geographic location, and transmit the signal based on determining the one or more geographic parameter values, such that the geographic information included in the signal indicates the one or more geographic parameter values.

The device processor may be configured to execute the program of device instructions to determine the geographic information based on controlling the device network communication interface to obtain the weather data based on communication with a remote weather monitoring system via at least one network communication link.

The weather data may include at least one of a temperature value associated with the geographic location, or a humidity value associated with the geographic location.

The weather data may include information indicating variation of at least one of a temperature value or a humidity value associated with the geographic location over a period of time.

The device processor may be configured to execute the program of device instructions to control the device network communication interface to transmit the signal in response to at least one of an elapse of a signal time interval, or a determination that the one or more geographic parameter values have changed, or a determination that the geographic location has changed, or a determination that the geographical information has changed.

The cleaner dispensing system may be configured to operate to dispense the cleaning composition for a dispensing duration in response to an elapse of a dispensing time interval, and the one or more geographic parameter values may include at least one of a value indicating a magnitude of the dispensing time interval, or a value indicating a magnitude of the dispensing duration.

The device processor may be configured to execute the program of device instructions to process a moisture warning signal received from the cleaner dispensing system via the network communication link to determine that the moisture warning signal indicates detection, at the cleaner dispensing system, of a moisture signal from a moisture sensor, the moisture signal indicating a presence of a fluid in at least a portion of an air conditioning system, and control the device network communication interface to transmit an update signal to the cleaner dispensing system via the network communication link based on processing the moisture warning signal to cause the cleaner dispensing system to be configured to operate the dispenser device according to an updated one or more geographic parameter values. The updated one or more geographic parameter values may be different from the one or more geographic parameter values.

The computing device may be communicatively coupled to a plurality of cleaner dispensing systems via at least one communication network, the plurality of cleaner dispensing systems including the cleaner dispensing system and at least one separate cleaner dispensing system, the plurality of cleaner dispensing systems communicatively coupled to the computing device via at least one communication network. The device processor may be configured to execute the program of device instructions to control the device network communication interface to transmit the update signal to the at least one separate cleaner dispensing system via the at least one communication network based on processing the moisture warning signal to cause the at least one separate cleaner dispensing system to be configured to operate a dispenser device of the at least one separate cleaner dispensing system according to the updated one or more geographic parameter values.

According to some example embodiments, a method for controlling a cleaner dispensing system, the cleaner dispensing system configured to operate a dispenser device to dispense a cleaning composition according to one or more dispenser parameters, may include: establishing a network communication link with the cleaner dispensing system via a communication network; determining a geographic location of the cleaner dispensing system; and transmitting a signal including geographic information associated with the geographic location to the cleaner dispensing system via the network communication link to cause the cleaner dispensing system to be configured to operate the dispenser device according to one or more geographic parameter values of the one or more dispenser parameters, the one or more geographic parameter values associated with the geographic location of the cleaner dispensing system.

The geographic information included in the signal may include at least one of the one or more geographic parameter values, or weather data associated with the geographic location.

The determining the geographic location may be based on performing geolocating of the cleaner dispensing system.

The method may further include: determining the one or more geographic parameter values based on determining the geographic location, and transmitting the signal based on determining the one or more geographic parameter values, such that the geographic information included in the signal indicates the one or more geographic parameter values.

The geographic information may be determined based on obtaining the weather data, and the weather data may be received based on communication with a remote weather monitoring system via at least one network communication link.

The weather data may include at least one of a temperature value associated with the geographic location, or a humidity value associated with the geographic location.

The weather data may include information indicating variation of at least one of a temperature value or a humidity value associated with the geographic location over a period of time.

The method may further include: transmitting the signal in response to at least one of an elapse of a signal time interval, or a determination that the one or more geographic parameter values have changed, or a determination that the geographic location has changed, or a determination that the geographical information has changed.

The cleaner dispensing system may be configured to operate to dispense the cleaning composition for a dispensing duration in response to an elapse of a dispensing time interval, and the one or more geographic parameter values may include at least one of a value indicating a magnitude of the dispensing time interval, or a value indicating a magnitude of the dispensing duration.

The method may further include: processing a moisture warning signal received from the cleaner dispensing system via the network communication link to determine that the moisture warning signal indicates detection, at the cleaner dispensing system, of a moisture signal from a moisture sensor, the moisture signal indicating a presence of a fluid in at least a portion of an air conditioning system, and transmitting an update signal to the cleaner dispensing system via the network communication link based on processing the moisture warning signal to cause the cleaner dispensing system to be configured to operate the dispenser device according to an updated one or more geographic parameter values. The updated one or more geographic parameter values may be different from the one or more geographic parameter values.

The method may further include: transmitting the update signal to at least one separate cleaner dispensing system via at least one communication network based on processing the moisture warning signal to cause the at least one separate cleaner dispensing system to be configured to operate a dispenser device of the at least one separate cleaner dispensing system according to the updated one or more geographic parameter values.

According to some example embodiments, a cleaner dispensing system may include: a dispenser device configured to operate to dispense a cleaning composition; a dispenser network communication interface configured to establish a network communication link with a remote computing device; and a dispenser controller. The dispenser controller may include a dispenser memory storing a program of dispenser instructions, and a dispenser processor configured to execute the program of dispenser instructions to configure the dispenser controller to operate the dispenser device to dispense the cleaning composition according to one or more geographic parameter values based on processing geographic information included in a signal received from the remote computing device via the network communication link, the one or more geographic parameter values associated with a geographic location of the cleaner dispensing system.

The dispenser processor may be configured to execute the program of device instructions to control the dispenser network communication interface to transmit a geographic position signal that includes information associated with the geographic location of the cleaner dispensing system, such that the signal received from the remote computing device includes geographic information associated with the geographic location based on the remote computing device processing the geographic position signal.

The geographic information included in the signal may include at least one of the one or more geographic parameter values, or weather data associated with the geographic location.

The weather data may include at least one of a temperature value associated with the geographic location, or a humidity value associated with the geographic location.

The weather data may include information indicating variation of at least one of a temperature value or a humidity value associated with the geographic location over a period of time.

The dispenser processor may be configured to execute the program of dispenser instructions to operate the dispenser device according to one or more local parameter values, the one or more local parameter values stored at the cleaner dispensing system. The dispenser processor may be further configured to execute the program of dispenser instructions to determine the one or more geographic parameter values based on processing the geographic information included in the signal, and update the one or more local parameter values stored at the cleaner dispensing system to be the one or more geographic parameter values, to configure the dispenser controller to operate the dispenser device according to the one or more geographic parameter values.

The dispenser processor may be configured to execute the program of dispenser instructions to operate the dispenser device for a dispensing duration in response to an elapse of a dispensing time interval. The one or more geographic parameter values may include at least one of a value indicating a magnitude of the dispensing time interval, or a value indicating a magnitude of the dispensing duration.

The dispenser processor may be configured to execute the program of dispenser instructions to control the dispenser network communication interface to transmit a moisture warning signal to the remote computing device via the network communication link in response to detection of a moisture signal from a moisture sensor, the moisture signal indicating a presence of a fluid in at least a portion of an air conditioning system.

The dispenser processor may be configured to execute the program of dispenser instructions to update the one or more geographic parameter values in response to detection of a moisture signal from a moisture sensor, the moisture signal indicating a presence of a fluid in at least a portion of an air conditioning system.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
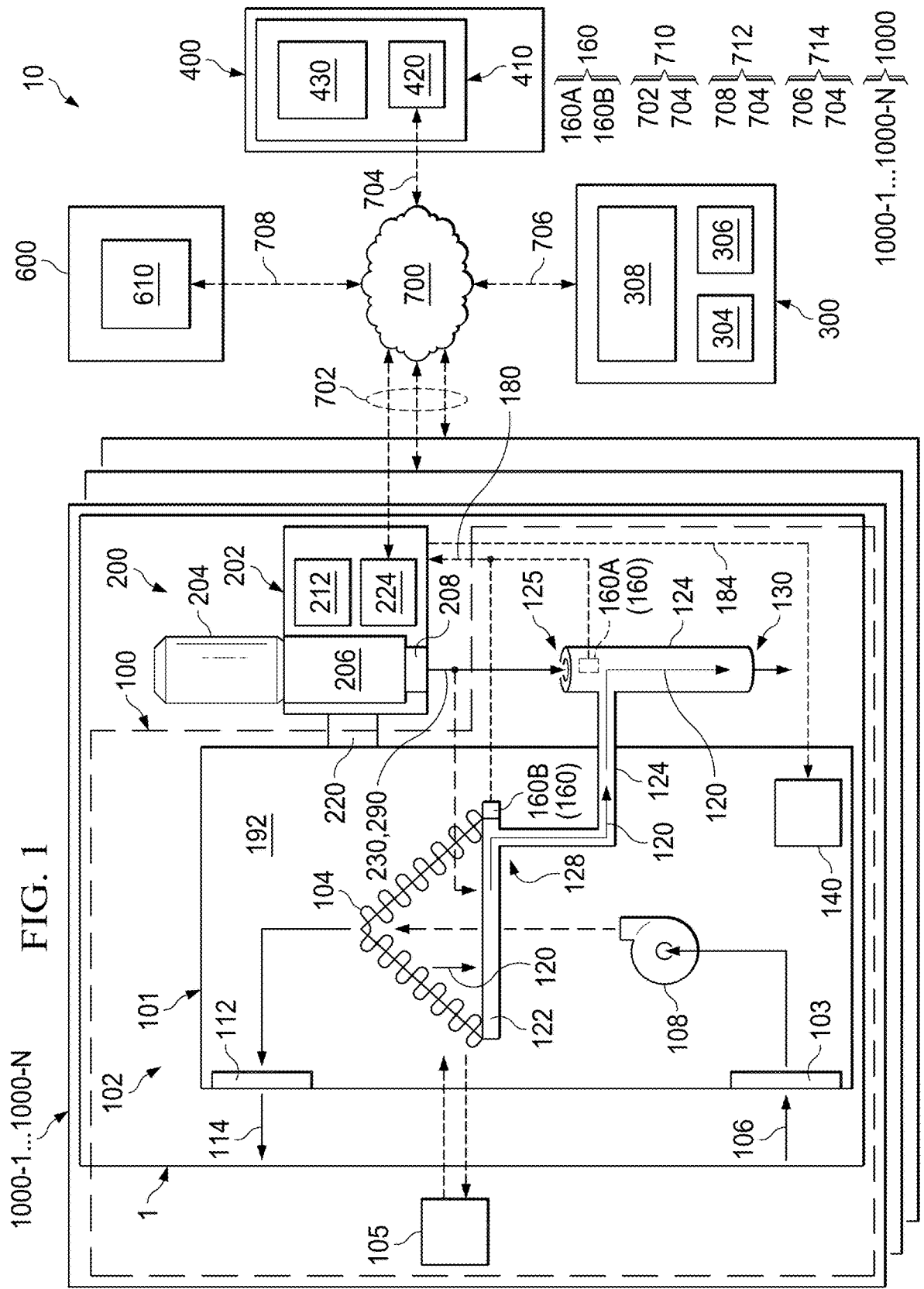
FIG. 1 is a schematic diagram of a system including a cleaner dispensing system, an air conditioning system supported by the cleaner dispensing system, a remote computing device, and a communication network, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "flush," or the like with regard to other elements and/or properties thereof (e.g., structures, surfaces, directions, or the like) may be "perpendicular," "parallel," "flush," or the like or may be "substantially perpendicular," "substantially parallel," "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

Figure 2:
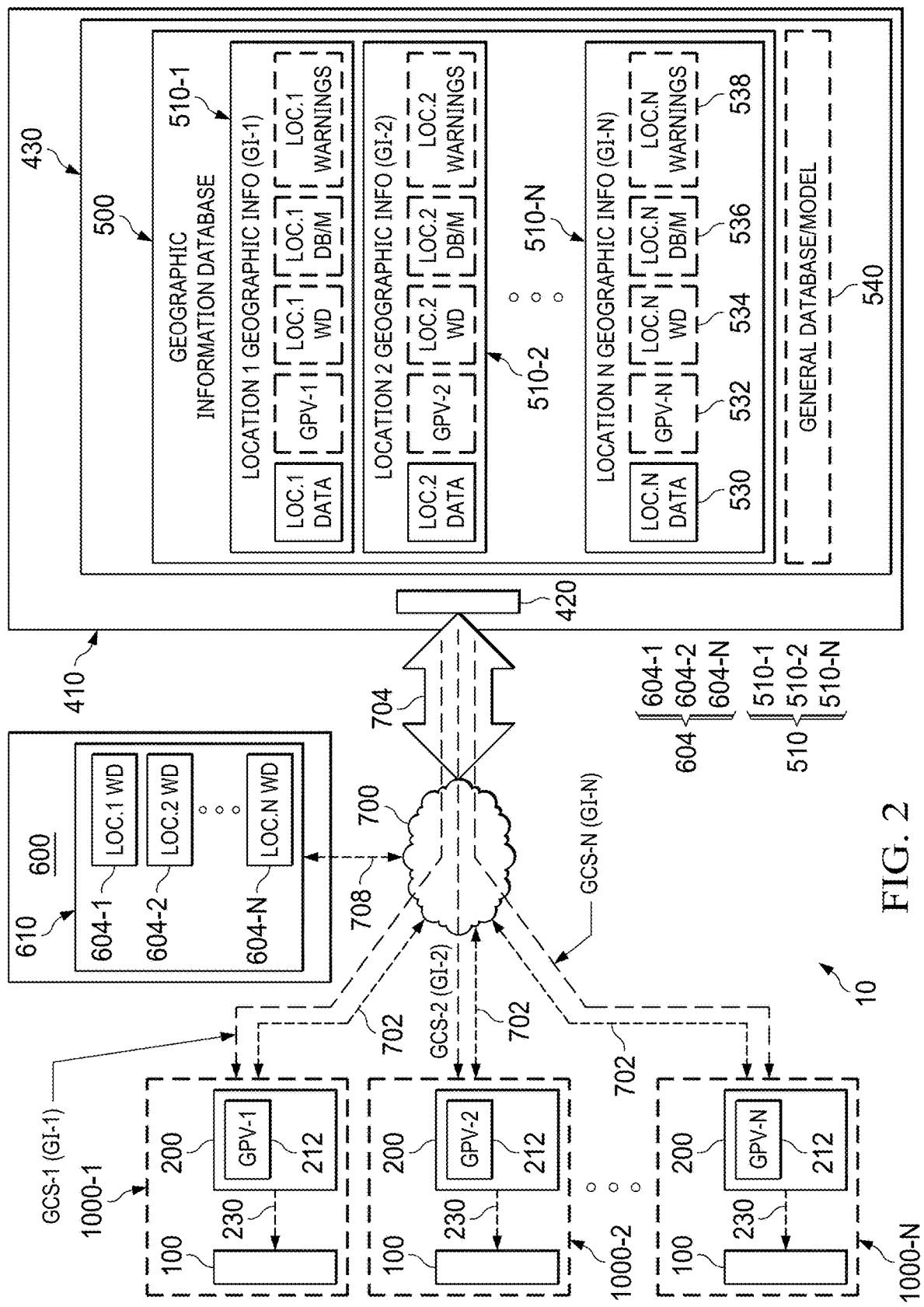
FIG. 2 is a schematic diagram of a system including a plurality of cleaner dispensing systems supporting separate, respective air conditioning systems and located in separate geographic locations and communicatively coupled to a remote computing device through a communication network, according to some example embodiments.

FIG. 1 is a schematic diagram of a system 10 including a cleaner dispensing system 200, an air conditioning system 100 supported by the cleaner dispensing system 200, a remote computing device 410, and a communication network 700, according to some example embodiments. FIG. 2 is a schematic diagram of a system 10 including a plurality of cleaner dispensing systems 200 supporting separate, respective air conditioning systems 100 and located in separate geographic locations 1000-1 to 1000-N and communicatively coupled to a remote computing device 410 through at least one communication network 700, according to some example embodiments.

Referring to FIGS. 1 and 2, air conditioning systems 100 may be located in a plurality of separate geographic locations 1000-1 to 1000-N ("N" being any positive integer). As further shown, in each geographic location 1000-1 to 1000-N, a cleaner dispensing system 200 may be configured to provide ("dispense") a controlled amount of cleaning composition 230 to at least a portion of a given air conditioning system 100 or a structure or conduit associated therewith, in order to reduce, mitigate, or prevent the buildup of biological material and thus to reduce, minimize, or prevent the likelihood of condensate backflow in the air conditioning system 100 or the structure or conduit associated therewith. It will be understood that an air conditioning system 100 to which a given cleaner dispensing system 200 is configured to dispense cleaning composition, for example based on the cleaner dispensing system 200 being coupled with the air conditioning system 100, an outlet 208 of the cleaner dispensing system 200 being in coupled fluid communication with at least a portion of the air conditioning system 100 or a structure or conduit associated therewith, or the like, may be referred to herein as a "local air conditioning system" and/or "corresponding air conditioning system" that is "served," "serviced," and/or "supported" by the given cleaner dispensing system 200, any combination thereof, or the like, and the given cleaner dispensing system 200 may be referred to as "serving," "servicing," and/or "supporting" such an air conditioning system 100.

In further detail, each air conditioning system 100, which may be interchangeably referred to as an air conditioner system, air conditioner, or the like, may be configured to provide cooling of air within an interior of a structure 1 at a geographic location 1000 and may be at least partially located within the structure 1, but example embodiments are not limited thereto. The air conditioning system 100 may be included as a part of a heating, ventilation, and air conditioning (HVAC) system, but example embodiments are not limited thereto, and in some example embodiments the air conditioning system 100 may be separate from any heating system.

The air conditioning system 100 may include an air handler 102 and a condenser assembly 105 that are configured to draw return air 106 from an interior of the structure 1, cool (e.g., absorb heat from) the drawn return air 106 into conditioned air 114, and discharge (e.g., supply) the conditioned air 114 back into the interior of the structure 1. The air handler 102 may include, within a housing 101 that may at least partially comprise metal (e.g., steel) and at least define an interior 192 space, an air intake 103, an air mover 108 (e.g., fan, blower, etc.), a heat exchanger 104, a drip pan 122, a condensate drain line 124 (also referred to herein as a condensate drain conduit, condensate drain pipe, etc.), a controller 140, and an air outlet 112. The condenser assembly 105 may include a compressor, a second heat exchanger (e.g., condenser coil), and an air mover (e.g., fan, blower, etc.).

It will be understood that example embodiments of an air conditioning system, air handler, condenser assembly, or the like may have different arrangements of devices therein and may omit or add to the aforementioned elements of the air conditioning system 100 as shown in FIG. 1. It will be understood, for example, that elements shown as being included in the air handler 102 may in some example embodiments be located in the condenser assembly 105 (e.g., the controller 140 may be located in the condenser assembly 105 instead of the air handler 102). As shown, the condenser assembly 105 may be located external to the structure 1 while the air handler 102 is located internal to the structure 1, but example embodiments are not limited thereto.

In some example embodiments, the air conditioning system 100 may draw return air 106 into the air handler 102 via the air intake 103. The air mover 108 (e.g., blower) may induce the flow of air into, through, and out of, the air handler 102. The air mover 108 may move (e.g., blow) the return air 106 to the heat exchanger 104. The return air 106 may flow in thermal communication with (e.g., in contact with outer surfaces of) one or more coils of the heat exchanger 104 so that heat is removed from the return air 106 to cool the return air 106 into conditioned air 114. The air handler 102 may move the conditioned air 114 out of the air handler 102 and back into an interior space of the structure 1 via the air outlet 112.

The air conditioning system 100 may circulate a working fluid (e.g., a refrigerant, including known R22 refrigerant, R410A refrigerant, or any known refrigerant) between the heat exchanger 104 and a heat exchanger of the condenser assembly 105 to remove heat from the return air 106 based on the return air 106 flowing in thermal communication (e.g., through, across, over, and/or in contact with one or more outer surfaces of) the heat exchanger 104. The heat exchanger 104 may include any known heat exchanger used for an air conditioning system, for example an evaporator coil exchanger that includes one or more coils of one or more tubes through which the working fluid flows (e.g., as a cooled liquid). The heat exchanger 104 may cause heat to be transferred from the return air 106 and into the working fluid when the return air 106 is caused to flow across (e.g., in contact with, in thermal communication with, etc.) the one or more coils (e.g., one or more outer surfaces thereof), thereby resulting in the working fluid becoming heated (e.g., heated into a low-pressure gas). The heated working fluid may be drawn, via a fluid line (e.g., fluid conduit, pipe, etc.) into the condenser assembly 105.

As further shown, the air conditioning system 100 may include a controller 140 that is configured to control elements of the air conditioning system 100, including for example controlling operation of the air handler 102, condenser assembly 105, or any part thereof. As described further below, the controller 140 may be implemented by a computing device, including a memory storing a program of instructions and a processor configured to execute the program of instructions. While the controller 140 is shown as being included within the housing 101 of the air handler 102, it will be understood that the controller 140 may be located external to the housing 101 and, in some example embodiments, may be located within the condenser assembly 105 or may be attached to an exterior of the air handler 102 for ease of manual access.

Still referring to FIG. 1, when heat is removed from the return air 106 based on the return air 106 passing in thermal communication with the heat exchanger 104, water may condense out of the cooled conditioned air 114 as condensate 120 at the heat exchanger 104, for example on one or more outer surfaces thereof. The air handler 102 may include a drip pan 122 located beneath the heat exchanger 104, and the condensate 120 may fall under gravity from the one or more outer surfaces of the heat exchanger 104 to collect in the drip pan 122. The air handler 102 may further include a condensate drain line 124 having an inlet opening 128 coupled to the drip pan 122 (e.g., a bottom surface where the drip pan 122 has an inclined surface that is angled downwards towards the inlet opening 128 of the condensate drain line 124) and an outlet opening 130 that is external to the structure 1 and open to the ambient environment, as shown. Condensate 120 collected in the drip pan 122 may pass under gravity to the inlet opening 128 of the condensate drain line 124, and the condensate drain line 124 may direct the condensate 120 to flow out of the air handler 102 and out of the structure 1 to the ambient environment via the outlet opening 130 of the condensate drain line 124.

As shown in FIG. 1, the air conditioning system 100 may include one or more moisture sensors 160 that are configured to cause a signal (e.g., moisture signal 180 as described herein) to be transmitted in response to a presence of a fluid (e.g., condensate 120) at the moisture sensor 160, thereby potentially indicating condensate backup at the location of the moisture sensor 160.

A moisture sensor 160 may be any known moisture sensor. For example, a moisture sensor 160 may be a float switch that is configured to be actuated based on presence (e.g., due to backflow and/or overflow) of a fluid at the moisture sensor 160 (e.g., an accumulation of condensate 120 in the condensate drain line 124 to a certain level at which a moisture sensor 160 is located and/or an accumulation of condensate 120 to a certain level at which a moisture sensor 160 is located in the drip pan 122). The moisture sensor 160 may be any known float switch and may be configured to be closed or opened (e.g., actuated) based on a presence of fluid (e.g., accumulation of condensate 120) to at least a threshold level at which the moisture sensor 160 is located (e.g., such that the fluid is at the location of the moisture sensor 160). In another example, the moisture sensor 160 may be a device including electrodes and a gap space therebetween, where the presence of a fluid (e.g., moisture, condensate 120, etc.) at the moisture sensor 160 may result in the fluid occupying the gap space to close an electrical circuit between the electrodes.

The moisture sensor 160 may be communicatively (e.g., electrically) coupled to the controller 140 (e.g., via one or more electrical wired connections and/or a wireless connection). The moisture sensor 160 may be configured to transmit a signal (referred to herein as a moisture signal 180) to the controller 140 (e.g., open or close an electrical circuit and thus cause the initiation or inhibition of electrical current through the circuit, such initiated or inhibited electrical current comprising the moisture signal 180) based on a fluid (e.g., condensate, condensate backflow, etc.) being present at the moisture sensor 160, for example based on the accumulation of condensate in the condensate drain line 124, the drip pan 122, or the like. The controller 140 may be configured to detect the moisture signal 180 and, in response, initiate a shutdown of at least a portion of the air conditioning system (e.g., shut down the air handler 102, the air mover 108, etc.), thereby reducing, minimizing, or preventing damage being caused in the structure and/or air conditioning system 100 due to the condensate 120 accumulation.

As shown in FIG. 1, an air conditioning system 100 may include one or more moisture sensors 160 at different locations at, on, and/or in the air conditioning system 100 and/or any structure or conduit associated therewith. For example, in FIG. 1, the air conditioning system 100 includes a moisture sensor 160A that is located in the condensate drain line 124 (e.g., at an opening 125 into the condensate drain line 124 as shown) and/or a moisture sensor 160B that is located in the drip pan 122. In some example embodiments, one or both of the moisture sensors 160A in the condensate drain line 124 and/or the moisture sensor 160B in the drip pan 122 may be omitted from the air conditioning system 100 and/or any structure or conduit associated therewith. It will be understood that an air conditioning system 100 may include any quantity of moisture sensors 160 at any location that is at, on, and/or in the air conditioning system 100 and/or any structure or conduit associated therewith.

In some example embodiments, various substances may accumulate in one or more portions of the air conditioning system 100 (e.g., the drip pan 122, the condensate drain line 124, etc.), which may clog one or more portions of the condensate removal elements (e.g., drip pan 122, condensate drain line 124, etc.) of the air handler 102. Such substances may include, for example, mold, algae, mildew, bacteria, and/or fungi. Such substance accumulation may obstruct the flow of condensate 120 to the outlet opening 130 of the drain line 124 and thus cause accumulation of condensate 120 in the drain line 124 (e.g., condensate backflow), potentially resulting in condensate accumulation (backflow) from the drain line 124 into the drip pan 122. Such condensate accumulation may cause damage to the air handler 102 and/or to a structure in which the air handler 102 is included, including water damage. In addition, such substances may accumulate on one or more outer surfaces of one or more elements of the heat exchanger 104 (e.g., an evaporator coil through which the liquid working fluid may circulate to remove heat from the return air 106) due to condensation of condensate 120 on the one or more outer surfaces. Such accumulation of substances on the outer surface(s) of the heat exchanger 104 elements may cause reduced heat exchange (e.g., heat transfer) performance of the heat exchanger 104 in removing heat from the return air 106.

Referring to FIG. 1, in some example embodiments a cleaner dispensing system 200 at the geographic location 1000 of an air conditioning system 100 may be configured to dispense a cleaning composition 230 into at least a portion of the air conditioning system 100 and/or one or more structures or conduits associated therewith to clean, break down, remove, etc. various substances (e.g., mold, algae, mildew, bacteria, and/or fungi) that may be accumulated in the portion of the air conditioning system 100 and/or one or more structures or conduits associated therewith. As shown, a cleaner dispensing system 200 may be coupled to at least a portion of the air conditioning system 100, including for example an outer surface of a housing 101 of the air handler 102 via a connector structure 220 (e.g., including an adhesive, magnet, or the like). The cleaner dispensing system 200 may be configured to provide cleaning composition to one or more locations associated with the air conditioning system 100 via an outlet 208 of the cleaner dispensing system 200, including for example providing cleaning composition to the interior 192 of the air handler 102, the drip pan 122, the heat exchanger 104, the condensate drain line 124, an opening 125 of the condensate drain line 124, or the like. Such a cleaner dispensing system 200 may be understood to be "serving," "servicing," and/or "supporting" the air conditioning system 100.

As shown, the cleaner dispensing system 200 may include a dispenser device 206 that is configured to operate to dispense (e.g., controllably dispense) a cleaning composition 230 (e.g., via an outlet 208, also referred to herein as a dispensing outlet, of the cleaner dispensing system 200). A conduit 290 may extend from the cleaner dispensing system 200 (e.g., the outlet 208) to a location at, in, and/or associated with the air conditioning system 100, such as the drip pan 122, a location within the interior 192 of the air handler 102, an opening 125 into the condensate drain line 124, the condensate drain line 124 through an opening in the sidewall or thickness of the condensate drain line 124, any combination thereof, or the like. As shown in FIG. 1, for example, the conduit 290 to direct cleaning composition 230 from the outlet 208 may extend to the opening 125 of the condensate drain line 124 and/or may extend into the interior 192 of the air handler 102, for example to direct the cleaning composition 230 to the drip pan 122, an outer surface of the heat exchanger 104, or any combination thereof.

Accordingly, cleaning composition 230 that is dispensed by the cleaner dispensing system 200 may be directed by the conduit 290 to one or more portions of the air conditioning system 100 and/or any structure or conduit associated therewith to clean, break down, remove, etc. various substances (e.g., mold, algae, mildew, bacteria, and/or fungi) that may be accumulated in the one or more portions of the air conditioning system 100, thereby reducing the risk of backflow of condensate in the air conditioning system 100 (e.g., condensate drain line 124, drip pan 122, etc.) which might cause overflow of condensate 120 in the air conditioning system 100 and/or structure 1, thereby improving operational performance of the air conditioning system 100 and reducing the risk for damage to the air conditioning system 100 and/or structure 1 due to condensate backflow in the condensate drain line 124. Additionally or alternatively, the cleaning composition 230 may be directed by the conduit 290 into the interior 192 of the air handler 102 to be provided on one or more outer surfaces of the heat exchanger 104, to thereby clean, break down, remove, etc. various substances (e.g., mold, algae, mildew, bacteria, and/or fungi) that may be accumulated on the outer surfaces of the heat exchanger 104 and thus improve the heat transfer performance of the heat exchanger 104 and thus of the air conditioning system 100. As described herein, "dispensing" cleaning composition may include supplying the cleaning composition via operating a pump (e.g., "pumping"), actuating one or more actuators and/or valves, or any combination thereof.

As described herein, a cleaning composition 230 may be any known chemical composition (e.g., solution, liquid, fluid, etc.) that may be configured to clean (e.g., remove) potential buildup substances (e.g., mold, algae, mildew, bacteria, and/or fungi) from a surface of the air conditioning system 100, including for example an outer surface of the heat exchanger 104 of the air handler 102, a surface of the drip pan 122, a surface of the condensate drain line 124, any combination thereof, or the like. In some example embodiments, the cleaning composition 230 may be a chemical substance that is or includes a chelating agent (e.g., chelant) including, for example, sodium hexametaphosphate, that is configured to remove potential buildup substances from one or more portions of the air conditioning system based on chelation upon contact with the potential buildup substances. For example, the cleaning composition 230 may be a liquid solution that includes 3%-7% sodium hexametaphosphate, by weight of the total weight of the cleaning composition 230. Based on the cleaner dispensing system 200 being configured to dispense cleaning composition 230 to one or more portions of the air conditioning system 100, the cleaner dispensing system 200 may be configured to enable removal of potential buildup substances (e.g., mold, algae, mildew, bacteria, and/or fungi) from one or more portions of the air conditioning system 100 based on dispensing the cleaning composition 230 thereto, which may thereby reduce or prevent the occurrence of backflow and/or overflow of the condensate drain line 124 and/or drip pan 122 due to clogging, reduce or prevent the reduction in heat transfer performance of the heat exchanger 104 due to the potential buildup substances, any combination thereof, or the like.

In some example embodiments, the cleaner dispensing system 200 may be configured to dispense (e.g., pump, spray, etc.) the cleaning composition 230 into at least a portion of the air conditioning system 100 without human intervention (e.g., automatically), for example to dispense discrete amounts (e.g., a particular amount, which may be a particular volume and/or particular mass) of the cleaning composition at a particular (or, alternatively, predetermined) fixed time interval, thereby reducing or preventing accumulation of the various substances in one or more portions of the air conditioning system 100 while reducing or minimizing human intervention and/or effort expended to implement the dispensing. Because the cleaner dispensing system 200 is configured to dispense the cleaning composition (e.g., repeatedly at a fixed time interval, also referred to herein as a dispensing time interval) without human intervention, the accumulation of potential substances (e.g., mold, algae, mildew, bacteria, and/or fungi) in one or more portions of the air conditioning system 100 (e.g., in the condensate drain line 124, on one or more outer surfaces of the heat exchanger 104, etc.) may be reduced, removed, or prevented. Such reduction, removal, or prevention of substance accumulation in the air conditioning system 100 may thereby improve overall efficiency and/or performance of the air conditioning system 100, at least with regard to cooling the return air 106, and may further reduce or prevent the likelihood of condensate 120 backup and/or overflow which might otherwise result in shutdown of at least the air handler 102 and/or air conditioning system 100, flooding damage to the air handler 102 and/or structure in which the air handler 102 is located, or the like. Because human intervention is not required to implement the dispensing (of the cleaning composition, particularly dispensing of the cleaning composition repeatedly at a fixed time interval, the likelihood of such accumulation resulting in significant reduction in air conditioning system performance and/or efficiency, and/or resulting in damage to at least one of the air conditioning system 100 or the structure 1, due to a missed or forgotten manual dispensing of cleaning composition by a human operator is reduced or prevented, thereby improving operational performance and/or efficiency of the air conditioning system 100 and reducing workload by a human operator.

As shown in FIG. 1, a cleaner dispensing system 200 may include a dispenser device 206 that is configured to operate (e.g., actuate as a valve, operate as a pump, etc.) to dispense an amount of a cleaning composition 230 (e.g., through the outlet 208) and a dispenser controller 212 that is configured to operate the dispenser device 206 to dispense the amount of the cleaning composition 230. The cleaning dispensing system 200 may include a cleaning composition supply source 204 that may be in fluid communication with an inlet of the dispenser device 206, such that the dispenser device 206 may be configured to dispense cleaning composition 230 received from the cleaning composition supply source 204 to the outlet 208 of the cleaner dispensing system 200 and thus to a location external to the cleaner dispensing system 200 via the outlet 208. In some example embodiments, the cleaning composition supply source 204 may be a detachable cartridge that is separate from a base 202 (also referred to herein interchangeably as a base device, a base structure, a base apparatus, a cleaner dispensing system base, or the like) that includes the dispenser device 206 and the dispenser controller 212, where the cartridge may be detachably coupled to the base 202 to reversibly establish flow communication between the cartridge interior (e.g., cartridge reservoir) and the inlet of the dispenser device 206. However, it will be understood that example embodiments are not limited thereto. For example, in some example embodiments the cleaning composition supply source 204 may be a fixed reservoir that is integral to (e.g., not removable from) the base 202 of the cleaner dispensing system 200. In another example, the cleaning composition supply source 204 may be a cleaning composition port that is configured to receive the cleaning composition 230 from an external supply source via a conduit coupled to the cleaning composition port.

The dispenser device 206 may include any device configured to be controlled to control a flow of an amount of cleaning composition. In some example embodiments, the dispenser device 206 may include at least one valve that is configured to be actuated to be selectively opened (e.g., to selectively open a flow path through the at least one valve) based on a control signal generated by the dispenser controller 212 to establish a flow path through the at least one valve and through which the cleaning composition 230 may flow (e.g., a flow path from the cleaning composition supply source 204 to the outlet 208). For example, a valve of the dispenser device 206 as described herein may include an electromechanically operated valve, including a solenoid valve, which may be selectively actuated based on a control signal from the dispenser controller 212. In some example embodiments, the dispenser device 206 may include any known pump, including any known positive displacement pump, rotary pump, worm pump, gear pump, or the like that is configured to operate for a particular period of time to move the amount of the cleaning composition 230 from an inlet of the dispenser device 206 which is in fluid communication with the cleaning composition supply source 204 to an outlet of the dispenser device 206 which is in fluid communication with the outlet 208, based on a control signal generated by the dispenser controller 212.

The dispenser controller 212 may, in some example embodiments, include a memory (e.g., a solid state drive, or SSD), also referred to herein as a dispenser memory, storing a program of instructions (referred to herein as a program of dispenser instructions) and a processor (e.g., a central processing unit, or CPU), also referred to herein as a dispenser processor, configured to execute the program of instructions to implement the functionality of the dispenser controller 212 as described herein. Accordingly, where a dispenser controller 212 and/or a cleaner dispensing system 200 is described herein to perform or be configured to perform any functionality, function, operation, method, or the like, it will be understood that the dispenser controller 212 may include a dispenser memory (such as memory 2024 shown in FIG. 10) storing a program of dispenser instructions and a dispenser processor (such as processor 2022 shown in FIG. 10) configured to execute the program of dispenser instructions to perform (or to configure the dispenser controller 212 and/or the cleaner dispensing system 200 to perform) the functionality, function, operation, method, or the like of the dispenser controller 212 and/or of the cleaner dispensing system 200.

In some example embodiments, the dispenser controller 212 may be configured (e.g., based on the dispenser processor executing the program of dispenser instructions) to operate the dispenser device 206 to dispense the cleaning composition according to one or more dispenser parameters, also referred to herein interchangeably as one or more dispenser parameter values. It will be understood that the one or more dispenser parameters may include multiple parameters, multiple parameter values, or the like. The one or more dispenser parameters may include one or more parameter values that may be used by the dispenser controller 212 to adjustably control the operation of the dispenser device 206. Such one or more parameter values may be stored locally at the cleaner dispensing system 200, for example at a memory of the dispenser controller 212. Such one or more parameter values of the one or more dispenser parameters that are stored locally at the cleaning dispensing system 200 and accessed by the dispenser controller 212 to operate the dispenser device according may be referred to as one or more local parameter values.

In some example embodiments, the operation of the dispenser device 206 by the dispenser controller 212 may include operating the dispenser device 206 to dispense the cleaning composition 230 (e.g., move the cleaning composition 230 from an inlet of the dispenser device 206 that is in fluid communication with the cleaning composition supply source 204 to an outlet of the dispenser device 206 that is in fluid communication with the outlet 208 of the cleaner dispensing system 200) for a particular duration of time. Such a particular duration of time may be, for example 3 seconds, 5 seconds, or the like, but example embodiments are not limited thereto. Such a particular duration of time may be referred to herein as a "dispensing duration," or "DD." In some example embodiments, the one or more dispenser parameters may include a parameter value indicating a magnitude of the dispensing duration (DD), such that the dispenser controller 212 may cause the dispenser device 206 to operate for a dispensing duration corresponding to (e.g., matching) the magnitude of the parameter value indicating the magnitude of the dispensing duration.

In some example embodiments, the operation of the dispenser device 206 by the dispenser controller 212 may include operating the dispenser device 206 of the dispensing duration in response to an elapse of a particular time interval since a previous operation of the dispenser device 206 (e.g., since the beginning or end of the previous operation). Such a time interval may be, for example, 7 days, 168 hours, or the like, but example embodiments are not limited thereto. Such a particular time interval may be referred to herein as a "dispensing time interval," or "TTV." In some example embodiments, the one or more dispenser parameters may include a parameter value indicating a magnitude of the dispensing time interval, such that the dispenser controller 212 may be configured to cause the dispenser device 206 to operate in response to an elapse of a dispensing time interval corresponding to (e.g., matching) the magnitude of the parameter value indicating the magnitude of the dispensing time interval since a previous operation of the dispenser device 206. For example, in some example embodiments, the cleaning composition supply source 204 may be configured to hold a total volume of 36 oz of cleaning composition 230, so that, in some example embodiments where the one or more dispenser parameters includes a dispensing time interval that is 7 days and a dispensing duration that corresponds to causing the dispenser device 206 to dispense 3 oz of cleaning composition, the cleaner dispensing system 200 may be configured to operate the dispenser device 206 thereof according to one or more parameter values of the one or more dispenser parameters to dispense 3 oz of cleaning composition 230 through the outlet 208 every 7 days for a period of 12 weeks (84 days).

Still referring to FIG. 1, a cleaner dispensing system 200 may include a network communication interface, which is referred to herein as a dispenser network communication interface 224. The dispenser network communication interface 224 may be any known network communication transceiver, including a wireless network communication transceiver such as a WI-FI transceiver, 5G cellular network communication transceiver, an ad hoc network communication transceiver such as a Bluetooth® transceiver, any combination thereof, or the like. The dispenser network communication interface 224 may be configured to establish a network communication link with one or more remote devices, for example via (e.g., over) at least one communication network 700 (e.g., a wireless communication network (e.g., WI-FI), an ad hoc communication network, etc.). A network communication link between a cleaner dispensing system 200 and a communication network 700 may be referred to as a dispenser network communication link 702.

Still referring to FIG. 1, in some example embodiments, the cleaning dispensing system 200 may be communicatively and/or electrically coupled with one or more moisture sensors 160 of the air conditioning system 100. For example, a moisture sensor 160 (e.g., float switch) of the air conditioning system 100 may be electrically coupled with the cleaner dispensing system 200 (e.g., the dispenser controller 212) via one or more electrical wired connections and/or a wireless connection, and the cleaner dispensing system 200 may be electrically coupled with the controller 140 of the air conditioning system 100 via one or more separate electrical wired connections and/or a wireless connection, such that electrical signals (referred to herein as moisture signals 180) transmitted from the moisture sensor 160 to the controller 140 of the air conditioning system 100 may pass through the cleaner dispensing system 200 and may be detected by the dispenser controller 212. Accordingly, the cleaner dispensing system 200 (e.g., the dispenser controller 212) may be configured to detect, and respond to a moisture signal 180 that is generated by a moisture sensor 160 and which indicates a presence of a fluid (e.g., condensate) at at least a portion of the air conditioning system 100 and/or any structure or conduit associate therewith.

Still referring to FIG. 1 and further referring to FIG. 2, the system 10 may include cleaner dispensing systems 200 that are located at separate, respective geographic locations 1000-1 to 1000-N. Each of the dispenser network communication interfaces 224 of the respective cleaner dispensing systems 200 may be communicatively coupled to one or more remote devices via at least one communication network 700 (e.g., a wired and/or wireless communication network) via respective network communication links 702.

While FIGS. 1 and 2 illustrate multiple geographic locations 1000-1 to 1000-N that each include a single cleaner dispensing system 200 and a single corresponding local air conditioning system 100 supported by the single cleaner dispensing system 200, it will be understood that example embodiments are not limited thereto. In some example embodiments, a geographic location 1000 may be a geographic region in which multiple structures, air conditioning systems 100, and/or cleaner dispensing systems 200 supporting same may be located. A geographic location 1000 may include, for example, a neighborhood, town, city, county, state, nation, geographic region, or the like in which multiple cleaner dispensing systems 200 and corresponding air conditioning systems 100 supported thereby may be located. For example, in some example embodiments, multiple cleaner dispensing systems 200 and corresponding air conditioning systems 100 supported thereby may be located in a common ("same") geographic location 1000. Accordingly, the "geographic location" may be interchangeably referred to as a "geographic region." It will also be understood that any description herein with regard to example embodiments of a system 10 that includes cleaner dispensing systems 200 that are located at separate, respective geographic locations 1000 may apply equally to example embodiments of a system 10 that includes at least two cleaner dispensing systems 200 that are located at a same geographic location 1000.

Still referring to FIGS. 1 and 2, the system 10 may include, in addition to one or more cleaner dispensing systems 200 at one or more geographic locations 1000-1 to 1000-N, a remote computing device 410 that may support and/or implement a remote control system 400. The remote computing device 410, also referred to herein interchangeably as a "computing device," may be communicatively coupled to the communication network 700 via a network communication link 704, referred to herein as a device network communication link, and thus may be communicatively coupled with one or more, or all, of the cleaner dispensing systems 200 via respective network communication links 710 that may include at least one network communication link 704 between the remote computing device 410 and the communication network 700 and the respective dispenser network communication links 702 between the communication network 700 and the respective cleaner dispensing systems 200. Accordingly, the remote computing device 410 may be understood to be configured to establish a network communication link 710 with the respective dispenser network communication interfaces 224 of the respective cleaner dispensing systems 200 over at least one communication network 700.

As shown in FIGS. 1 and 2, the remote computing device 410 may include a network communication interface, referred to herein as a device network communication interface 420, and a device controller 430. The device network communication interface 420 may be any known network communication transceiver, including a wireless network communication transceiver such as a WI-FI transceiver, 5G cellular network communication transceiver, an ad hoc network communication transceiver such as a Bluetooth® transceiver, any combination thereof, or the like. The device network communication interface 420 may be configured to establish a network communication link with one or more remote devices, for example via at least one communication network 700 (e.g., a wireless communication network (e.g., WI-FI), an ad hoc communication network, etc.). The device controller 430 may, in some example embodiments, include a memory (e.g., a solid state drive, or SSD), also referred to herein as a device memory, storing a program of instructions (referred to herein as a program of device instructions) and a processor (e.g., a central processing unit, or CPU), also referred to herein as a device processor, configured to execute the program of instructions to implement the functionality of the device controller 430 and/or of the remote computing device 410 as described herein. Accordingly, where a device controller 430 and/or a remote computing device 410 is described herein to perform or be configured to perform any functionality, function, operation, method, or the like, it will be understood that the device controller 430 may include a device memory (such as memory 2024 shown in FIG. 10) storing a program of device instructions and a device processor (such as processor 2022 shown in FIG. 10) configured to execute the program of device instructions to perform (or to configure the device controller 430 and/or the remote computing device 410 to perform) the functionality, function, operation, method, or the like of the device controller 430 and/or of the remote computing device 410.

Referring to FIG. 2, in some example embodiments, the remote computing device 410 (e.g., the device controller 430, a device processor executing a program of device instructions stored at a device memory, etc.) is configured to determine a geographic location of a given cleaner dispensing system 200 and control the device network communication interface 420 to transmit a signal that includes geographic information associated with the geographic location of the given cleaner dispensing system 200, also referred to herein as a geographic control signal (also referred to herein as a "GCS"), to a given cleaner dispensing system 200 via a respective network communication link 710 therewith to cause the given cleaner dispensing system 200 (e.g., at the dispenser controller 212 thereof) to be configured to operate the respective dispenser device 206 thereof according to one or more geographic parameter values (also referred to herein as one or more "GPV"), for example to cause the dispenser processor of the dispenser controller 212 to configure the dispenser controller 212 to operate the dispenser device 206 of the given cleaner dispensing system 200 according to one or more geographic parameter values. The one or more geographic parameter values may be one or more parameter values of the one or more dispenser parameters (e.g., one or more dispenser parameter values) that are specific to (e.g., associated with) the geographic location 1000 of the given cleaner dispensing system 200 (e.g., the geographic location at or within which the cleaner dispensing system 200 is physically located), where such geographic location 1000 may also be understood to be the geographic location of the corresponding air conditioning system 100 that is supported by the cleaner dispensing system 200. The geographic information included in the geographic control signal and associated with a geographic location may include at least one of the one or more geographic parameter values, weather data associated with the geographic location, any combination thereof, or the like.

A geographic parameter value associated with a given geographic location may be specific to (e.g., determined based on) weather data associated with the geographic location. Such "weather data" associated with a geographic location may include information indicating local meteorological and/or climatological conditions associated with the geographic location. Geographic parameter values associated with different geographic locations 1000 may be customized (e.g., adjusted, updated, etc.) to configure the operation of the cleaner dispensing systems 200 at different geographic locations to operate differently according to respective local conditions (e.g., "weather") at the different geographic locations. Accordingly, geographic parameter values associated with different geographic locations 1000 may be different from each other, and thus cleaner dispensing systems 200 associated with (e.g., located at) different geographic locations 1000 and configured to operate respective dispenser devices 206 thereof according to respective one or more geographic parameter values may operate the respective dispenser devices 206 differently (e.g., according to different dispensing durations, different dispensing time intervals, etc.).

For example, a cleaner dispensing system 200 operating a dispenser device 206 thereof during a certain time period (e.g., a certain 7-day period or calendar week, a certain 30-day period or calendar month, etc.) according to one or more geographic parameter values that are associated with a geographic location having relatively high average humidity and temperature at the certain time period may operate the dispenser device 206 thereof more frequently (e.g., according to a smaller dispensing time interval) and/or to dispense a greater amount of cleaning composition 230 with each dispensing operation (e.g., according to a larger dispensing duration) than another cleaner dispensing system 200 operating a respective dispenser device 206 thereof during the certain time period according to one or more geographic parameter values that are associated with a separate geographic location having relatively low average humidity and temperature during the same time period.

Additionally, the one or more geographic parameter values associated with a given geographic location may vary over time (e.g., due to meteorological seasonal variation), thereby conserving cleaning composition dispensation for periods where local weather conditions increase the likelihood of biological substance buildup and thus increase the risk of condensate accumulation in air conditioning systems 100 at the geographic location 1000 (e.g., periods of greater average temperature and/or humidity). As a result, the operation of cleaner dispensing systems 200 may be customized (e.g., adjusted, updated, etc.) based on the respective geographic locations of the cleaner dispensing systems 200 and/or local conditions thereof (e.g., weather data associated with such respective geographic locations) so that operational performance of the cleaner dispensing systems 200 to reduce, minimize, or prevent condensate backflow and the respective geographic locations may be improved.

As shown in FIG. 2, different geographic locations 1000-1 to 1000-N may be associated with separate sets of one or more geographic parameter values GPV-1 to GPV-N, which may be the same or different from each other. Each set of one or more geographic parameter values GPV may include, for example, a value indicating a magnitude of a dispensing time interval associated with the geographic location, a value indicating a magnitude of a dispensing duration associated with the geographic location, any combination thereof, or the like. As a result, cleaner dispensing systems 200 located at different geographic locations 1000-1 to 1000-N may be configured to operate according to separate, respective sets of one or more geographic parameter values GPV-1 to GPV-N associated with the respective geographic locations 1000-1 to 1000-N, so that the that cleaner dispensing systems 200 located at different geographic locations 1000-1 to 1000-N may be configured to operate similarly or differently from each other (e.g., in terms of dispensing duration, dispensing time interval, etc. of the operation of the respective dispenser devices 206 thereof).

Still referring to FIG. 2, the remote computing device 410, being communicatively coupled to a given cleaner dispensing system 200 via a respective network communication link 710, may be configured to determine the respective geographic location 1000 of the given cleaner dispensing system 200 and may further transmit a signal (also referred to herein as a geographic control signal, or GCS) to the given cleaner dispensing system 200 to cause the cleaner dispensing system 200 (e.g., the dispenser controller 212 thereof) to be configured to operate the dispenser device 206 thereof according to one or more geographic parameter values of the one or more dispenser parameters that are associated with the determined geographic location of the given cleaner dispensing system 200.

In some example embodiments, the remote computing device 410 is configured to determine the geographic location of a given cleaner dispensing system 200 based on performing geolocating (e.g., geolocation) of the given cleaner dispensing system 200. The geolocating may be performed via any known geolocating process or process to determine a geographic location of a device. For example, in some example embodiments, the remote computing device 410 (e.g., the device controller 430 thereof) may, based on establishing a network communication link 710 with a given cleaner dispensing system 200 over at least the communication network 700, process one or more signals received from the cleaner dispensing system 200 to identify information indicated by the one or more signals, such as an IP address, that may be associated with a particular geographic location. For example, the remote computing device 410 may process information associated with a network communication link 710 between the remote computing device 410 and a given cleaner dispensing system 200 and/or any signals received from the cleaner dispensing system 200 via said network communication link 710 to determine an IP address associated with the cleaner dispensing system 200, and the remote computing device 410 may access a database (which may be stored at the remote computing device 410 or accessed from a remote source via communication over a communication network 700) in order to determine a geographic location that is associated with the determined IP address associated with the cleaner dispensing system 200. Such a database may be an empirically generated look-up table that associates an IP address with a geographic location (e.g., geographic coordinates, a particular city, a particular state, a particular geographic region, a particular nation, or the like). A geographic location may be indicated by geographic location data (e.g., geographic positional coordinates, a name of a specific region, nation, state, province, city, neighborhood, mailing address, any combination thereof, or the like), and determining a geographic location as described herein may be interchangeably referred to as determining geographic location data indicating a geographic location.

While a geographic location of a cleaner dispensing system 200 may be determined based on performing geolocating of the cleaner dispensing system 200, example embodiments are not limited thereto. For example, in some example embodiments, an electronic device 300 that may support a user and may be communicatively coupled to the remote computing device 410 (via a network communication link 714 that may include a network communication link 704 between the remote computing device 410 and the communication network and the network communication link 706 between the electronic device 300 and the communication network 700) may provide geographic location information to the remote computing device 410 based on user interaction with the electronic device 300. As shown, the electronic device 300 may include a device network communication interface 304, a controller (which may include a processor and memory), and a user interface 308 (e.g., a touchscreen display interface) with which a user may interact to input geographic location data along with identification data that identifies a particular cleaner dispensing system 200. The electronic device 300 (e.g., the device controller 306 thereof) may transmit the geographic location data and identification data to the remote computing device 410, and the remote computing device 410 may process such data to determine the geographic location of the cleaner dispensing system 200 without performing geolocating of the cleaner dispensing system 200.

In some example embodiments, the cleaner dispensing system 200 may be configured to determine the geographic location of the cleaner dispensing system 200 locally. For example, a cleaner dispensing system may include any known geo-positioning device (e.g., a global positioning system (GPS) transceiver) that may be configured to generate data indicating the geographic location of the cleaner dispensing system 200. The cleaner dispensing system 200 may determine the geographic location of the cleaner dispensing system 200 based on processing data (e.g., data generated by a geo-positioning device, data associated with one or more dispenser network communication links 702, 710, etc.). The cleaner dispensing system 200 may transmit a signal (also referred to herein as a geographic position signal) including geographic location data indicating the geographic location determined by the cleaner dispensing system to the remote computing device 410, to enable the remote computing device 410 to determine the geographic location of the cleaner dispensing system 200 based on processing information included in such signal.

Still referring to FIG. 2, the remote computing device 410 may transmit a geographic control signal ("GCS") to a cleaner dispensing system 200 based on determining the geographic location of the cleaner dispensing system 200. The geographic control signal may include geographic information ("GI") that is associated with the geographic location. The cleaner dispensing system 200 (e.g., the dispenser controller 212 thereof) may, based on processing the geographic information included in the geographic control signal, configure the cleaner dispensing system 200 (e.g., dispenser controller 212 thereof) to operate the dispenser device 206 thereof according to one or more geographic parameter values of the one or more dispenser parameters that are associated with the geographic location. The geographic information that is included in the geographic control signal may, in some example embodiments, include information indicating one or more geographic parameter values that are associated with the geographic location of the cleaner dispensing system 200 (e.g., the geographic information included in the geographic control signal may include the one or more geographic parameter values), such that the cleaner dispensing system 200 may read the one or more geographic parameter values from the geographic control signal to configure the cleaner dispensing system 200 (e.g., dispenser controller 212 thereof) to operate the dispenser device according to the one or more geographic parameter values of the one or more dispenser parameters. For example, as shown in FIG. 2, the remote computing device 410 may transmit respective geographic control signals GCS-1 to GCS-N to respective cleaner dispensing systems 200 located in (e.g., located at) respective geographic locations 1000-1 to 1000-N, where the geographic control signals GCS-1 to GCS-N include geographic information GI-1 to GI-N, respectively, to cause the respective cleaner dispensing systems 200 in geographic locations 1000-1 to 1000-N to process the respective geographic information GI-1 to GI-N included in the respective geographic control signals GCS-1 to GCS-N to be configured to operate to respective sets of one or more geographic parameter values GPV-1 to GPV-N associated with geographic locations 1000-1 to 1000-N, respectively.

It will be understood that example embodiments are not limited thereto. For example, in some example embodiments the geographic information GI that is included in a geographic control signal GCS and is associated with a geographic location may include geographic location data indicating the geographic location (and which may indicate a date at the geographic location, a local time at the geographic location, or the like), one or more geographic parameter values GPV associated with the geographic location, weather data (e.g., one or more weather data values) associated with the geographic location and indicating one or more weather conditions at the geographic location (e.g., a current meteorological season at the geographic location, a current time period, including a 7-day period, 30-day period, or the like in which the current time/date at the geographic location is included, an indication that a rainstorm is forecast to occur at the geographic location within a certain time period such as 6 hours in the future, etc.), one or more databases or models associated with the geographic locations, data indicating moisture warning signals associated with the geographic location, any combination thereof, or the like. A cleaner dispensing system 200 may process such geographic information GI included with a received geographic control signal GCS (e.g., one or more weather data values of weather data associated with the geographic location) to determine one or more geographic parameter values associated with the geographic location, for example based on accessing a local database (e.g., an empirically generated look-up table that associates one or more geographic parameter values with corresponding geographic information, such as weather data values) to determine one or more geographic parameter values which associate most closely to the geographic information received in the geographic control signal.

In some example embodiments, the remote computing device 410 may determine the geographic information to be included in the geographic control signal GCS to be transmitted to a given cleaner dispensing system 200 based on determining the geographic location 1000 of the cleaner dispensing system 200. As shown in FIG. 2, the remote computing device 410 may maintain respective instances, or entries 510-1 to 510-N, of geographic information (GI-1 to GI-N) associated with the respective geographic locations 1000-1 to 1000-N in a geographic information database 500. The geographic information that is included in a given geographic control signal associated with a given geographic location 1000 may include some, all, or a limited portion of the geographic information included in the corresponding entry 510 associated with that given geographic location 1000. In some example embodiments, the geographic information associated with a geographic location may indicate at least one of one or more geographic parameter values associated with the geographic location or weather data associated with the geographic location.

In some example embodiments, remote computing device 410 may maintain a database or model 540 that enables one or more geographic parameter values associated with a given geographic location to be determined based on input data (e.g., weather data, geographic location data, etc.) corresponding to the geographic location, including at least some or any of the data included in an entry 510 of geographic information associated with the geographic location. Such a database or model 540 may include an empirically generated look-up table, which associates geographic information (e.g., weather data, geographic location data, moisture warning signal data, any combination thereof, etc.) with corresponding geographic parameter values (e.g., dispensing time interval magnitude, dispensing duration magnitude, etc.). Such a database or model 540 may include a machine learning model as described herein. The remote computing device 410 may, in response to determining a geographic location of a cleaner dispensing system 200, access the database or model 540 to determine one or more geographic parameter values that are associated with the geographic location (e.g., the geographic location data indicating the geographic location, including one or more of geographic location coordinates, a name of a region, nation, state, city, neighborhood, mailing address, etc.) in the database. The remote computing device 410 may save one or more geographic parameter values associated with a geographic location that are determined based on geographic information associated with the geographic location to an entry 510 of the geographic information that is associated with the geographic location e.g., as at least a part of the geographic parameter value data 532). The remote computing device 410 may transmit a geographic control signal to include geographic information that includes information indicating the determined one or more geographic parameter values associated with a geographic location 1000 to one or more cleaner dispensing systems 200 that are determined to be located at and/or associated with the geographic location 1000.

In some example embodiments, geographic information ("GI") associated with a geographic location includes weather data associated with the geographic location. Such weather data associated may include one or more weather data values (e.g., weather condition values) including at least one of a temperature value associated with the geographic location, a humidity value associated with the geographic location, a current meteorological season at the geographic location, an indication of a weather event occurrence in proximity to the geographic location, an amount of precipitation received at the geographic location within a certain preceding time period (e.g., the immediately preceding 24 hours, 7 days, 30 days, etc.), any combination thereof, or the like. A temperature value associated with the geographic location may refer to a current temperature value associated with the geographic location, an average temperature value over a period of time associated with the geographic location (e.g., an average temperature value for a period of time that includes the current time at the geographic location, where such a period of time may include a 7-day period or calendar week, a 30-day period or calendar month, etc.), or the like, where the period of time may be a period of time including the present date and time, a period at least partially preceding the present date and time (e.g., for a historical and/or recent temperature value), and/or a period at least partially in the future from the present date and time (e.g., for a future or forecast temperature value). A humidity value associated with the geographic location may refer to a current humidity value associated with the geographic location, an average humidity value over a period of time associated with the geographic location (e.g., an average temperature value for a period of time that includes the current time at the geographic location, where such a period of time may include a 7-day period or calendar week, a 30-day period or calendar month, etc.), or the like, where the period of time may be a period of time including the present date and time, a period at least partially preceding the present date and time (e.g., for a historical and/or recent humidity value), and/or a period at least partially in the future from the present date and time (e.g., for a future or forecast humidity value).

Weather data including a weather data value providing an indication of a weather event occurrence in proximity to the geographic location may include data indicating a certain amount of precipitation at the geographic location within a certain time period immediately preceding the current time, within a certain time range (e.g., a 7-day or calendar week period, a 30-day or calendar month period, etc.) that includes the current time, and/or is forecast to occur within a certain future time range (e.g., 2-3 days in the future), data indicating that an amount of precipitation beyond a certain threshold of accumulation (e.g., at least 0.5 inches of rainfall accumulation) has occurred within a certain time period immediately preceding the current time, within a certain time range (e.g., a 7-day or calendar week period, a 30-day or calendar month period, etc.) that includes the current time, and/or is forecast to occur within a certain future time range (e.g., 2-3 days in the future). In some example embodiments, the weather data associated with a given geographic location may include information (e.g., data) indicating a variation of one or more weather data values (e.g., at least one of a temperature value or a humidity value associated with the geographic location) over a period of time (e.g., a 7-day period or calendar week, a 30-day period or calendar month, etc.).

In some example embodiments, the remote computing device 410 is configured to access (e.g., request, pull, obtain, etc.) weather data from a remote weather monitoring system 600 (also referred to herein as a remote weather monitoring service, a remote weather monitoring system, etc.) that is supported by at least one remote weather monitoring system device 610. The remote weather monitoring system may be any known and/or commercially available weather monitoring service, weather monitoring system, weather monitoring station, weather station, weather forecasting system, observation station, observation system, weather observation station, weather observation system, automated surface observation system, any combination thereof, or the like via which weather data associated with one or more geographic locations may be obtained via network communication (e.g., a system, service, station or the like supporting and/or implemented by the U.S. National Weather Service). The remote weather monitoring system device 610 may be an electronic device according to any of the example embodiments. As shown, the remote weather monitoring system device 610 may maintain a database of instances ("entries") of weather data 604-1 to 604-N (referred to herein as weather data) associated with separate, respective geographic locations 1000-1 to 1000-N, where such weather data (e.g., 604-1) associated with a geographic location (e.g., 1000-1) includes one or more weather data values (e.g., weather condition values) associated with the geographic location, including at least one of a temperature value associated with the geographic location, a humidity value associated with the geographic location, a current meteorological season at the geographic location, an indication of a weather event occurrence in proximity to the geographic location, an amount of precipitation received ("occurred") at the geographic location within a certain preceding time period (e.g., the immediately preceding 24 hours, 7 days, 30 days, etc.), an indication of whether at least a threshold amount of precipitation received ("occurred") at the geographic location within a certain preceding time period (e.g., the immediately preceding 24 hours, 7 days, 30 days, etc.) is met, any combination thereof, or the like.

The remote weather monitoring system device 610 may be communicatively coupled to the communication network 700 via a network communication link 708 (e.g., the remote weather monitoring system device 610 may include a network communication interface similar to that of network communication interfaces 224 and/or 420 configured to establish the network communication link 708). The remote computing device 410 may be configured to access the remote weather monitoring system device 610 (e.g., via a network communication link 712 over the communication network 700) and obtain (e.g., request, pull, access, etc.) weather data associated with one or more geographic locations, where such weather data may include instances of weather data 604-1 to 604-N associated, respectively, with determined geographic locations 1000-1 to 1000-N. In some example embodiments, the remote computing device 410 may obtain the weather data 604-1 to 604-N periodically, at fixed time intervals (e.g., once every 12 hours). In some example embodiments, the remote computing device 410 may obtain the weather data associated with a given geographic location from the remote weather monitoring system 600 (via communication with the remote weather monitoring system 600) based on (e.g., in response to) determining the given geographic location as the geographic location of a given cleaner dispensing system 200. In some example embodiments, the remote computing device 410 may determine geographic information associated with a geographic location (e.g., one or more geographic parameter values) based on obtaining weather data associated with the geographic location, based on communication with the remote weather monitoring system 600 (e.g., communication with the remote weather monitoring system device 610 supporting same) via at least one network communication link 712.

As shown in FIG. 2, geographic information ("GI") associated with a given geographic location may be stored at a geographic information database 500 of the remote computing device 410 in a given entry 510 of separate entries of geographic information 510-1 to 510-N associated with separate, respective geographic locations 1000-1 to 1000-N ("N" being any positive integer). Each entry 510 of geographic information associated with a given geographic location may include one or more entries of data 530 to 538 associated with the geographic location, although example embodiments are not limited to the entries of data 530 to 538 shown in FIG. 2, and one or more of the entries of data 530 to 538 may be omitted.

In some example embodiments, an entry 510 of geographic information associated with a geographic location may include geographic location data 530 identifying the given geographic location itself. Such geographic location data may include, for example, information identifying geographic coordinates associated with the geographic location, a name of a geographic region, nation, state, province, city, neighborhood, physical mailing address, postal code, IP address, any combination thereof, or the like. Geographic location data 530 associated with a geographic location may be determined based on determining a geographic location of a cleaner dispensing system 200, for example based on performing geopositioning (e.g., geolocating) of a cleaner dispensing system 200 via processing an IP address, based on receiving information from an electronic device 300 that includes at least some of the geographic location data, any combination thereof, or the like. In some example embodiments, at least geographic location data 530 associated with a geographic location may be predetermined prior to determining that any cleaner dispensing systems 200 are located in the geographic location.

In some example embodiments, an entry 510 of geographic information associated with a geographic location may include geographic parameter value data 532 that may include one or more geographic parameter values ("GPV") that are associated with the geographic location. The one or more geographic parameter values included in the geographic parameter value data 532 may be determined based on processing various geographic information associated with the geographic location, for example based on applying weather data, geographic location data, or the like associated with the geographic location to a database or model (e.g., 536, 540) as described herein. In some example embodiments, at least a portion of the geographic parameter value data 532 associated with a geographic location may be predetermined prior to determining that any cleaner dispensing systems 200 are located in the geographic location.

In some example embodiments, an entry 510 of geographic information associated with a geographic location may include weather data 534 associated with the geographic location. Such weather data 534 may include one or more weather data values included in an entry of weather data (e.g., a respective one of 604-1 to 604-N) associated with the geographic location that may be accessed ("obtained") from a remote weather monitoring system 600. The weather data ("one or more weather data values") may be obtained from the remote weather monitoring system 600 based on using the geographic location data 530 associated with the geographic location to obtain a particular instance and/or entry of weather data associated with the geographic location from the weather monitoring system (e.g., weather data 604 at the remote weather monitoring system device 610 that is associated with at least a portion of the geographic location data 530 associated with the geographic location).

In some example embodiments, an entry 510 of geographic information associated with a geographic location may include moisture warning signal data 538 associated with receipt of one or more moisture warning signals 182 from one or more cleaner dispensing systems 200 located in the geographic location. Such moisture warning signal data 538 included in an entry 510 of geographic information associated with a particular geographic location may include frequency data (also referred to herein as amount data, quantity data, or the like) which indicates an amount or frequency of moisture warning signals 182 actually received from one or more cleaner dispensing systems 200 located in the geographic location within a certain time period (e.g., a preceding 7-day period, a preceding 30-day period, or the like). Such moisture warning signal data 538 included in an entry 510 of geographic information associated with a particular geographic location may include threshold data which indicates a threshold amount or frequency of moisture warning signals 182 that may be received from one or more cleaner dispensing systems 200 located in the geographic location within a certain time period (e.g., a preceding 7-day period, a preceding 30-day period, or the like). In some example embodiments, the remote computing device 410 may adjust (e.g., update, change, etc.) at least some geographic information associated with a geographic location (e.g., increment one or more geographic parameter values included in the geographic parameter value data 532) in response to a determination that the frequency data at least meets the threshold data (e.g., in response to determining that at least 1 moisture warning signal is actually received in the previous 7 days, where the threshold frequency is 1 moisture warning signal received in the previous 7 days).

In some example embodiments, an entry 510 of geographic information associated with a geographic location may include one or more databases or models 536 associated with the geographic location. The one or more databases or models 536 may be configured to indicate one or more geographic parameter values as an output based on receiving one or more portions of the geographic information included in the entry 510 (e.g., geographic location data, weather data, moisture warning signal data, any combination thereof, or the like) as an input.

It will be understood that any of the entries of data 530 to 538 may be omitted from any entry 510 of geographic information.

In some example embodiments, an entry 510 of geographic information associated with a given geographic location may be generated based on determining the geographic location (e.g., at least some geographic location data) of a cleaner dispensing system 200. In some example embodiments, based on determining a geographic location of a cleaner dispensing system, the remote computing device 410 may identify a pre-existing entry 510 having geographic location data 530 that at least partially matches the determined geographic location (e.g., the determined geographic location data), and the remote computing device 410 may obtain geographic information of the entry 510 (e.g., one or more geographic parameter values included in the geographic parameter value data 532 of the entry, one or more weather data values of weather data 534 of the entry, etc.). The remote computing device 410 may generate a geographic control signal GCS to be transmitted to the cleaner dispensing system 200 located in a geographic location to include at least a portion of the geographic information associated with the geographic location (e.g., one or more geographic parameter values, one or more weather data values, etc.), to cause the cleaner dispensing system 200 to process the geographic information included in the geographic control signal to configure the cleaner dispensing system 200 to operate according to one or more geographic parameter values associated with the geographic location.

As shown, in some example embodiments the remote computing device 410 may include a database or model 536 and/or 540 that associates an input (e.g., geographic location data, weather data, moisture warning signal data, any combination thereof, or the like) with an output that includes one or more geographic parameter values. In some example embodiments, the remote computing device 410 may include separate, respective databases or models 536 in one or more entries 510 of geographic information associated with separate, respective geographic locations, where each separate database or model 536 in a given entry 510 is configured to provide one or more geographic parameter values associated with the geographic location of the given entry 510 based on one or more inputs (e.g., geographic location data 530, weather data 534, moisture warning signal data 538, any combination thereof, or the like) associated with the geographic location. In some example embodiments, the remote computing device 410 may include one or more databases or models 540 that may be configured to provide one or more geographic parameter values associated with a geographic location based on one or more inputs (e.g., geographic location data 530, weather data 534, moisture warning signal data 538, any combination thereof, or the like) associated with the geographic location, where the one or more databases or models 540 may be configured to provide one or more geographic parameter values associated with various geographic locations based on inputs corresponding to the various geographic locations.

The remote computing device 410 may, in response to determining a geographic location, determine weather data associated with the geographic location (e.g., based on accessing the weather data from the remote weather monitoring system 600 and/or based on accessing an entry 510 of geographic information associated with the determined geographic location) and provide at least a portion of the weather data into a database or model (e.g., a database or model 536 included with the entry 510, a database or model 540 that is independent from the entry 510, or the like) as an input to determine one or more geographic parameter values that are associated with the input by the database or model.

In some example embodiments, the database or model (536, 540) may include an empirically-generated look-up table that associates input data (e.g., weather data values, such as) with a corresponding one or more geographic parameter values as an output, such that the remote computing device 410 may determine one or more geographic parameter values based on providing the input data and determining the one or more geographic parameter values associated with the input by the look-up table. Such input data may include geographic location data, one or more weather data values (e.g., average temperature and humidity values at the geographic location during the current calendar month, the current calendar week, or the like), moisture warning signal data (e.g., an indication of how many moisture warning signals are received from cleaner dispensing systems in the geographic location within a certain time period), any combination thereof, or the like.

Figure 3:
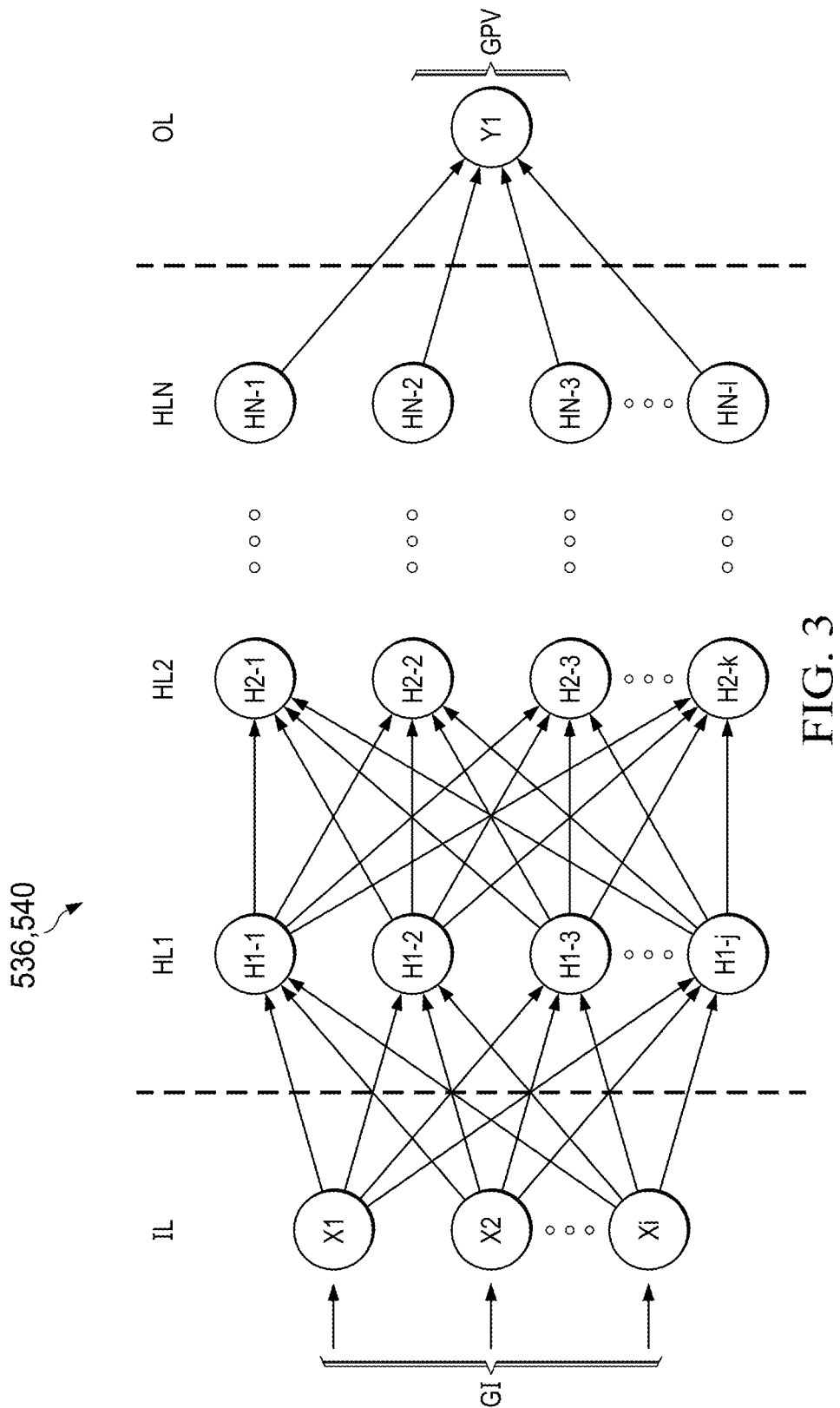
FIG. 3 is a schematic diagram illustrating a machine learning model configured to determine one or more geographic parameter values according to one or more inputs, according to some example embodiments.

FIG. 3 is a schematic diagram illustrating a machine learning model (536, 540) configured to determine one or more geographic parameter values according to one or more inputs, according to some example embodiments.

Referring to FIG. 3 and further referring back to FIG. 2, in some example embodiments the database or model (536, 540) may include a machine learning model that is trained to accept at least some geographic information (GI) associated with a geographic location (e.g., geographic location data, weather data values such as average temperature and humidity values at the geographic location during the current calendar month, the current calendar week, or the like, an indication of current weather conditions including a quantity of precipitation at the geographic location within a certain preceding time period, an indication of a quantity and/or frequency of moisture warning signals received at the remote computing device 410 from one or more cleaner dispensing systems 200 at the geographic location within a certain time period, etc.) as input data and to provide one or more geographic parameter values associated with the geographic location (e.g., a particular dispensing time interval and a particular dispensing duration) as an output.

For example, as shown, the machine learning model may include an artificial neural network (ANN), which may be a deep neural network (DNN) as shown, including a structure that includes an input layer IL, a plurality of hidden layers HL1 to HLN ("N" being any positive integer), and an output layer OL. The DNN may include, but is not limited to, convolutional neural networks (CNN), recurrent neural networks (RNN), or the like.

Each of the layers of the DNN may include multiple channels that may correspond to multiple artificial nodes such as neurons (referred to herein as simply "nodes"). The nodes may be connected to each other to facilitate data processing, such that a node of a given layer may perform an operation (e.g., a mathematical operation, such as a nonlinear function) on data received from one or more nodes and then provide the output of the operation to one or more other nodes.

The input layer IL may include one or more nodes X1 to Xi ("i" being any positive integer) to which at least some geographic information (GI) associated with a geographic location may be provided as an input. For example, separate weather data values of the weather data 534 associated with a given geographic location, (e.g., average temperature and humidity values during the current calendar month) may be provided as separate inputs to input nodes X1 and X2, respectively. The hidden layers HL1 to HLN may each include a plurality of hidden nodes (H1-1 to H1-$j$, H2-1 to H2-$k$, HN-1 to HN-1, where j, k, and l are each any positive integer, etc.) which perform one or more operations (e.g., processing operations, mathematical operations, etc.) on data received from one or more other nodes. The output layer OL includes one or more output nodes (e.g., a single node Y1 shown in FIG. 3, although example embodiments are not limited thereto) that performs one or more operations on data received from the hidden nodes of the N-th hidden layer HLN to output one or more geographic parameter values (e.g., dispensing time interval, dispensing duration, etc.). Weighted values may be applied to various connections between nodes. The machine learning model may be trained based on providing training input data (e.g., training weather data) and training output data (e.g., training geographic parameter value(s)) to the machine learning model having a pre-determined node structure, wherein the training is performed to adjust the respective weighted values for connections between nodes to train the machine learning model to output the "training output data" based on using the "training input data" as an input.

Referring back to FIGS. 1-2, the remote computing device 410 may, in response to receiving (e.g., obtaining) weather data 534 associated with a geographic location, apply one or more weather data values of the received weather data 534 as an input to a machine learning model (536, 540) to determine one or more geographic parameter values GPV (e.g., to be included in the geographic parameter value data 532) associated with the geographic location. The one or more geographic parameter values may be included in the geographic control signal GCS transmitted to the cleaner dispensing system 200 that is at the geographic location.

Accordingly, the remote computing device 410 may determine geographic information that includes one or more geographic parameter values based on obtaining weather data 534 associated with the geographic location based on communication with the remote weather monitoring system 600 via at least on network communication link 712.

In some example embodiments, the remote computing device 410 may refrain from determining geographic parameter values associated with a determined geographic location and may include geographic information other than geographic parameter values in the geographic control signal. The cleaner dispensing system 200 may process the geographic information of the received geographic control signal to determine one or more geographic parameter values locally (e.g., at the cleaner dispensing system 200). For example, the remote computing device 410 may determine (e.g., obtain, access, etc. from the remote weather monitoring system 600) the weather data 604 associated with the determined geographic location of a cleaner dispensing system 200 (and may store such weather data as weather data 534 in a given entry 510 of geographic information associated with the geographic location), and the remote computing device 410 may provide the weather data as at least a portion of the geographic information in the geographic control signal to a cleaner dispensing system 200 that is determined to be located in the geographic location. A cleaner dispensing system 200 may be configured to process the weather data included in a geographic control signal to determine one or more geographic parameter values and may configure the cleaner dispensing system 200 to operate the dispenser device 206 thereof according to the one or more geographic parameter values. For example, the cleaner dispensing system 200 may store (e.g., at a memory of the dispenser controller 212) a database or model corresponding to the database or model (536, 540) as described herein which may associate geographic information input to one or more geographic parameter values output, and the cleaner dispensing system 200 may apply the weather data included in the geographic control signal to the database or model to determine the one or more geographic parameter values and further configure the cleaner dispensing system 200 to operate the dispenser device 206 according to the determined one or more geographic parameter values.

Figure 4:
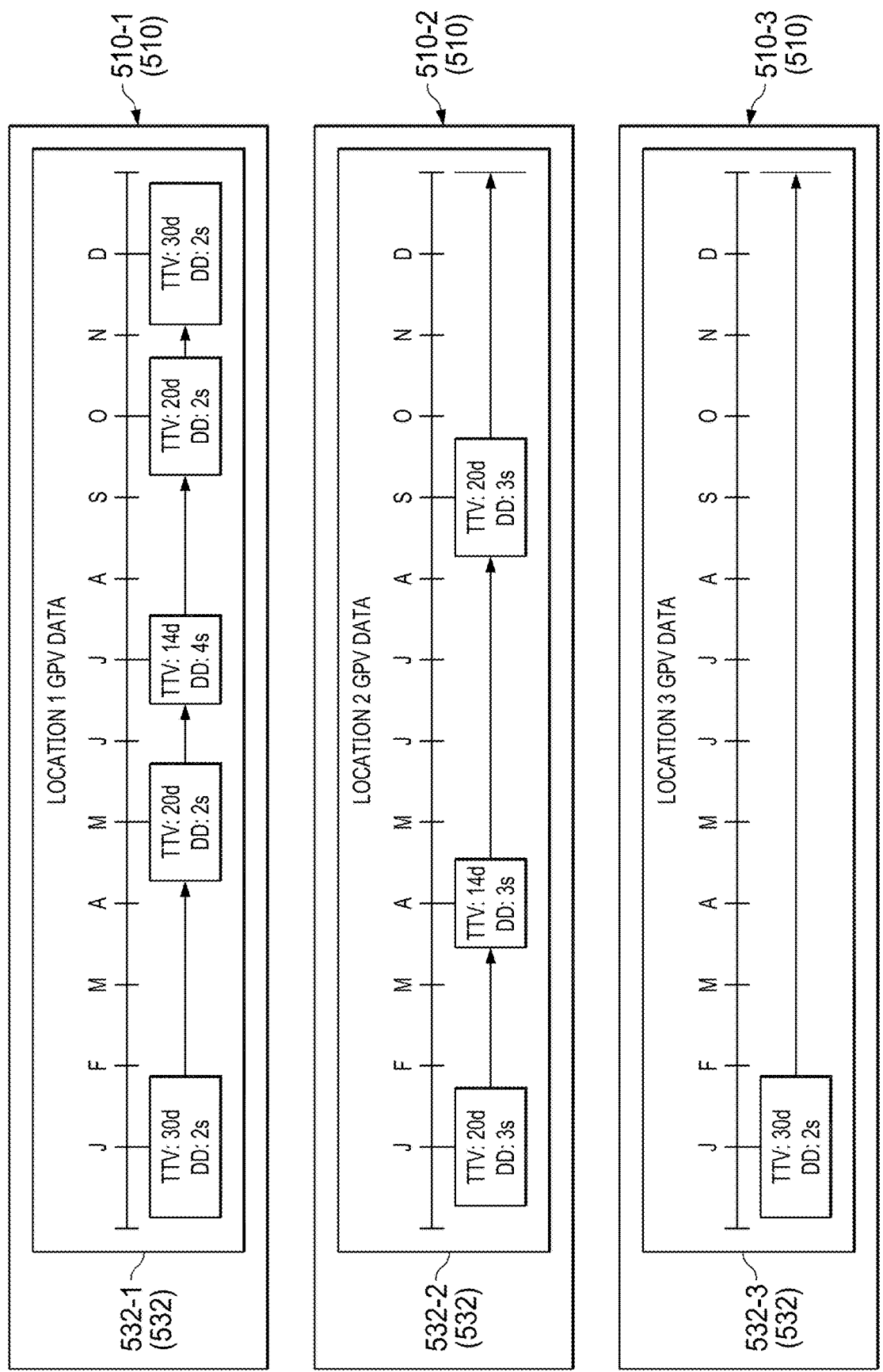
FIG. 4 is a diagram of separate instances of geographic information associated with separate, respective geographic locations, according to some example embodiments.

FIG. 4 is a diagram of separate instances of geographic information associated with separate, respective geographic locations, according to some example embodiments.

Referring to FIG. 4 and further referring back to FIG. 2, in some example embodiments, the geographic parameter value data 532 included in a given entry 510 of geographic information associated with a geographic location may include information indicating a variation of one or more geographic parameter values associated with the geographic location over a period of time. Such a variation may correspond to historical variation of weather conditions at the geographic location over time (e.g., over a 12-month period). For example, as shown in FIG. 4, which illustrates geographic information entries 510-1 to 510-3 for three separate geographic locations, the entries may include respective geographic parameter value data 532-1 to 532-3 which indicate different variations of the dispensing time interval TTV and dispensing duration DD geographic parameter values associated with the geographic location over a 12-month period. The remote computing device 410 may adjust (update) one or more geographic parameter values associated with a given geographic location and transmit a geographic control signal to one or more cleaner dispensing systems 200 located in the geographic location based on such adjustments, to cause the one or more cleaner dispensing systems 200 in the geographic location to operate according to the updated one or more geographic parameter values, based on monitoring the time-variation of the one or more geographic parameter values as indicated by the geographic parameter value data 532 and applying the current time to such time-variation indicated in the geographic parameter value data 532 to determine a current one or more geographic parameter values associated with the geographic location.

In some example embodiments, the dispenser controller 212 of a cleaner dispensing system 200 may store one or more local parameter values of the one or more dispenser parameters (e.g., having local dispensing duration "DD" and dispensing time interval "TTV" values) at the cleaner dispensing system 200 (e.g., at a memory which may be included in the dispenser controller 212). The dispenser controller 212 may be configured to operate the dispenser device 206 of the cleaner dispensing system 200 according to the one or more local parameter values. In some example embodiments, in response to receiving a geographic control signal from the remote computing device 410, the dispenser controller 212 may process the geographic information included in the geographic control signal to determine one or more geographic parameter values and further update (e.g., overwrite) the one or more local parameter values stored at the cleaner dispensing system 200 to be the one or more geographic parameter values, thereby configuring the cleaner dispensing system 200 (e.g., at least the dispenser controller 212 thereof) to operate the dispenser device 206 thereof according to the one or more geographic parameter values.

Figure 5:
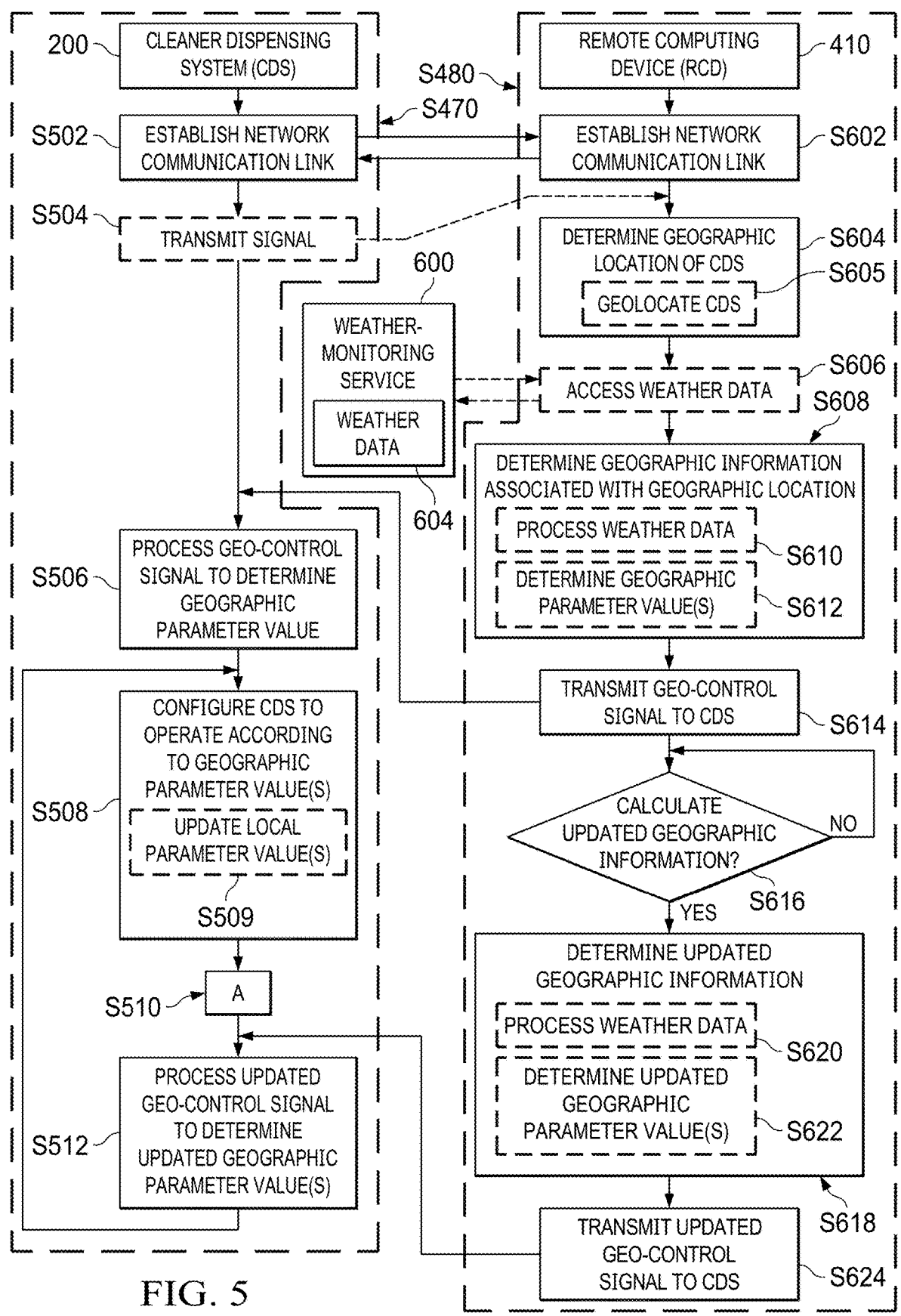
FIG. 5 is a flowchart illustrating methods of operation of a cleaner dispensing system and a remote computing device, according to some example embodiments.

FIG. 5 is a flowchart illustrating methods of operation of a cleaner dispensing system and a remote computing device, according to some example embodiments. Some or all of the operations of the methods shown in FIG. 5 may be implemented by any example embodiment of a system 10, a cleaner dispensing system 200, and/or a remote computing device 410, or any portion thereof according to any example embodiments. It will be understood that operations of the methods shown in FIG. 5 may be changed in order relative to what is shown in FIG. 5. It will further be understood that one or more operations of any of the methods shown in FIG. 5 may be omitted from the respective methods shown in FIG. 5. It will further be understood that one or more operations may be added to any of the methods shown in FIG. 5.

Separate operations of the methods shown in FIG. 5 may be performed by separate devices. For example, operations performed by the cleaner dispensing system 200 ("CDS") are included as part of operation S470, and operations performed by the remote computing device 410 ("RCD") are included as part of operation S480. Operations performed by a cleaner dispensing system 200 (CDS) as part of operation S470 and operations performed by a remote computing device 410 (RCD) as part of operation S480 may be performed at least partially concurrently.

At S502 and S602, the cleaner dispensing system 200 and the remote computing device 410 establish a network communication link (710) with each other over a communication network. Either of S502 or S602 may be performed prior to the other (e.g., either the remote computing device 410 or the cleaner dispensing system 200 may initiate establishing the network communication link).

At S604, the remote computing device 410 determines a geographic location of the cleaner dispensing system 200. Such a determination at S604 may be implemented in various ways. For example, in some example embodiments an electronic device 300 supporting a user may transmit a signal to the remote computing device 410 that uniquely identifies the cleaner dispensing system 200 (e.g., includes a unit code, serial number, or the like that is associated with the cleaner dispensing system) and further indicates the geographic location of the cleaner dispensing system 200 (e.g., includes geographic location data that indicates the geographic location). The electronic device 300 may transmit such a signal to the remote computing device based on user interaction with the electronic device 300 to manually provide the geographic location.

In some example embodiments, the electronic device 300 and/or the cleaner dispensing system 200 may transmit a signal (e.g., at S504) to the remote computing device 410 where the signal includes information that may be processed by the remote computing device 410 to determine the geographic location of the cleaner dispensing system 200. Such a signal may be transmitted by the cleaner dispensing system 200 and received at the remote computing device 410 as part of the establishment of the network communication link therebetween at S502 and S602. Such a signal, referred to herein as a "geographic position signal," may be transmitted separately from the establishing of the network communication link (e.g., at S504). In some example embodiments, the cleaner dispensing system 200 may include a geopositioning device (e.g., a Global Positioning System (GPS) transceiver or antenna, or the like) configured to generate geographic location data indicating a geographic location of the cleaner dispensing system 200, and the cleaner dispensing system 200 may transmit such data to the remote computing device at S504 to enable the remote computing device 410 to determine the geographic location at S604. In some example embodiments, the cleaner dispensing system 200 may be configured to generate such location data based on monitoring proximate communication network nodes (e.g., cell towers, network routers, etc.) and may transmit data associated with such monitoring to the remote computing device at S504 to enable the remote computing device 410 to determine the geographic location at S604.

In some example embodiments, the remote computing device 410 may determine the geographic location of the cleaner dispensing system 200 based on performing geolocating of the cleaner dispensing system at S605. Such geolocating may include processing one or more signals received from the cleaner dispensing system 200 via the network communication link 710 to determine an IP address associated with the cleaner dispensing system 200 and applying the IP address to a database that associates IP addresses with geographic locations (e.g., geographic location data) in order to determine the geographic location of the cleaner dispensing system 200. However, example embodiments for performing the geolocating at S605 are not limited thereto.

As shown at S606, the remote computing device 410 may communicate with a remote weather monitoring system 600 via a network communication link to obtain ("access") weather data associated with one or more geographic locations, which may include weather data (also referred to herein as one or more weather data values) associated with the geographic location of the cleaner dispensing system that is determined at S604.

At S608, the remote computing device 410 determines geographic information associated with the geographic location that is determined at S604. Such a determination at S608 may include processing weather data associated with the determined geographic location at S610, where the weather data is obtained at S606 (e.g., as weather data 604) and which may be processed to be included as weather data 534 (e.g., as one or more weather data values) in an entry 510 of geographic information associated with the geographic location. Such a determination at S608 may include determining one or more geographic parameter values associated with the determined geographic location at S612 to be included as one or more geographic parameter values included in geographic parameter value data 532 in an entry 510 of geographic information associated with the geographic location. For example, the determination at S608 may include accessing a database (e.g., an empirically-generated look-up table that associates weather data values such as average temperature and/or humidity values for a given calendar month or 30-day period with corresponding one or more geographic parameter values), a model (e.g., a machine learning model, such as a deep neural network (DNN) model, that accepts weather data values as an input and provides one or more geographic parameter values as an output), or the like, and inputting the weather data (e.g., one or more weather data values) into the database or model to determine the corresponding geographic parameter value associated with the geographic location of the cleaner dispensing system 200.

It will be understood that, in some example embodiments, the determination of the one or more geographic parameter values at S612 may be omitted, such that the geographic information determined at S608 may include weather data (e.g., one or more weather data values) associated with geographic location and may omit geographic parameter values associated with the geographic location.

FIG. 5 illustrates the weather data as being obtained at S606 subsequently to determining the geographic location of the cleaner dispensing system 200 at S604, where such weather data obtained at S606 may include weather data associated specifically with the geographic location determined at S604. However, it will be understood that example embodiments are not limited thereto, and the weather data may be obtained at S606 at any time, including prior to determining the geographic location at S604 and/or establishing the network communication link at S602, such that the weather data associated with a geographic location may be pre-loaded at the remote computing device 410 at the time of determining the geographic location of the cleaner dispensing system at S604. For example, the remote computing device 410 may periodically access the remote weather monitoring system 600 and obtain weather data for a plurality of geographic locations at a fixed time interval (e.g., every 30 minutes), such that, in response to determining a geographic location of a cleaner dispensing system at S604, the remote computing device 410 may simply access previously-obtained (accessed) weather data associated with the geographic location which is already obtained and stored at the remote computing device 410 (e.g., in weather data 534 of an entry 510 of geographic information associated with the determined geographic location) prior to the determination at S604.

At S614, the remote computing device 410 transmits a geographic control signal (also referred to herein as a "geo-control signal") to the cleaner dispensing system 200 via the network communication link 710, based on determining the geographic information at S608. The geographic control signal may include at least a portion of the geographic information associated with the determined geographic location of the cleaner dispensing system 200, including for example the one or more geographic parameter values determined at S612, the weather data (e.g., one or more weather data values) processed at S612, or any combination thereof.

At S506, the cleaner dispensing system 200 receives the geographic control signal and processes the geographic control signal to determine one or more geographic parameter values associated with the geographic location of the cleaner dispensing system 200. In some example embodiments, including example embodiments where the one or more geographic parameter values are determined at the remote computing device 410 at S612 and are included in the geographic information of the geographic control signal transmitted at S614, the determining at S506 may include identifying and reading the one or more geographic parameter values from the geographic information of the geographic control signal. In some example embodiments, including example embodiments where the geographic information omits geographic parameter values and includes other geographic information associated with the geographic location such as weather data (e.g., one or more weather data values) associated with the geographic location, the determining at S506 may include accessing a database (e.g., an empirically-generated look-up table that associates weather data values such as average temperature and/or humidity values for respective 30-day or calendar month periods with corresponding geographic parameter values), a model (e.g., a machine learning model, such as a deep neural network (DNN) model, that accepts weather data values as an input and provides one or more geographic parameter values as an output), or the like which may be stored at the cleaner dispensing system 200, and inputting the geographic information (e.g., weather data values) into the database or model to determine the corresponding one or more geographic parameter values associated with the geographic location of the cleaner dispensing system 200.

At S508, the cleaner dispensing system 200 configures itself (e.g., the dispenser controller 212 configures the cleaner dispensing system 200 and/or the dispenser controller 212 thereof) to operate the dispenser device 206 thereof according to the one or more geographic parameter values that are determined at S506. Such a configuration may include, at S509, updating (e.g., overwriting) one or more local parameter values that the dispenser controller 212 is configured to access to control operation of the dispenser device 206 to be the one or more geographic parameter values.

At S510, the cleaner dispensing system 200 operates to dispense cleaning composition 230 according to the one or more geographic parameter values. Such a process, represented by block "A" in FIG. 5, is illustrated and described in further detail with regard to FIG. 6.

At S616, the remote computing device 410 determines whether to calculate updated geographic information associated with the geographic location. Such monitoring may be performed periodically (e.g., in response to an elapse of a fixed time interval, also referred to herein as a "signal time interval," e.g., 12 hours). Such determining at S616 may include accessing the remote weather monitoring system 600 via network communication link 712 periodically, at a fixed time interval (e.g., every 12 hours, every 30 minutes, etc.) and determining whether the obtained weather data (604) associated with the geographic location has changed relative to the weather data most recently previously accessed (e.g., obtained) from the remote weather monitoring system 600. In response to a determination that a fixed time interval (e.g., signal time interval) is elapsed, the geographic location associated with the cleaner dispensing system 200 is changed (e.g., based on performing S604), updated and/or changed weather data 604 associated with the geographic location is obtained, any combination thereof, or the like, a determination may be made that updated geographic information associated with the geographic location is to be calculated (S616=YES). If not (S616=NO), the process at S616 repeats. If so (S616=YES), the updated geographic information associated with the geographic location is determined at S618.

The determination at S618 may be similar to and/or identical to the determination at S608, although in some example embodiments determined based on updated and/or changed weather data associated with the geographic location, where such updated weather data may be obtained (accessed) as part of performing S616, S618, and/or may be obtained separately according to a fixed time interval elapse (e.g., every 30 minutes). The determination at S618 may include processing weather data 534 at S620 (which may be similar to or identical to the determination performed at S612) and/or determining one or more updated geographic parameter values that may be included in the geographic parameter value data 532 at S622 (which may be similar to or identical to the determination performed at S612).

At S624, based on a determination of updated geographic information (e.g., updated one or more geographic parameter values, updated weather data, etc.) associated with the geographic location, an updated geographic control signal (also referred to interchangeably herein as an "update signal," an "updated geo-control signal," or the like) may be transmitted to the cleaner dispensing system 200 at S624. Similarly to the geographic control signal transmitted at S614, the updated geographic control signal that is transmitted at S624 may include at least a portion of the updated geographic information, including for example the updated weather data processed at S620, the updated one or more geographic parameter values determined at S622, or any combination thereof. In some example embodiments, the updated geographic information included in the geographic control signal transmitted at S624 may be the same as or different from the geographic information included in the geographic control signal transmitted at S614. The determination at S618 and the transmission at S624 may be performed in response to a determination at S616 that at least a fixed period of time (signal time interval) is elapsed.

In some example embodiments, the remote computing device 410 may selectively perform or refrain from performing S624 (e.g., selectively perform or refrain from transmitting an updated geographic control signal) based upon a determination of whether at least a portion of the updated geographic information that is determined at S618 (e.g., the weather data, the updated geographic parameter value, or the like) is changed (e.g., different) from the geographic information that is determined at S608. For example, in response to a determination that the updated geographic information (e.g., updated one or more geographic parameter values) determined at S618 is unchanged from the geographic information determined at S608, the remote computing device 410 may selectively omit performing S624. For example, the geographic control signal may be selectively transmitted at S624 in response to a determination that at least one geographic parameter value associated with the geographic location is changed (e.g., an updated geographic parameter value determined at S622 is different from a corresponding geographic parameter value determined at S612).

Accordingly, it will be understood that the remote computing device 410 may selectively transmit the updated geographic control signal to the cleaner dispensing system 200 at S624 in response to at least one of an elapse of a signal time interval, a determination that one or more geographic parameter values have changed, a determination that the geographic location has changed, and/or a determination that the geographical information associated with the geographic location has changed.

At S512, the cleaner dispensing system 200 receives the updated geographic control signal and processes the updated geographic control signal to determine the updated one or more geographic parameter values associated with the geographic location of the cleaner dispensing system 200. In some example embodiments, including example embodiments where the updated one or more geographic parameter values are included in the updated geographic information of the geographic control signal, the determining at S512 may include identifying and reading the updated one or more geographic parameter value from the updated geographic information of the updated geographic control signal. In some example embodiments, including example embodiments where the updated geographic information omits updated geographic parameter values and includes other updated geographic information such as updated weather data associated with the geographic location, the determining at S512 may include accessing the aforementioned database and/or model described with reference to S506, and inputting the updated geographic information into the database or model to determine the corresponding updated one or more geographic parameter values associated with the geographic location of the cleaner dispensing system 200.

The cleaner dispensing system 200 may, in response to determining the updated one or more geographic parameter values at S512, proceed to S508 to configure itself (e.g., the dispenser controller 212 configures the cleaner dispensing system 200 and/or the dispenser controller 212) to operate the dispenser device 206 thereof according to the updated one or more geographic parameter values that are determined at S512. Such a configuration may include, at S509, updating (e.g., overwriting) one or more local parameter values that the dispenser controller 212 is configured to access to control operation of the dispenser device 206 to be the updated one or more geographic parameter values.

Figure 6:
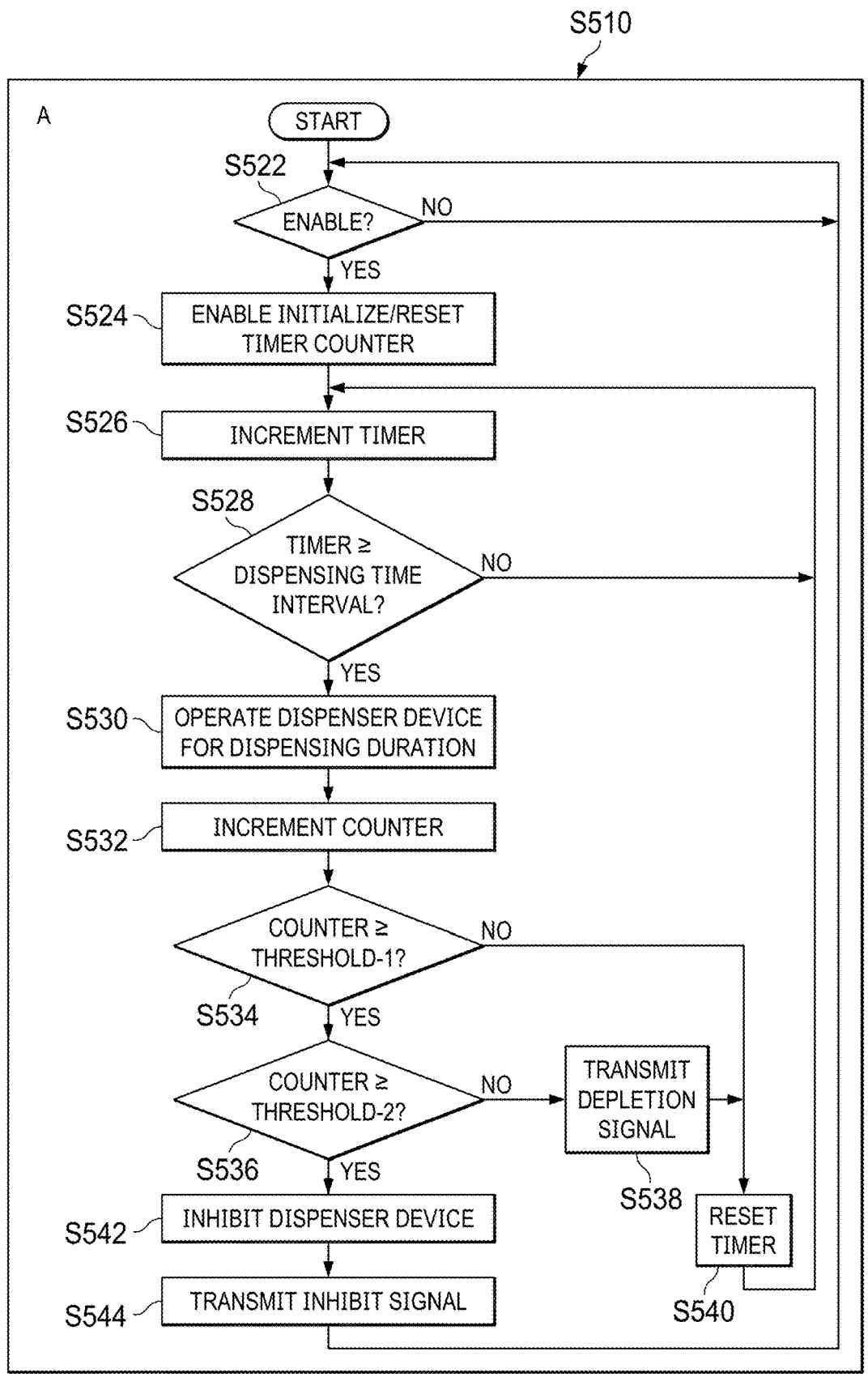
FIG. 6 is a flowchart illustrating a method of operating a cleaner dispensing system, according to some example embodiments.

FIG. 6 is a flowchart illustrating a method of operating a cleaner dispensing system 200, according to some example embodiments. Some or all of the operations of the method shown in FIG. 6 may be implemented by any example embodiment of a system 10, a cleaner dispensing system 200, and/or a remote computing device 410, or any portion thereof according to any example embodiments. It will be understood that operations of the method shown in FIG. 6 may be changed in order relative to what is shown in FIG. 6. It will further be understood that one or more operations of the method shown in FIG. 6 may be omitted from the method shown in FIG. 6. It will further be understood that one or more operations may be added to the method shown in FIG. 6. As shown, the method may be performed at S510 in FIG. 5 as represented by block "A".

Referring to FIG. 6, the method shown in FIG. 6 includes a method for operating a cleaner dispensing system 200 according to any of the example embodiments to dispense (e.g., supply, etc.) a cleaning composition 230 through an outlet 208 thereof. Some or all of the operations of the method shown in FIG. 6 may be implemented by the dispenser controller 212, for example based on a processor of the dispenser controller 212 executing a program of instructions stored at a memory of the dispenser controller 212.

As shown, the method of FIG. 6 includes controlling a dispenser device 206 of the cleaner dispensing system to cause the dispenser device 206 to dispense an amount (e.g., 3 oz) of the cleaning composition 230 from cleaning composition supply source 204 in fluid communication with an inlet of the dispenser device 206 (e.g., an internal reservoir of the cleaner dispensing system 200, a cartridge reservoir of a cartridge detachably coupled to the cleaner dispensing system base 202, etc.) and through the outlet 208 without manual intervention (e.g., without human intervention). It will be understood that some or any of the operations shown in FIG. 6 may be performed (e.g., performed by dispenser controller 212) without human intervention (e.g., some or any operations may be performed by dispenser controller 212 based on programming of the dispenser controller 212 and may be performed independently of any commands or signals received at the dispenser controller 212 based on human interaction with an interface (e.g., button, touch-screen display, etc.)).

At S522, the dispenser controller 212 determines whether operation of the dispenser device 206 is enabled or inhibited, which may include a determination of whether an enable command signal is received at the cleaner dispensing system 200 (e.g., from the remote computing device 410 via network communication link 710). The dispenser device 206 may be enabled in response to the dispenser controller 212 processing an enable command signal. The enable command signal may be transmitted to the cleaner dispensing system 200 from the remote computing device 410 based on establishing the network communication link with the cleaner dispensing system 200 and/or may be transmitted from the electronic device 300 based on user interaction with the electronic device 300, although example embodiments are not limited thereto. The enable command signal may include and/or indicate a command to selectively enable (e.g., unlock) operation of at least the dispenser device 206 of the cleaner dispensing system 200. For example, the enable command signal may include a command to close a power supply switch of the cleaner dispensing system 200 to enable a supply of electrical power to the dispenser device 206. In another example, the apparatus enable command signal may include a command to initialize, enable, etc. a timer that is used to determine whether to operate (e.g., actuate) the dispenser device 206.

If operation of the dispenser device 206 is inhibited (S522=NO), for example in response to a determination that no enable command signal is received within a particular fixed period of time (e.g., 5 seconds, 24 hours, etc.) of the determination at S522, the process repeats. In response to a determination that operation of the dispenser device 206 is enabled (S522=YES), for example in response to a determination that an enable command signal is received within a particular fixed period of time (e.g., 5 seconds, 24 hours, etc.) of the determination at S522, at S524 the dispenser controller 212 causes at least the dispenser device 206 to be selectively enabled (e.g., activated, initialized, "unlocked", etc.). Such selective enablement of at least the dispenser device 206 may include one or more of closing an electrical switch to enable a supply of electrical power to the dispenser device 206, re-setting a timer value of a timer as described herein to an initial value (e.g., a timer value of zero) and activating the timer to begin counting (e.g., incrementing) a timer value thereof at a particular (e.g., fixed) frequency, setting or re-setting a counter value of a counter as described herein to an initial counter value (e.g., a counter value of zero) and activating the counter to increment in response to each successive operation (e.g., actuation) of the dispenser device 206, configuring the dispenser controller 212 to operate (e.g., actuate) the dispenser device 206 in response to commands to operate the dispenser device, or any combination thereof. Some or all above-noted operations described above to be included in the selective enablement at S524 may be referred to interchangeably as being performed in response to the selective enablement. For example, the cleaner dispensing system 200 may, at S524, set or re-set the counter value of the counter to the initial counter value in response to selectively enabling operation of at least the dispenser device 206.

At S524, the dispenser controller 212 causes the timer (which may be implemented by the controller) to reset the timer value thereof to an initial timer value (e.g., zero) so that the timer may count (e.g., increment) from the initial timer value. At S526, the timer of the dispenser controller 212 may count (e.g., increment the timer value at a fixed frequency) from the initial timer value (e.g., 0) at a particular frequency (e.g., one increment per 24 hours). At S528, the dispenser controller 212 compares the present (e.g., incremented) timer value with a threshold (e.g., particular) timer value (e.g., 7 days) that may be stored at the dispenser controller 212 and determines whether the present timer value has reached (e.g., is equal to or greater than) a threshold timer value (which may be stored at a memory of the dispenser controller 212. The threshold time value (e.g., the magnitude of said value) may be the dispensing time interval TTV, but example embodiments are not limited thereto. If the present timer value has not reached the threshold timer value (e.g., the dispensing time interval) (S528=NO), the dispenser controller 212 permits the timer to continue to increment at S526. If so (S528=YES), at S530 the dispenser controller 212 operates (e.g., actuates) the selectively-enabled dispenser device 206 (e.g., causes electrical power to be supplied to the dispenser device 206 to cause the dispenser device 206 to operate, actuate, etc.) for a particular period of time (e.g., the dispensing duration) to cause the dispenser device 206 to dispense (e.g., pump, supply, etc.) a particular amount of cleaning composition 230 (e.g., 3 oz) through the outlet 208 of the cleaner dispensing system 200, thereby operating the dispenser device 206 for a dispensing duration in response to an elapse of a particular period of time (dispensing time interval).

The threshold timer value may be the dispensing timer value that may be at least a part of a dispenser parameter of the cleaner dispensing system 200, such that the threshold time value may be determined (e.g., set, established, etc.) by one or more geographic parameter values and may be adjusted based on updates or adjustments to the one or more geographic parameter values. The operating at S530 may include operating (e.g., actuating) the dispenser device 206 for a particular duration of time, which may correspond to causing a particular amount of cleaning composition 230 to be dispensed by the dispenser device 206. The particular duration may be the dispensing duration that may be at least a part of a dispenser parameter of the cleaner dispensing system 200, such that the dispensing duration may be determined (e.g., set, established, etc.) by one or more geographic parameter values and may be adjusted based on updates or adjustments to the one or more geographic parameter values.

At S532, in response to the operating at S530, the dispenser controller 212 causes the counter (which may be implemented by the dispenser controller 212) to count (e.g., increment) the counter value, thereby tracking a quantity of dispenser device operations, dispsensings, actuations, or the like and thus tracking a cumulative amount of cleaning composition 230 that is dispensed during the period in which the dispenser device 206 is enabled (e.g., unlocked).

At S534, the dispenser controller 212 compares the present (e.g., incremented at S532) counter value with a first threshold (e.g., particular) counter value (e.g., 11) that may be stored at the dispenser controller 212 and determines whether the present counter value (e.g., as incremented at S532) has reached (e.g., is equal to or greater than) the first threshold counter value. If not (S534=NO), the dispenser controller 212 proceeds to S540 to reset the timer value and then resume incrementing of the timer value at S526. If so (S534=YES), at S536 a further determination is made regarding whether the present counter value is equal or greater than a second threshold counter value which may be a final depletion threshold counter value (e.g., 12) that is greater than the first threshold counter value and indicates complete depletion (e.g., final depletion) of cleaning composition 230 held in the cleaning composition supply source 204 (e.g., reservoir and/or detachable cartridge) of the cleaner dispensing system 200.

In some example embodiments, the operations performed at S524 to S536 may encompass an operation of controlling the cleaner dispensing system 200 to repeatedly (e.g., iteratively) operate the dispenser device 206 to repeatedly (e.g., iteratively) dispense cleaning composition 230 received at the dispenser device 206 from the cleaning composition supply source 204 in response to each elapse of a dispensing time interval. Such an operation may terminate upon a determination that the second threshold counter value is reached (S536=YES). It will be understood that the cleaner dispensing system 200 may transmit one or more update signals to a remote computing device 410 via network communication link 710 in response to performing one or more of operations S524-S536, including for example in response to an incrementing of the counter value at S532, to enable the remote computing device 410 to maintain a present indication of the present counter value and thus an indication of the amount of dispensing operations and/or the amount of cleaning composition remaining with regard to the cleaning composition supply source 204 (e.g., the number of remaining dispensing associated with the cleaning composition supply source 204 may be a difference between the present counter value and the first threshold counter value).

If the present counter value is not equal to or greater than the first threshold counter value, thereby indicating that the present counter value at least meets a second threshold counter value indicating that the cleaning composition supply source 204 is partially depleted but not totally depleted, (S534=YES and S536=NO, e.g., a second "partial depletion" threshold counter value of 11 is determined to be reached at S534 but the first "final depletion" threshold counter value of 12 is determined to not be reached at S536), then at S538 the dispenser controller 212 transmits a warning signal (which may also be referred to interchangeably herein as an partial depletion signal, an order command signal, a warning/order signal, or the like) to the remote computing device 410 via the network communication link 710 and may then proceed to S540 to reset the timer value to the initial time value and then resume incrementing of the timer value at S526. The remote computing device 410 may execute a purchase and/or delivery order to cause additional cleaning composition (e.g., a replacement cartridge) to be delivered to the geographic location of the cleaner dispensing system 200 in response to receiving the warning signal.

If, at S536, the dispenser controller 212 determines that the threshold counter value that is reached by the present counter value at S532 includes (e.g., is equal to or greater than) a second threshold counter value (e.g., 12) that indicates complete depletion (e.g., final depletion) of cleaning composition 230 at the cleaning composition supply source 204 (e.g., S536=YES), at S542 the dispenser controller 212 inhibits (e.g., deactivates, "locks", disables etc.) at least the dispenser device 206 of the cleaner dispensing system 200 to prevent further operation of the dispenser device 206 in response to a present timer value, manual dispensing command, or the like. As described with regard to S522, such inhibiting of at least the dispenser device 206 may include disabling a supply of electrical power to the dispenser device, disabling the timer used as described herein to trigger operation of the dispenser device 206, configuring the dispenser controller 212 to ignore commands to operate (e.g., actuate) the dispenser device 206, or the like.

Accordingly, as shown at S524-S542, the cleaner dispensing system may, at S524, set a counter value of a counter to an initial counter value in response to the selectively enabling the operation of at least the dispenser device 206, operate the dispenser device at S530 at a dispensing time interval and for a dispensing duration, both of which may be included in the geographic parameter value, subsequently to the selectively enabling the operation of the dispenser device 206, to dispense the cleaning composition, increment the counter value at S532 in response to each operation of the dispenser device 206 to dispense the cleaning composition 230, and selectively inhibit operation of at least the dispenser device 206 at S542, in response to a determination at S536 that the counter value at least meets a second threshold counter value associated with depletion of the cleaning composition 230 at the cleaner dispensing system 200.

In some example embodiments, the second threshold counter value at S536 indicates that the remaining amount of cleaning composition 230 at the cleaner dispensing system 200 is at or below a threshold amount and is greater than a complete depletion (e.g., null value) of cleaning composition 230 at the cleaner dispensing system 200, such that there is at least some cleaning composition 230 remaining in the cleaning composition supply source 204 when the first threshold counter value is reached (S536=YES) and the cleaner dispensing system 200 responsively selectively inhibits operation of at least the dispenser device 206 at S542. As a result, the cleaner dispensing system 200 may prevent the cleaner dispensing system 200 from becoming completely depleted of cleaning composition 230 based on causing selectively inhibited operation of at least the dispenser device 206 prior to such complete depletion occurring due to excessive operation of the dispenser device 206.

In response to the dispenser device 206 being inhibited at S542, at S544 the dispenser controller 212 transmits an inhibit signal indicating that at least the dispenser device 206 of the cleaner dispensing system 200 is inhibited (locked), such that the cleaner dispensing system 200 itself is inhibited. The dispenser controller 212 may cause the inhibit signal to be transmitted to the remote computing device 410 via the network communication link 710 to inform the remote computing device 410 that the final depletion threshold counter value (e.g., second threshold counter value) is reached (indicating that the cleaner dispensing system 200 is depleted of cleaning composition 230) and to further indicate that at least the dispenser device 206 of the cleaner dispensing system 200 is presently inhibited. The remote computing device 410 may respond to such an inhibit signal by providing a notification to a user (e.g., a user supported by the electronic device 300 via a user interface 308).

In response to the dispenser device 206 being inhibited at S542 and/or the inhibit signal being transmitted at S544, the method implemented by the dispenser controller 212 at FIG. 6 may then return to S522 to await a new enable command signal.

Figure 7:
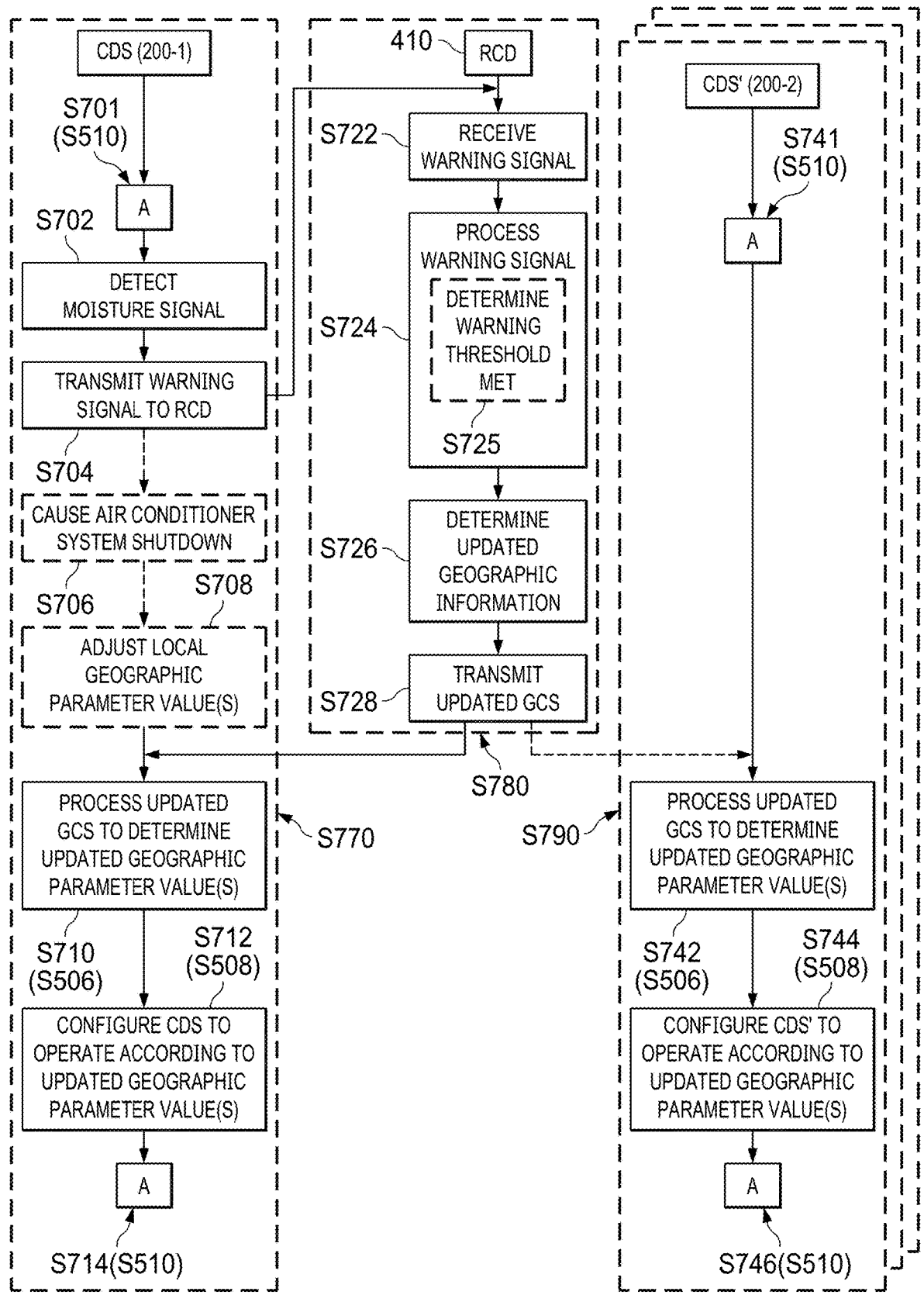
FIG. 7 is a flowchart illustrating methods of operation of a cleaner dispensing system and a remote computing device, according to some example embodiments.
Figure 8A:
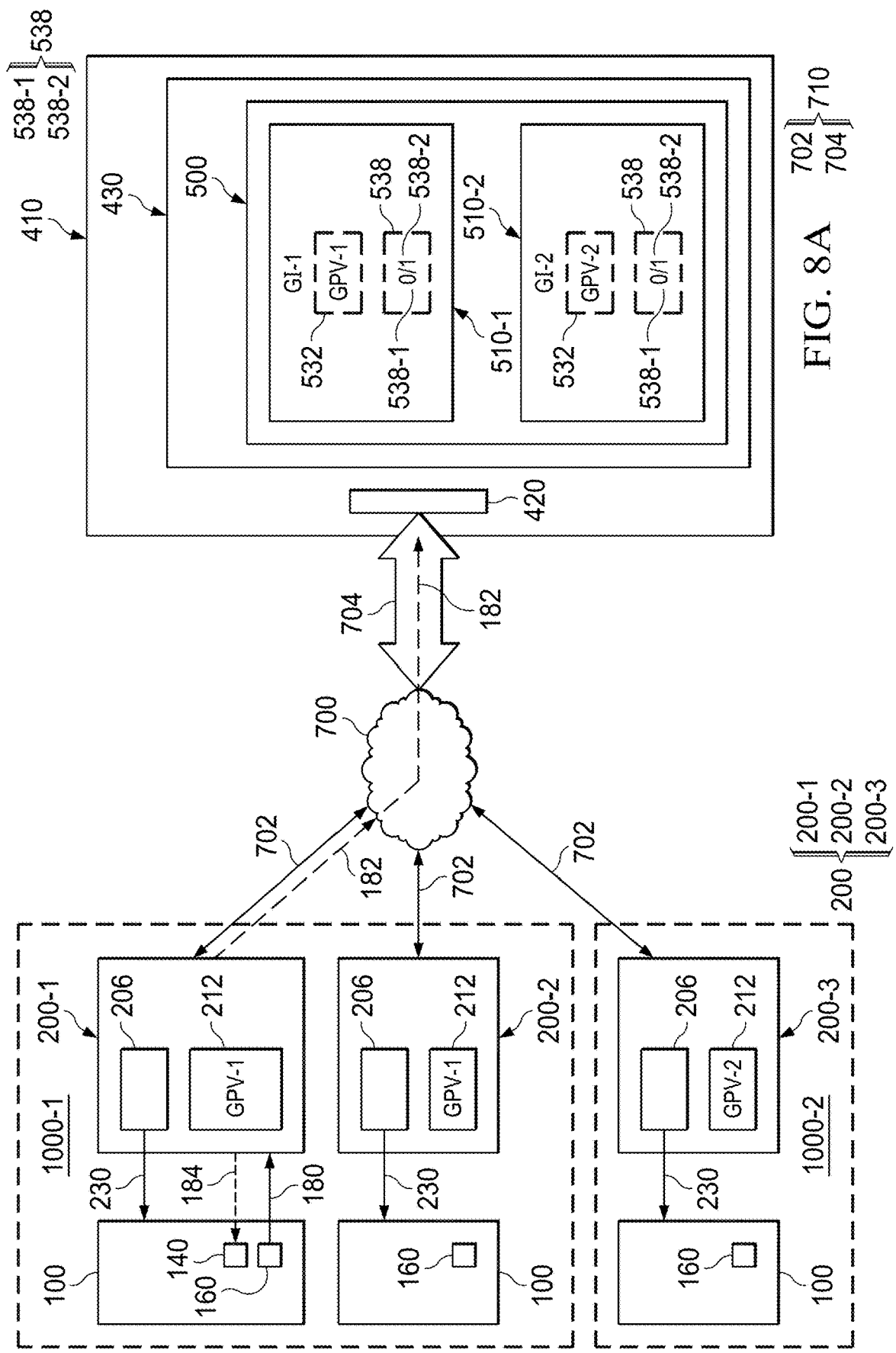
FIGS. 8A and 8B are schematic diagrams of a system including a cleaner dispensing system, a remote computing device, and a communication network, according to some example embodiments.
Figure 8B:
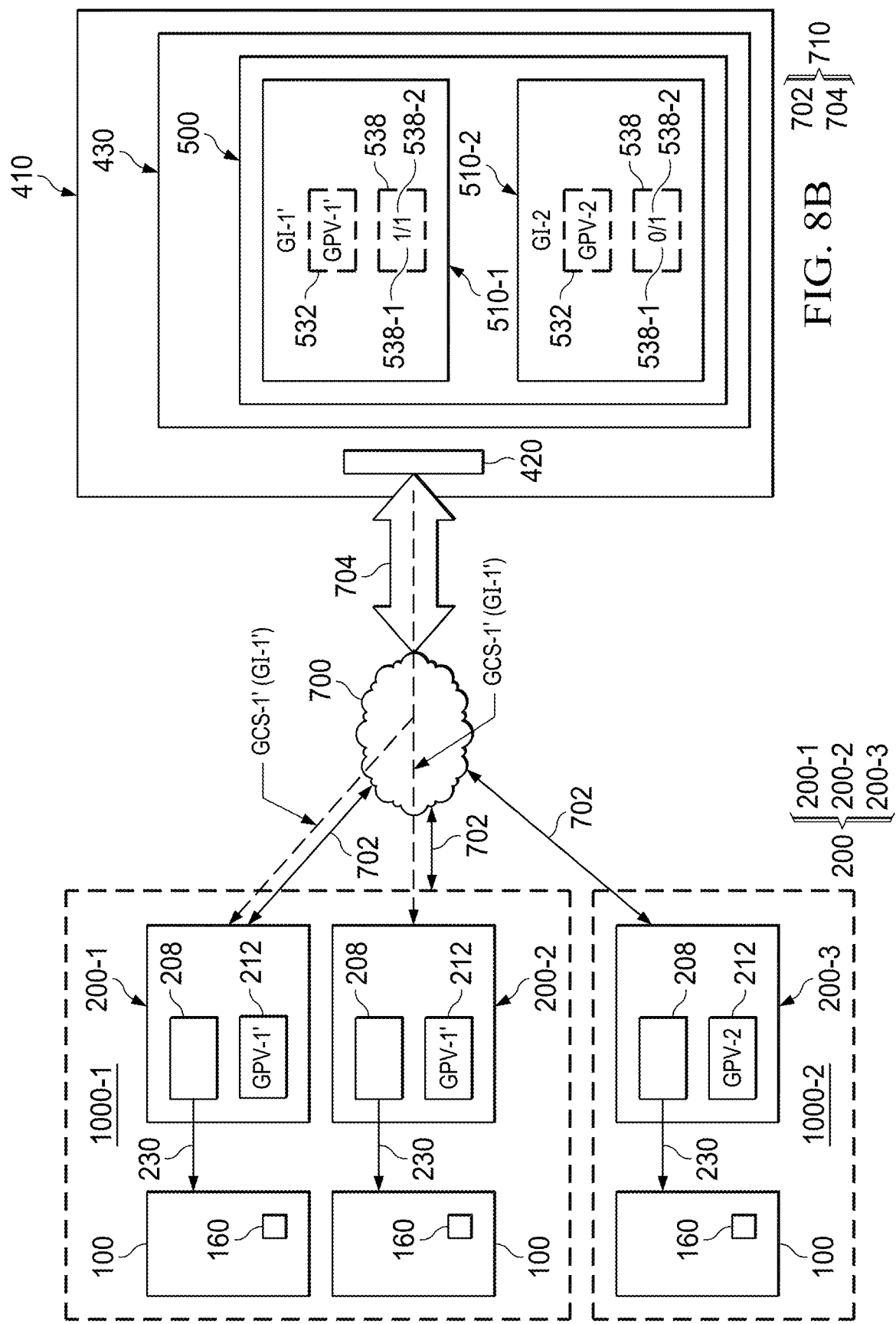

FIG. 7 is a flowchart illustrating methods of operation of a cleaner dispensing system and a remote computing device, according to some example embodiments. FIGS. 8A and 8B are schematic diagrams of a system including a cleaner dispensing system, a remote computing device, and a communication network, according to some example embodiments. The methods shown in FIG. 7 may be implemented by any example embodiment of a system 10, a cleaner dispensing system 200, and/or a remote computing device 410, or any portion thereof according to any example embodiments. It will be understood that operations of the methods shown in FIG. 7 may be changed in order relative to what is shown in FIG. 7. It will further be understood that one or more operations of any of the methods shown in FIG. 7 may be omitted from the respective methods shown in FIG. 7. It will further be understood that one or more operations may be added to any of the methods shown in FIG. 7.

Separate operations of the methods shown in FIG. 7 may be performed by separate devices. For example, operations performed by a first cleaner dispensing system 200-1 ("CDS") are included as part of operation S770, operations performed by the remote computing device 410 ("RCD") are included as part of operation S780, and operations performed one or more separate cleaner dispensing systems CDS' (e.g., 200-2) are included as part of one or more operations S790. Operations performed by a cleaner dispensing system CDS (e.g., 200-1) as part of operation S770, operations performed by a remote computing device 410 (RCD) as part of operation S780, and/or operations performed by one or more separate cleaner dispensing systems CDS' (e.g., 200-2) as part of one or more operations S790 may be performed at least partially concurrently.

Referring back to FIG. 1, in some example embodiments, a cleaner dispensing system CDS (e.g., a cleaner dispensing system 200) may be configured to be electrically coupled to a moisture sensor 160 of and/or associated with an air conditioning system 100. Such a moisture sensor 160 may include any known moisture sensor, including for example a float switch. The cleaner dispensing system 200 may be configured to detect a signal transmitted by the moisture sensor 160, where the signal is transmitted from the moisture sensor 160 in response to a presence of a fluid (e.g., condensate) at the moisture sensor 160 (e.g., a presence if condensate at the moisture sensor 160 causing the moisture sensor 160 to close or open an electrical switch to close or open an electrical circuit that includes the moisture sensor 160 and the controller 140 of the air conditioning system 100, where a current through the closed circuit or an absence of current through the opened circuit may be referred to as a signal transmitted by the moisture sensor 160).

Referring to FIGS. 8A and 8B, the signal transmitted by the moisture sensor 160 of and/or associated with an air conditioning system 100 and detected by a cleaner dispensing system 200 configured to support the air conditioning system 100 (which may be referred to as a corresponding local air conditioning system 100 supported by the cleaner dispensing system 200) may be referred to herein as a moisture signal 180 and may be interchangeably referred to as a condensate overflow signal, a condensate backflow signal, or the like.

Still referring to FIG. 1, the cleaner dispensing system 200 may be electrically coupled to the controller 140 of the air conditioning system 100. In some example embodiments, the cleaner dispensing system 200 may be electrically coupled to both the moisture sensor 160 and the controller 140 to configure the cleaner dispensing system 200, the controller 140, and the moisture sensor 160 to be in a common electrical circuit. In response to detecting receipt of the moisture signal 180, the cleaner dispensing system 200 may transmit a signal (e.g., a shutdown signal 184) to the controller 140 to cause the controller 140 to at least partially shut down (e.g., deactivate) the air conditioning system. For example, the cleaner dispensing system 200 may electrically couple the moisture sensor 160 to the controller 140 through at least a portion of the cleaner dispensing system 200, such that the cleaner dispensing system 200 may be configured to pass (e.g., forward) a moisture signal 180 received from the moisture sensor 160 to the controller 140 so that the moisture signal 180 partially or entirely comprises the shutdown signal 184 and the controller 140 processes the moisture signal 180 and/or the shutdown signal 184 to at least partially shut down (e.g., deactivate) the air conditioning system 100.

Referring now to FIGS. 7 and 8A-8B, a cleaner dispensing system 200 may, in response to detecting receipt of a moisture signal 180 transmitted from a moisture sensor 160 of an/do associated with the local air conditioning system 100 supported by the cleaner dispensing system 200, and in addition or alternative to transmitting a shutdown signal 184 to the controller 140 to cause at least partial shutdown of the air conditioning system 100, transmit a warning signal (referred to herein as a moisture warning signal 182 and which may be interchangeably referred to as a condensate overflow warning signal, a condensate backflow warning signal, or the like) to the remote computing device 410. Such a moisture warning signal 182 may indicate that the moisture signal 180 is received from the moisture sensor 160 (thereby indicating a presence of a fluid in at least a portion of the air conditioning system 100 at the geographic location of the cleaner dispensing system 200). Such a moisture warning signal 182 may indicate that the corresponding local air conditioning system 100 supported by the cleaner dispensing system 200 that transmits the moisture warning signal 182 is at least partially shut down (e.g., deactivate) due to the moisture signal 180 transmission by the moisture sensor 160 at and/or associated with the corresponding local air conditioning system 100.

In some example embodiments, the remote computing device 410 is configured to adjust, change, and/or update the geographic information associated with a geographic location (e.g., at least a portion of an entry 510 of geographic information associated with the geographic location), including, for example one or more geographic parameter values included in geographic parameter values data 532 associated with the geographic location, based on receiving and processing a moisture warning signal 182 from a cleaner dispensing system 200 at the geographic location to determine that an accumulation of fluid (e.g., condensate) has occurred at an air conditioning system at the geographic location. The remote computing device 410 may, based on such a determination, adjust, change, and/or update the geographic information (e.g., the one or more geographic parameter values included in the geographic parameter value data 532) associated with the geographic location and transmit an updated geographic control signal (referred to herein interchangeably as an "update signal") that includes at least a portion of the updated geographic information (e.g., one or more updated geographic parameter values) in order to reduce, minimize, or prevent the likelihood of additional condensate accumulations that may trigger moisture signal 180 transmission at one or more air conditioning systems 100 located at the geographic location 1000 from which the moisture warning signal 182 is initially received.

Referring now to FIG. 7 and FIG. 8A, at S701 a given cleaner dispensing system ("CDS", for example the first cleaner dispensing system 200-1 shown in FIGS. 8A-8B) at a geographic location may operate according to one or more particular geographic parameter values ("GPV") that are associated with the geographic location. Such a process of operation, represented by block "A" in FIG. 7, is illustrated and described in further detail with regard to FIG. 6. The cleaner dispensing system 200 in a given geographic location may be configured to so operate according to at least a portion of the method described with reference to FIG. 5.

As described herein, it will be understood that a geographic location may include a geographic region, including for example a region indicated by a neighborhood, a physical mailing address a postal code, a city, a state, a nation, or the like, and therefore multiple cleaner dispensing systems 200 and respective corresponding local air conditioning systems 100 supported thereby may be located in a common ("same") geographic location and thus may be configured to operate according to a common ("same") geographic parameter value. For example, as shown in FIG. 8A, the first and second cleaner dispensing systems 200-1 and 200-2 may be located in (e.g., located at) a first geographic location 1000-1 and the respective dispenser controllers 212 thereof may be configured to operate the respective dispenser devices 206 thereof according to one or more first geographic parameter values GPV-1 that are associated with the geographic location 1000-1, and a separate cleaner dispensing system 200-3 may be located in a second geographic location 1000-2 and the respective dispenser controller 212 thereof may be configured to operate the respective dispenser device 206 thereof according to one or more second geographic parameter values GPV-2 that are associated with the geographic location 1000-2 and may be different from the one or more first geographic parameter values GPV-1. As shown, the cleaner dispensing systems 200 may be communicatively coupled to a remote computing device 410, and the remote computing device 410 may store entries 510-1 and 510-2 of geographic information GI-1 and GI-2 associated with the first and second geographic locations 1000-1 and 1000-2, respectively. As described with reference to at least FIGS. 2 and 5 above, the remote computing device 410 may be configured to transmit separate geographic control signals GCS-1 and GCS-2 to the cleaner dispensing systems 200 in the separate, respective geographic locations 1000-1 and 1000-2 where the separate geographic control signals GCS include separate, respective geographic information GI-1 and GI-2, respectively, associated with the respective geographic locations 1000-1 and 1000-2 and which may be processed by the cleaner dispensing systems 200 in the separate, respective geographic locations 1000-1 and 1000-2 to cause the first and second cleaner dispensing systems 200-1 and 200-2 to be configured to operate according to the one or more first geographic parameter values GPV-1 and the third cleaner dispensing system 200-3 to be to be configured to operate according to the one or more second geographic parameter values GPV-2.

At S702, a cleaner dispensing system CDS (e.g., 200-1 in FIG. 8A) may detect a moisture signal 180 received from (e.g., transmitted by, transmitted from, etc.) an electrically coupled (e.g., via a wired electrical connection) moisture sensor 160 of and/or associated with the corresponding local air conditioning system 100 supported by the cleaner dispensing system 200. In some example embodiments, a moisture signal 180 may be transmitted by as few as a single moisture sensor 160 of a single air conditioning system 100 of system 10 and may be detected by a single cleaner dispensing system 200 supporting the single air conditioning system 100, while other cleaner dispensing systems 200 in system 10 may not receive any moisture signals 180. For example, in some example embodiments where at least one cleaner dispensing system 200 in a geographic location 1000 does detect a moisture signal 180, one or more other cleaner dispensing systems 200 (e.g., at least one separate cleaner dispensing system 200, represented in FIG. 7 as CDS') located at the same geographic location 1000, and which may support separate, respective air conditioning systems 100, may not detect a moisture signal 180 at the same time or at approximately the same time that the at least one cleaner dispensing system 200 detects the moisture signal 180 and may operate the respective dispenser device(s) 206 thereof at S741 according to one or more particular geographic parameter values ("GPV") that are associated with the geographic location, similarly to the operation at S701 of the cleaner dispensing system CDS prior to the cleaner dispensing system's CDS receipt of the moisture signal 180 at S702, and similarly to the process S510 as shown in FIG. 6.

For example, as shown in FIG. 7 and FIG. 8A, the first cleaner dispensing system 200-1 at the first geographic location 1000-1 may, at S702, detect a moisture signal 180 transmitted from a moisture sensor 160 of and/or associated with the corresponding local air conditioning system 100 supported by the first cleaner dispensing system 200-1, where such moisture signal 180 may be transmitted based on a presence of a fluid at the moisture sensor 160 of the air conditioning system 100 supported by the first cleaner dispensing system 200. As shown, at least one separate cleaner dispensing system, including the second cleaner dispensing system 200-2 at the same geographic location 1000-1 and the third cleaner dispensing systems 200-3 at a different, second geographic location 1000-2, may not detect any moisture signal 180 at or about at the same time that the first cleaner dispensing system 200-1 detects the moisture signal 180.

At S704, a cleaner dispensing system CDS (e.g., 200-1 in FIG. 8A) may, in response to detecting a moisture signal 180, transmit a moisture warning signal 182 to the remote computing device 410 via a network communication link 710. At S706, the cleaner dispensing system 200 may, in response to detecting a moisture signal 180, cause the local air conditioner system supported by the cleaner dispensing system 200 to at least partially shutdown, for example based on transmitting a shutdown signal 184 (e.g., based on forwarding the moisture signal 180 via a wired electrical connection) to the controller 140 of the local air conditioning system 100 to cause the controller 140 thereof to initiate the shutdown.

For example, as shown in FIG. 8A, the first cleaner dispensing system 200-1 at the first geographic location 1000-1 may, in response to detecting the moisture signal 180 transmitted from a moisture sensor 160 of and/or associated with the corresponding local air conditioning system 100 supported by the first cleaner dispensing system 200-1, transmit a moisture warning signal 182 to the remote computing device 410 via network communication link 710. As further shown, the first cleaner dispensing system 200-1 may transmit a shutdown signal 184 to the controller 140 of the local air conditioning system 100 supported by the first cleaner dispensing system 200-1, although example embodiments are not limited thereto.

At S708, the cleaner dispensing system CDS (e.g., 200-1 in FIG. 8A) may, in response to detection of the moisture signal 180 at S702, adjust (e.g., change, update, etc.) one or more geographic parameter values that are stored locally at the cleaner dispensing system 200 and are used by the dispenser controller 212 thereof to operate the dispenser device 206 thereof. Such updating of the one or more "local" geographic parameter values may be performed in the absence of a geographic control signal from the remote computing device 410, such that the adjustment ("updating") is performed locally at the cleaner dispensing system 200. However, it will be understood that example embodiments are not limited thereto at one or both of S706 and/or S708 may be omitted.

At S722, and as shown in FIG. 8A, the remote computing device 410 receives a moisture warning signal 182 from a cleaner dispensing system (e.g., 200-1 in FIG. 8A). At S724, the remote computing device 410 processes the received moisture warning signal 182 to determine whether to adjust (e.g., update) the geographic information GI associated with the geographic location of the cleaner dispensing system 200 from which the moisture warning signal 182 is received. For example, referring to FIG. 8A, the remote computing device 410 may, in response to receiving the moisture warning signal 182 from the first cleaner dispensing system 200-1, process said moisture warning signal 182 to determine whether to adjust ("update") the geographic information GI-1 associated with the first geographic location 1000-1 in which the first cleaner dispensing system 200-1 is located.

In some example embodiments, the processing at S724 to determine whether to update the geographic information associated with a geographic location (e.g., GI-1 associated with geographic location 1000-1) may include determining at S725 whether at least a threshold quantity and/or frequency (quantity in a certain time period) of moisture warning signals are received from one or more cleaner dispensing systems 200 in the same geographic location (e.g., 1000-1), for example within a certain period of time (e.g., a rolling 7-day period, a 30-day period, etc.). For example, as shown in FIG. 8A, each entry 510 of geographic information associated with a respective geographic location may include moisture warning signal data 538 indicating a frequency of moisture warning signals actually received from one or more cleaner dispensing systems located in the respective geographic location within a certain time period and may further indicate a threshold quantity and/or frequency of moisture warning signals corresponding to initiating an update of at least a portion of the geographic information (e.g., one or more geographic parameter values) associated with the geographic location.

As shown in FIG. 8A, each entry of moisture warning signal data 538 in an entry 510 of geographic information 510-1 or 510-2 associated with a given geographic location 1000-1 or 1000-2 may include frequency data 538-1 indicating a frequency (or quantity) of moisture warning signals 182 actually received from cleaner dispensing systems 200 located in the given geographic location in the last 7 days (the frequency 538-1 shown to be "0" for each of the geographic information entries 510-1 and 510-2 for geographic locations 1000-1 and 1000-2 in FIG. 8A, which is considered to be the respective frequencies prior to the receipt of the moisture warning signal 182 from the first cleaner dispensing system 200-1 at the remote computing device 410 as shown in FIG. 8A). As further shown, each entry of moisture warning signal data 538 may further include threshold data 538-2 indicating a threshold frequency (or quantity) of moisture warning signals 182 actually received from cleaner dispensing systems 200 located in the given geographic location in the last 7 days that will trigger an update of at least a portion of the geographic information associated with the geographic location, such as one or more geographic parameter values thereof (the threshold shown to be "1" for each of the geographic information entries 510-1 and 510-2 for geographic locations 1000-1 and 1000-2 in FIG. 8A).

As shown in FIG. 8B, in response to receiving the moisture warning signal 182 from the first cleaner dispensing system 200-1 located in the first geographic location 1000-1, the remote computing device 410 updates the frequency data 538-1 associated with the first geographic location in entry 510-1 to be "1" to indicate that at least one moisture warning signal 182 has been received from one or more cleaner dispensing systems 200 located in ("located at") the first geographic location 1000-1 within the certain time period (e.g., the last 7 days). As shown, such a frequency meets the threshold of "1" indicated by the threshold data 538-2 for the same geographic location 1000-1. In response to determining that the frequency indicated by the frequency data 538-1 for a given geographic location at least meets the threshold indicated by the threshold data 538-2 for the given geographic location, the remote computing device 410 may determine to update at least a portion of the geographic information (e.g., the one or more geographic parameter values GPV-1) associated with the first geographic location 1000-1.

At S726, in response to a determination being made to adjust the geographic information associated with the geographic location, the remote computing device 410 determines updated geographic information associated with the geographic location. In some example embodiments, where the geographic information associated with a geographic location (which may be included in a database entry 510 associated with the geographic location) includes one or more geographic parameter values included in geographic parameter value data 532 of an entry 510 of geographic information associated with the geographic location, the updating of the geographic information at S726 may include adjusting or updating (e.g., incrementing by a fixed amount) one or more geographic parameter values (GPV) associated with the geographic location in the geographic parameter value data 532 to generate one or more updated geographic parameter values (GPV').

The adjustment and/or updating of one or more geographic parameter values at S726 and/or S708 may include incrementing a value of the one or more geographic parameter values. For example, in example embodiments where a geographic parameter value associated with a geographic location includes a value indicating a magnitude of a dispensing time interval between operations of the dispenser device 206 and/or a value indicating a magnitude of a dispensing duration of operation of the dispenser device 206, the adjusting of the geographic parameter value may include incrementing said value(s) by a particular (e.g., fixed amount), for example reducing the dispensing time interval value by 10%, 12 hours, etc., in another example increasing the dispensing duration value by 10%, 2 seconds, etc. Such adjustments (e.g., updates) to the geographic parameter value(s) may be configured to reduce the likelihood of further and/or future accumulations of biological material at a local air conditioning system 100 that is supported by a cleaner dispensing system 200 in the geographic location, thereby reducing the likelihood of further and/or future accumulations of condensate to cause further/future triggering of the local moisture sensor 160 to transmit moisture signals in the geographic location.

For example, referring to FIG. 8B, the remote computing device 410 may process the moisture warning signal 182 received from the first cleaner dispensing system 200-1 located at the first geographic location 1000-1, to determine that the frequency of moisture warning signals received from cleaner dispensing systems 200 in the first location 1000-1 in a certain time period (e.g., 7 days) as indicated by frequency data 538-1 at least meets the corresponding threshold indicated by threshold data 538-2 as included in the entry 510-1 of geographic information associated with the geographic location 1000-1. In response to such a determination, the remote computing device 410 may determine to update at least a portion of the geographic information GI-1 associated with the first geographic location 1000-1 to become updated first geographic information GI-1'. As shown, such updating may include updating (e.g., changing, incrementing) one or more first geographic parameter values GPV-1 associated with the first geographic location, included in the geographic parameter value data 532 in entry 510-1, to become one or more updated first geographic parameter values GPV-1'. Such updating may include, for example, incrementing a given geographic parameter value of the one or more first geographic parameter values GPV-1 by a particular, fixed amount. For example, where the one or more first geographic parameter values GPV-1 included in the geographic parameter value data 532 in entry 510-1 includes a value indicating a magnitude of a dispensing time interval, the updating at S726 may include incrementing such a value by a particular (e.g., fixed amount), for example reducing the dispensing time interval value by 10%, 12 hours, etc. In another example, where the one or more first geographic parameter values GPV-1 included in the geographic parameter value data 532 in entry 510-1 includes a value indicating a magnitude of a dispensing duration, the updating at S726 may include incrementing such a value by a particular (e.g., fixed amount), for example increasing the value by 10%, 2 seconds, etc. The one or more updated (e.g., incremented) geographic parameter values GPV-1' may be included in the geographic parameter value data 532 in entry 510-1 of geographic information associated with the first geographic location 1000-1, now understood to be "updated" geographic information GI-1'.

As shown in FIGS. 7 and 8B, at S728 the remote computing device 410 may transmit an updated geographic control signal (also referred to herein as an update signal) that includes the updated geographic information (including, in some example embodiments, one or more updated geographic parameter values) to the cleaner dispensing system CDS (e.g., 200-1 in FIG. 8A) from which the moisture warning signal 182 is received via a network communication link 710. At S710, the cleaner dispensing system CDS (e.g., 200-1 in FIG. 8A) may receive and process the updated geographic control signal to determine one or more updated geographic parameter values associated with the geographic location of the cleaner dispensing system (CDS) (for example for example based on performing the process as described with regard to S506 in FIG. 5). At S712, the cleaner dispensing system ("CDS") may configure the cleaner dispensing system (e.g., a dispenser controller 212 thereof may configure the cleaner dispensing system and/or dispenser controller thereof, e.g., configure itself) to operate the dispenser device 206 thereof according to the updated one or more geographic parameter values, thereby configuring the cleaner dispensing system CDS to dispense cleaning composition 230 in a manner that is configured to reduce the risk of future/further triggering of the local moisture sensor(s) 160 (for example based on performing the process as described with regard to S508 in FIG. 5). The cleaner dispensing system may then operate the dispenser device according to process S714 which may correspond to performing process S510 as described herein (e.g., with reference to FIG. 6).

For example, referring to FIG. 8B, the remote computing device 410 may update at least a portion of the geographic information GI-1 associated with the first geographic location 1000-1 based on processing a moisture warning signal 182 received from the first cleaner dispensing system 200-1 located in the first geographic location 1000-1. The updated geographic information GI-1 may be referred to as updated geographic information GI-1', and the entry 510-1 of geographic information GI-1 may thus be understood to be updated to be an entry of geographic information GI-1'. The updating of the entry may include updating the geographic parameter value data 532 in entry 510-1 to include one or more updated first geographic parameter values GPV-1' that may be updated based on performing S724 and S726 as described above.

As shown in FIG. 8B, the remote computing device 410 may transmit an updated geographic control signal GCS-1' (also referred to herein as an update signal) to the first cleaner dispensing system 200-1 based on updating the geographic information (GI-1') associated with the first geographic location 1000-1 further based on processing the moisture warning signal 182 received at the remote computing device 410 from the first cleaner dispensing system 200. The updated geographic control signal GCS-1' may include at least a portion of the updated geographic information GI-1' associated with the first geographic location 1000-1, including for example the one or more updated first geographic parameter values GPV-1', but example embodiments are not limited thereto. The first cleaner dispensing system 200-1 (e.g., the dispenser controller 212 thereof) may process the updated geographic control signal GCS-1' to determine the updated one or more first geographic parameter values GPV-1', for example based on performing the process as described with regard to S506 in FIG. 5, based on reading the updated one or more first geographic parameter values GPV-1' included in the updated geographic control signal GCS-1', or the like. The first cleaner dispensing system 200-1 may configure itself (e.g., the dispenser controller 212 thereof may configure the first cleaner dispensing system 200-1) to operate the dispenser device 206 thereof according to the updated one or more first geographic parameter values GPV-1', for example for example based on performing the process as described with regard to S508 in FIG. 5. The first cleaner dispensing system 200-1 may then operate the dispenser device 206 thereof according to the one or more updated geographic parameter values GPV-1' at S714, corresponding to the process S510 shown in FIG. 6.

Still referring to FIGS. 7 and 8B, in response to determining at S725 that the frequency or amount of moisture warning signals received from one or more cleaner dispensing systems 200 at a particular geographic location during a particular time period (e.g., as indicated by frequency data 538-1 in moisture warning signal data 538 of the entry 510 of geographic information associated with the particular geographic location), at least meets a threshold frequency or amount of moisture warning signals received from one or more cleaner dispensing systems 200 at the particular geographic location during the particular time period (e.g., as indicated by threshold data 538-2 in moisture warning signal data 538 of the entry 510 of geographic information associated with the particular geographic location), the remote computing device 410 may update the geographic information associated with that geographic location at S726 to apply to all cleaner dispensing systems 200 located at (located in) that geographic location, including, in some example embodiments, one or more cleaner dispensing systems 200 (e.g., at least one separate cleaner dispensing system) located in that same geographic location (CDS', e.g., 200-2 in FIGS. 8A-8B) and from which no moisture warning signal 182 has been received within the aforementioned particular time period. As a result, and as shown in FIG. 7 and FIG. 8B, in some example embodiments, the transmitting at S728 may include transmitting the updated geographic control signal (e.g., the update signal) that includes the updated geographic information associated with the geographic location from which at least the threshold frequency of moisture warning signals are received to some or all of the cleaner dispensing systems 200 (e.g., at least one separate cleaner dispensing system) located at the geographic location, including both the cleaner dispensing system from which at least one moisture warning signal is received at S722 (CDS) and at least one separate cleaner dispensing system 200 also located at the geographic location and from which no moisture warning signals have been received within the particular time period (CDS').

As a result, at S742, the at least one separate cleaner dispensing system (CDS', e.g., 200-2 in FIGS. 8A-8B), having been operating the respective dispenser devices 206 thereof at S741 (e.g., similarly to performing S510), may receive and process the updated geographic control signal to determine one or more updated geographic parameter values associated with the geographic location of the at least one separate cleaner dispensing system (CDS') (for example for example based on performing the process as described with regard to S506 in FIG. 5). At S744, the at least one separate cleaner dispensing system (CDS') may configure the at least one separate cleaner dispensing system (CDS') (e.g., the dispenser controller 212 thereof may configure itself and/or the at least one separate cleaner dispensing system) to operate the dispenser device 206 thereof according to the updated one or more geographic parameter values, thereby configuring the at least one separate cleaner dispensing system (CDS') to dispense cleaning composition 230 in a manner that is configured to reduce the risk of future triggering of the local moisture sensor(s) 160 (for example for example based on performing the process as described with regard to S508 in FIG. 5), even though the at least one separate cleaner dispensing system (CDS') may not have detected any moisture signals 180 during the particular time period. The at least one separate cleaner dispensing system (CDS') may then operate the dispenser device 206 thereof according to process S746 which may correspond to performing process S510 as described herein (e.g., with reference to FIG. 6).

For example, as shown in FIG. 8B, the updated geographic information GI-1' associated with the geographic location 1000-1 may be transmitted at S728 to both the first cleaner dispensing system 200-1 from which a moisture warning signal 182 is received as shown in FIG. 8A and also to the second cleaner dispensing system 200-2 that is an at least one separate cleaner dispensing system that is also located at the first geographic location 1000-1 but from which no moisture warning signal 182 is received within the particular time period corresponding to the threshold data 538-2 in the entry 510-1 of geographic information associated with the first geographic location 1000-1. As a result, both the first and second cleaner dispensing systems 200-1 and 200-2 may, as shown in FIG. 7 and FIG. 8B, receive and process the updated geographic control signal GCS-1' to determine the one or more updated first geographic parameter values GPV-1', configure the respective cleaner dispensing systems to operate according to the updated one or more first geographic parameter values GPV-1', and operate the respective dispenser devices 206 thereof according to such updated one or more first geographic parameter values GPV-1', based on at least a threshold frequency or quantity of moisture warning signals 182 being received at the remote computing device 410 from the first geographic location 1000-1, even though the second cleaner dispensing system 200-2 may not have transmitted any moisture warning signals 182 to the remote computing device 410. As a result, the occurrence of moisture warning signal transmissions from the first cleaner dispensing system 200-1 may be used to update the operation of the second cleaner dispensing system 200-2 to reduce, minimize or prevent the similar detection of a moisture signal and transmission of a moisture warning signal at the second cleaner dispensing system 200-2, thereby reducing the likelihood of air conditioner system shutdowns at other local air conditioning systems in the first geographic location 1000-1, and further thereby improving operation of the cleaner dispensing systems 200 located in the first geographic location 1000-1 as a whole.

As further shown in FIGS. 8A and 8B, where a system 10 includes multiple geographic locations (e.g., 1000-1 and 1000-2), the remote computing device 410 may update geographic information associated with a particular geographic location (e.g., 1000-1) in response to receiving at least a threshold frequency or amount of moisture warning signals 182 from one or more cleaner dispensing systems in that particular geographic location, but may refrain from updating geographic information associated with other geographic locations for which a threshold frequency of moisture warning signals is not received.

For example, as shown in FIGS. 8A and 8B, the first and second cleaner dispensing systems 200-1 and 200-2 in the first geographic location 1000-1 may operate according to one or more first geographic parameter values GPV-1 of geographic information GI-1 associated with the first geographic location 1000-1, and the third cleaner dispensing system 200-3 in the second geographic location 1000-2 may operate according to one or more second geographic parameter values GPV-2 of geographic information GI-2 associated with the second geographic location 1000-2. In response to receiving a threshold frequency of moisture warning signals 182 from one or more cleaner dispensing systems in location 1000-1 (e.g., from the first cleaner dispensing system 200-1 as shown in FIGS. 8A and 8B), the remote computing device 410 may update the geographic information associated with location 1000-1 to GI-1', which may include updating the one or more first geographic parameter values to GPV-1', and the remote computing device 410 may transmit at least a portion of the updated geographic information GI-1' (e.g., the updated one or more first geographic parameter values GPV-1') specifically to the cleaner dispensing systems in location 1000-1 (e.g., the first and second cleaner dispensing systems 200-1 and 200-2) to cause said cleaner dispensing systems to operate according to the updated geographic parameter value GPV-1', but the remote computing device 410 may refrain from adjusting the geographic information GI-2 and/or one or more geographic parameter values GPV-2 associated with the second geographic location 1000-2 in response to moisture warning signals 182 being received from cleaner dispensing systems 200 located in a separate geographic location. Thus, the remote computing device 410 may refrain from adjusting the geographic information GI-2 and/or one or more geographic parameter values GPV-2 associated with the second geographic location 1000-2 unless and until a threshold frequency of moisture warning signals 182 are received from one or more cleaner dispensing system 200 that are located in the second geographic location 1000-2 (e.g., the third cleaner dispensing system 200-3). However, example embodiments are not limited thereto.

In some example embodiments, the remote computing device 410 may adjust (e.g., update) geographic information (e.g., increment one or more geographic parameter values) associated with geographic locations from which a threshold frequency or amount of moisture warning signals are not received within a particular time period, in response to receiving at least a threshold frequency or amount of moisture warning signals from one or more other geographic locations (e.g., another geographic location that is within a certain proximity, any other geographic location within the system 10, etc.). For example, referring to FIG. 8B, in response to a determination that the geographic proximity of the first and second geographic locations 1000-1 and 1000-2 (e.g., determined based on processing and/or comparing the respective geographic location data 530 included in the respective entries 510-1 and 510-2 of geographic information associated with the first and second geographic locations 1000-1 and 1000-2) is equal to or less than a threshold proximity value (e.g., 10 miles), which may be a threshold value that is stored at a memory of the remote computing device 410, the remote computing device 410 may update (e.g., increment) the geographic information associated with the second geographic location 1000-2 (e.g., increment one or more second geographic parameter values GPV-2 by a fixed amount to arrive at updated one or more second geographic parameter values GPV-2') and transmit an updated geographic control signal including at least a portion of such updated geographic information (e.g., the updated one or more second geographic parameter values GPV-2') to one or more cleaner dispensing systems 200 located in the second geographic location 1000-2 (e.g., the third cleaner dispensing system 200-3) concurrently and/or in response to updating (e.g., incrementing) the geographic information associated with the first geographic location 1000-1 (e.g., incrementing one or more first geographic parameter values GPV-1 by a fixed amount) and transmitting an updated geographic control signal GCS-1' including at least a portion of such updated geographic information (e.g., the updated one or more first geographic parameter values GPV-1') to one or more cleaner dispensing systems 200 located in the first geographic location 1000-1 (e.g., the first and second cleaner dispensing systems 200-1 and 200-2 as shown in FIG. 8B). Accordingly, the operation of cleaner dispensing systems in one or more geographic locations may be updated according to moisture signals 180 being detected, and moisture warning signals 182 being transmitted, at one or more cleaner dispensing systems located at other, separate geographic locations (e.g., separate geographic locations located within a certain proximity), thereby enabling improvement of operation of cleaner dispensing systems in separate geographic locations to reduce, minimize, or prevent moisture signal detections due to condensate backflow in other geographic locations.

In some example embodiments, the determining of updated geographic information associated with a geographic location at S726 may include updating weather data, a database, and/or a model that is associated with the geographic location. For example, as noted above with reference to FIG. 7, geographic information associated with a geographic location may include frequency data 538-1 indicating an amount and/or frequency of moisture warning signals received from one or more cleaner dispensing systems in the geographic location and a time/date of such receipt. In response to a determination at S724 that such amount and/or frequency of moisture warning signals received from one or more cleaner dispensing systems in a geographic location within a certain time (e.g., as indicated by frequency data 538-1) at least meets a threshold amount and/or frequency (e.g., as indicated by threshold data 538-2 associated with the same geographic location in the same entry 510 of geographic information), the updating at S726 may include updating the geographic information (e.g., the weather data) associated with the geographic location to indicate the occurrence of the threshold frequency of moisture warning signals being at least met in the geographic location. Such updating may include updating the geographic information associated with the geographic location (e.g., the weather data thereof) to include data indicating the time and/or date (e.g., particular meteorological season, particular 30-day period or month within a calendar year, particular 7-day period or week within a calendar year etc.) of such threshold being at least met. The updated threshold indication may be included in the inputs applied to a database (e.g., look-up table) and/or model (e.g., machine learning model) to determine updated geographic information (e.g., updated one or more geographic parameter values) associated with the geographic location. In some example embodiments, where the one or more geographic parameter values associated with the geographic location are incremented by a certain value at S726, the weather data associated with the geographic location (which may or may not include the updated threshold indication) and the updated geographic parameter value may be provided as part of updated inputs and outputs, respectively, to a model (e.g., updated training input and output data provided to a machine learning model, such as a DNN) used for the geographic location, in order to "train" the model to determine future geographic parameter value(s) based on future reoccurrence of weather conditions similar to the conditions indicated by such weather data, so as to improve the likelihood that, in response to such reoccurrence, cleaner dispensing systems in the geographic location may be configured to operate according to updated geographic parameter values to reduce the likelihood of reoccurrence of moisture signals being detected at said cleaner dispensing systems. Accordingly, the updating at S726 may include updating a database and/or model associated with the geographic location (e.g., database or model 536) and/or a general database or model 540 that is not specific to any particular geographic location and which may be used to determine geographic information (e.g., one or more geographic parameter values) associated with one or more geographic locations as an output based on providing one or more inputs (e.g., weather data associated with the one or more geographic locations).

Figure 9:
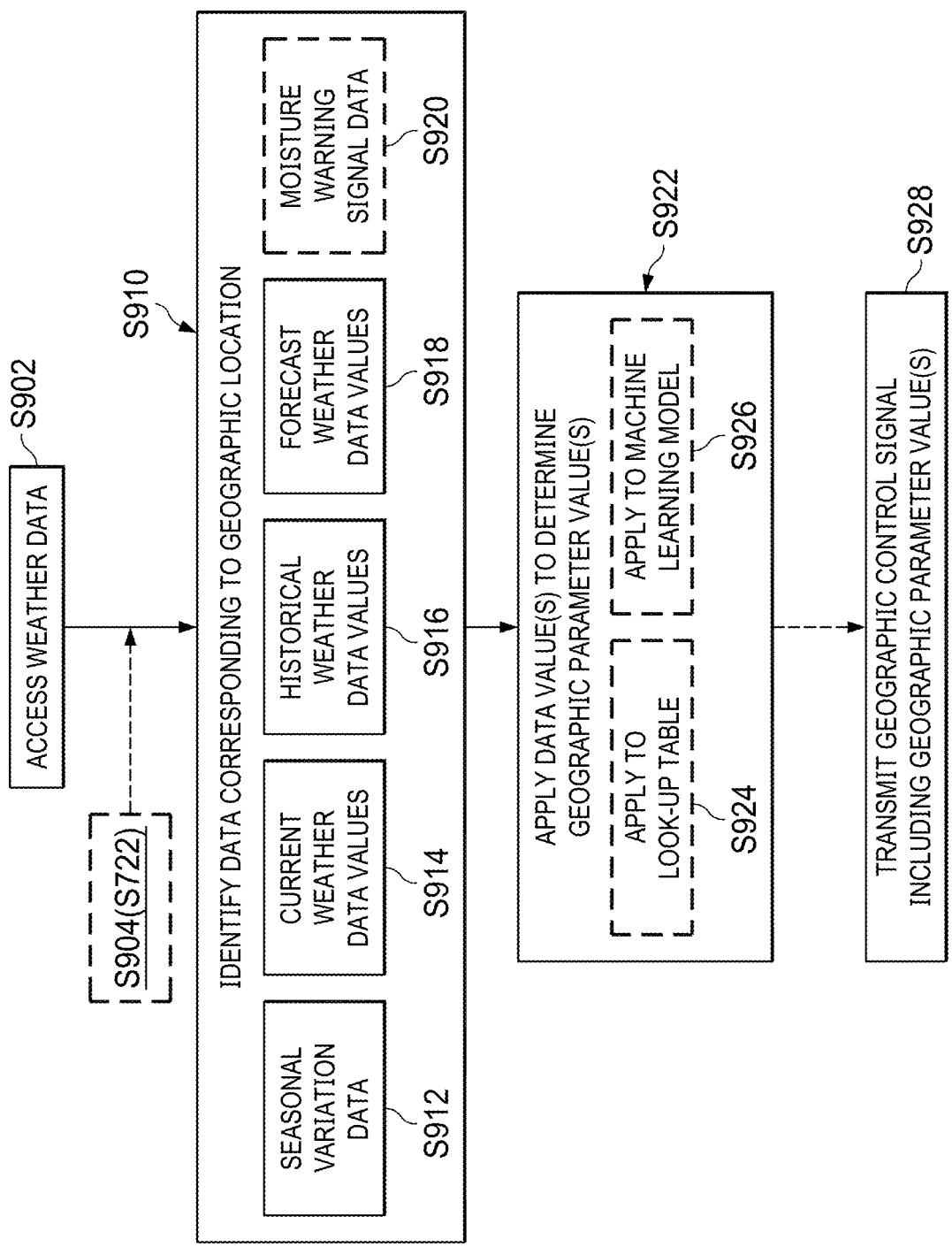
FIG. 9 is a flowchart illustrating a method of determining one or more updated geographic parameter values associated with a geographic location, according to some example embodiments.

FIG. 9 is a flowchart illustrating a method of determining one or more updated geographic parameter values associated with a geographic location, according to some example embodiments. The method shown in FIG. 9 may be performed by the remote computing device 410 (e.g., at S612 in FIG. 5, at S726 in FIG. 7, etc.), by the cleaner dispensing system 200 (e.g., at S506 and/or S512 in FIG. 5, at S710 and/or S742 in FIG. 7, etc.), or any combination thereof.

At S902, weather data associated with the geographic location of a cleaner dispensing system 200 is accessed (e.g., obtained, received, etc.). In some example embodiments, including example embodiments where the method at FIG. 9 is performed by the remote computing device 410 (e.g., at S608 in FIG. 5) the weather data may be accessed at S602 based on communicating with a remote weather monitoring system 600 (e.g., a remote weather monitoring system device 610 supporting same) via a network communication link 712 to obtain at least a portion of the weather data associated with the geographic location (e.g., a respective one of entries 604-1 to 604-N ("N" being any positive integer) that is associated with the geographic location) from the remote weather monitoring system 600, for example based on providing at least a portion of geographic location data 530 indicating the geographic location to the remote weather monitoring system 600 and requesting and receiving weather data (e.g., one or more weather data values) associated with the geographic location indicated by the geographic location data. In some example embodiments, including example embodiments where the method at FIG. 9 is performed by the cleaner dispensing system 200, the weather data may be accessed at S602 based on processing a geographic control signal received at the cleaner dispensing system 200 from the remote computing device 410 to determine the weather data from geographic information included in the geographic control signal.

In some example embodiments, the weather data associated with the geographic location (e.g., stored as weather data 534) may include one or more data values including, for example, a temperature value, a humidity value, an indication of an amount of precipitation (e.g., rainfall in inches) received at the geographic location within a certain preceding time period (e.g., the last 12 hours, 24 hours, 7 days, etc.), an indication of whether at least a threshold amount of precipitation is received at the geographic location within a certain preceding time period (e.g., the last 12 hours, 24 hours, 7 days, etc.), an indication of recent weather conditions, including for example an indication of whether a rainstorm is currently occurring and/or has occurred within a certain period of time, an indication of future weather conditions that are forecast (e.g., by the remote weather monitoring system 600) to occur at the geographic location within a certain period of time in the future (e.g., the next 12 hours, 24 hours, 7 days, etc.), an indication of whether one or more moisture warning signals 182 have been received from one or more cleaner dispensing systems 200 located at the geographic location, any combination thereof, or the like.

In some example embodiments, the method performed with regard to a geographic location in FIG. 9 includes, at S904, receiving one or more moisture warning signals 182 from one or more cleaner dispensing systems 200 located in the geographic location. Such receipt at S904 may correspond to the receiving at S722 in FIG. 7. Such receipt at S904 may occur before, after, and/or simultaneously with accessing the weather data at S602. In some example embodiments, the weather data is accessed at S902 in response to receiving one or more moisture warning signals 182 at S904, but example embodiments are not limited thereto. In some example embodiments, the weather data associated with a geographic location is accessed at S902 in response to an elapsed of a fixed time interval (e.g., every 60 minutes) independently of whether any moisture warning signals are received from any cleaner dispensing systems 200 located in the geographic location.

At S910 the accessed weather data and/or received moisture warning signal(s) is/are processed to identify, at any of S912 to S920 or any combination thereof, data (e.g., one or more data values) corresponding to the geographic location. It will be understood that any of the identification at S912 to S920 may be omitted from the identifying at S910. Such identified data as indicated at S912 to S920 may be included in the entry 510 of geographic information associated with the geographic location (e.g., as part of the weather data 534, the moisture warning signal data 538, any combination thereof, or the like).

As shown, identifying such data at S910 may include identifying, at S912, seasonal variation data indicating seasonal variation (e.g., variation by meteorological season, by calendar month, etc.) of one or more weather data values (e.g., temperature values, average temperature values per 7-day period or calendar week, average temperature values per 30-day period or calendar month, average temperature values per meteorological season, humidity values, average humidity values per 7-day period or calendar week, average humidity values per 30-day period or calendar month, average humidity values per meteorological season, etc.). Such seasonal variation data may be included in weather data 534 of an entry 510 of geographic information associated with the geographic location.

As shown, identifying such data at S910 may include identifying, at S914, current weather data values indicating one or more current weather data values associated with the geographic location (e.g., current temperature and/or humidity values at the geographic location). Such current weather data values may be included in weather data 534 of an entry 510 of geographic information associated with the geographic location. As shown, identifying such data at S910 may include identifying, at S916, historical (e.g., recent) weather data values indicating historical (e.g., recent) weather conditions (e.g., precipitation above a threshold amount within a particular recent time period (e.g., at least 0.5 inches rainfall), occurrence of a rainstorm, etc.) at the geographic location within a certain period of preceding time (e.g., the preceding 12 hours, the preceding 24 hours, a current or preceding 7-day time period or calendar week, a current or preceding 30-day time period or calendar month, etc.). Such historical weather data values may be included in weather data 534 of an entry 510 of geographic information associated with the geographic location. As shown, identifying such data at S910 may include identifying, at S918, forecast weather data values indicating forecast (e.g., predicted future) weather conditions (e.g., precipitation above a threshold amount, occurrence of a rainstorm, etc.) at the geographic location within a certain period of future time (e.g., the next 12 hours, the next 24 hours, a current or future 7-day time period or calendar week, a current or future 30-day time period or calendar month, etc.). Such forecast weather data values may be included in weather data 534 of an entry 510 of geographic information associated with the geographic location. As shown, identifying such data at S910 may include identifying, at S920, moisture warning signal data indicating an amount (e.g., quantity) and/or frequency of moisture warning signals 182 received (e.g., at S604) from one or more cleaner dispensing systems 200 at the geographic location within a certain period of preceding time (e.g., a 7-day time period, a 30-day time period, etc.). Such moisture warning signal data may be included in moisture warning signal data 538 (e.g., frequency data 538-1 and/or threshold data 538-2) of an entry 510 of geographic information associated with the geographic location. It will be understood that the data identified at S912-S920 may be included in the weather data accessed at S602 (e.g., accessed from a remote weather monitoring system 600) and/or the one or more moisture warning signals received at S604.

At S922, one or more data values of the identified data (identified at any one or more of S912 to S920 at S910) may be applied to a database (e.g., a look-up table) and/or a model (e.g., a machine learning model such as a DNN) as an input to determine one or more geographic parameter values associated with the geographic location. Such a determined one or more geographic parameter values may be included (e.g., stored) as at least a part of the geographic parameter value data 532 included in the entry 510 of geographic information associated with the geographic location. Such one or more geographic parameter values may be provided to one or more cleaner dispensing systems 200 located in the geographic location (e.g., included in a geographic control signal transmitted to the one or more cleaner dispensing systems 200) to cause the one or more cleaner dispensing systems 200 to be configured to operate based on the identified data (identified at S910) associated with the geographic location.

For example, at S924, one or more of the weather data values identified at S912 to S918 (e.g., a seasonal average data value, such as average temperature and humidity values corresponding to the present calendar month, present 30-day period, or present meteorological season as identified at S912) may be applied as an input to a database such as an empirically-generated look-up table that associated such input(s) to one or more corresponding geographic parameter values, in order to determine the one or more geographic parameter values associated with the geographic location.

In another example, at S926, one or more of the weather data values identified at S912 to S918 (e.g., a seasonal average data value, such as average temperature and humidity values corresponding to the present calendar month, present 30-day period, or present meteorological season as identified at S912) may be applied as an input to a machine learning model (e.g., a DNN as shown and described with reference to FIG. 3) to obtain, as an output of the model, one or more geographic parameter values associated with the geographic location. Such a model utilized at S926 may be trained as described above with reference to FIG. 3.

At S928, a geographic control signal that includes the one or more geographic parameter values associated with the geographic location, as determined at S922, may be transmitted to one or more cleaner dispensing systems 200 located in the geographic location to cause the one or more cleaner dispensing systems 200 to be configured to operate based on the identified data (identified at S910) associated with the geographic location. Such a transmission of a geographic control signal including the determined one or more geographic parameter values may be performed as described with regard to S614 and/or S624 in FIG. 5, S728 in FIG. 7, any combination thereof, or the like.

Figure 10:
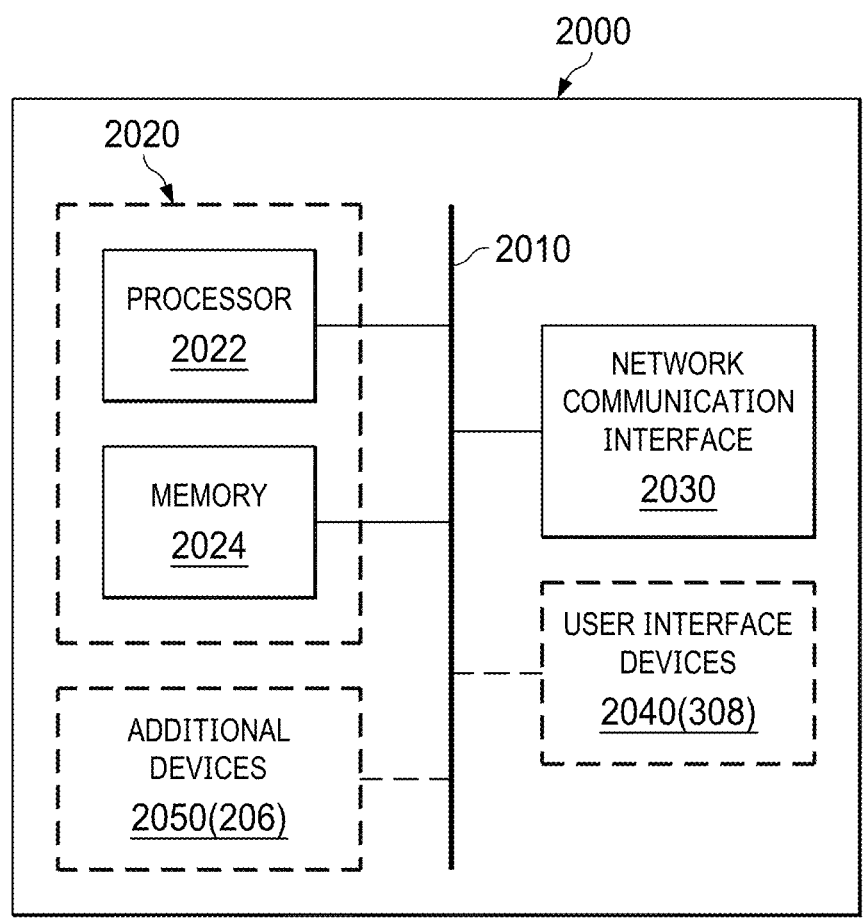
FIG. 10 is a schematic view of an electronic device, according to some example embodiments.

FIG. 10 is a schematic view of an electronic device 2000, according to some example embodiments. The electronic device 2000 may implement any of the computing devices, controllers, processors, or the like according to any of the example embodiments, including the cleaner dispensing system 200, the cleaner dispensing system base 202, the dispenser controller 212, the remote computing device 410, the device controller 430, the electronic device 300, the device controller 306, the remote weather monitoring system device 610, the controller 140 of the air conditioning system 100, any portion of a communication network 700 and/or any device configured to implement some or all of a communication network 700, any combination thereof, or the like.

As shown in FIG. 10, the electronic device 2000 may include some or all of a processor 2022 (e.g., a CPU), a memory 2024 (e.g., a solid state drive, or SSD), and a network communication interface 2030 (e.g., a wireless network communication interface, which may for example implement the dispenser network communication interface 224, the device network communication interface 420, the device network communication interface 304) that are communicatively coupled together via a bus connection 2010. It will be understood that any type of non-transitory computer readable storage device may be used as the memory 2024 in addition or alternative to an SSD.

As shown, in some example embodiments the processor 2022 and the memory 2024 may collectively comprise a controller 2020, which may for example implement the dispenser controller 212, the device controller 430, the device controller 306, any combination thereof, or the like. For example, the memory 2024 may store a program of instructions and the processor 2022 may be configured to execute the program of instructions to implement the functionality of any of the controllers as described herein (e.g., the dispenser controller 212, the device controller 430, the device controller 306, any combination thereof, or the like), the functionality of any of the devices as described herein (e.g., the cleaner dispensing system 200, the remote computing device 410, the electronic device 300, the remote weather monitoring system device 610), the functionality of any systems and/or services supported by any of the devices as described herein (e.g., communication network 700, remote weather monitoring system 600), any combination thereof, or the like.

For example, in some example embodiments where the electronic device 2000 implements at least a portion of the cleaner dispensing system 200, the memory 2024 may be referred to as a dispenser memory (e.g., a non-transitory computer readable storage medium) that may store a program of dispenser instructions and the processor 2022 may be referred to as a dispenser processor that is configured to execute the program of dispenser instructions to implement the dispenser controller 212 and/or any functionality thereof, to implement the cleaner dispensing system 200 and/or any functionality thereof, any combination thereof, or the like.

In another example, in some example embodiments where the electronic device 2000 implements at least a portion of the remote computing device 410, the memory 2024 may be referred to as a device memory (e.g., a non-transitory computer readable storage medium) that may store a program of device instructions and the processor 2022 may be referred to as a device processor that is configured to execute the program of device instructions to implement the device controller 430 and/or any functionality thereof, to implement the remote computing device 410 and/or any functionality thereof, any combination thereof, or the like.

The electronic device 2000 may, in some example embodiments, include one or more user interface devices 2040 that may be configured to provide information to a user supported by the electronic device 2000 and/or may be configured to receive and communicate user commands to the processor 2022 based on user interaction with the user interface device 2040. The user interface device 2040 may include a display device (e.g., an LED display screen, OLED display screen, etc.), a touchscreen display, a button interface, any combination thereof, or the like. The user interface device 2040 may be communicatively coupled to the bus connection 2010. In some example embodiments, the electronic device 2000 may implement the electronic device 300 and the user interface device 2040 may implement the user interface 308 of electronic device 300. However, it will be understood that the user interface device 2040 may implement a user interface that may be included in other devices, for example a user interface of the cleaner dispensing system 200, a user interface of the remote computing device 410, a user interface of the remote weather monitoring system device 610, any combination thereof, or the like.

The electronic device 2000 may, in some example embodiments, include one or more additional devices 2050 have separate functionality and which may be controlled by the processor 2022 (and/or controller 2020 including same). For example, in some example embodiments, where the electronic device 2000 at least partially implements a cleaner dispensing system 200, an additional device 2050 of the electronic device 2000 may include a dispenser device that is configured to operate to cause at least an amount of cleaning composition to be dispensed. Such a dispenser device may include a valve assembly (e.g., a solenoid valve assembly), a pump device (e.g., a positive displacement pump, a rotary pump, a gear pump, a worm pump, or the like), or the like.

In some example embodiments, some or all of any of the electronic device 2000 (e.g., the controller 2020) may include, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. In some example embodiments, the processing circuitry may include a non-transitory computer readable storage device, or memory (e.g., memory 2024), for example a solid state drive (SSD), storing a program of instructions, and a processor (e.g., processor 2022), for example a central processing unit (CPU), that is communicatively coupled to the non-transitory computer readable storage device (e.g., via a bus connection 2010) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, etc.) that is described as "implementing" an element (e.g., controller 212, cleaner dispensing system 200, device controller 430, remote computing device 410, device controller 306, electronic device 300, remote weather monitoring system device 610, etc.) will be understood to implement the functionality of said implemented element and/or any other elements (e.g., the functionality of the dispenser controller 212, the functionality of the cleaner dispensing system 200, the functionality of the device controller 430, the functionality of the remote computing device 410, the functionality of the device controller 306, the functionality of the electronic device 300, the functionality of the remote weather monitoring system device 610, etc.).

Some Example Embodiments of the inventive concepts are as follows below:

Example Embodiment 1: A system (10), comprising:
a cleaner dispensing system (200), including
   a dispenser device (206) configured to operate to dispense a cleaning composition (230),
   a dispenser controller (212) configured to operate the dispenser device to dispense the cleaning composition according to one or more dispenser parameters, and
   a dispenser network communication interface (224); and
a computing device (410), including
   a device network communication interface (420) configured to establish a network communication link (710) with the dispenser network communication interface of the cleaner dispensing system over at least one communication network (700), and
   a device controller (430), configured to
      determine a geographic location of the cleaner dispensing system, and
      control the device network communication interface to transmit a signal including geographic information associated with the geographic location to the cleaner dispensing system via the network communication link to cause the dispenser controller to be configured to operate the dispenser device according to one or more geographic parameter values of the one or more dispenser parameters, the one or more geographic parameter values associated with the geographic location of the cleaner dispensing system.

Example Embodiment 2: The system of Example Embodiment 1, wherein the geographic information included in the signal includes at least one of
   the one or more geographic parameter values, or
   weather data associated with the geographic location.

Example Embodiment 3: The system of Example Embodiments 1 or 2, wherein the device controller is configured to determine the geographic location based on performing geolocating of the cleaner dispensing system.

Example Embodiment 4: The system of any of Example Embodiments 1 to 3, wherein the device controller is configured to
   determine the one or more geographic parameter values based on determining the geographic location, and
   transmit the signal based on determining the one or more geographic parameter values, such that the geographic information included in the signal indicates the one or more geographic parameter values.

Example Embodiment 5: The system of any of Example Embodiments 1 to 4, wherein the device controller is configured to determine the geographic information based on controlling the device network communication interface to obtain the weather data based on communication with a remote weather monitoring system (600) via at least one network communication link (712).

Example Embodiment 6: The system of any of Example Embodiments 1 to 5, wherein the weather data includes at least one of
   a temperature value associated with the geographic location, or
   a humidity value associated with the geographic location.

Example Embodiment 7: The system of any of Example Embodiments 1 to 6, wherein the weather data includes information indicating variation of at least one of a temperature value or a humidity value associated with the geographic location over a period of time.

Example Embodiment 8: The system of any of Example Embodiments 1 to 7, wherein
   the dispenser controller is configured to operate the dispenser device according to one or more local parameter values of the one or more dispenser parameters, the one or more local parameter values stored at the cleaner dispensing system; and
   the dispenser controller is further configured to
      determine the one or more geographic parameter values based on processing the geographic information included in the signal, and
      update the one or more local parameter values stored at the cleaner dispensing system to be the one or more geographic parameter values, to configure the dispenser controller to operate the dispenser device according to the one or more geographic parameter values.

Example Embodiment 9: The system of any of Example Embodiments 1 to 8, wherein the device controller is configured to control the device network communication interface to transmit the signal in response to at least one of
   an elapse of a signal time interval, or
   a determination that the one or more geographic parameter values have changed, or
   a determination that the geographic location has changed, or
   a determination that the geographical information has changed.

Example Embodiment 10: The system of any of Example Embodiments 1 to 9, wherein
   the dispenser controller is configured to operate the dispenser device for a dispensing duration in response to an elapse of a dispensing time interval, and
   the one or more geographic parameter values includes at least one of
      a value indicating a magnitude of the dispensing time interval, or
      a value indicating a magnitude of the dispensing duration.

Example Embodiment 11: The system of any of Example Embodiments 1 to 10, wherein
   the dispenser controller is configured to control the dispenser network communication interface to transmit a moisture warning signal (182) to the computing device via the network communication link in response to detection of a moisture signal (180) from a moisture sensor (160), the moisture signal indicating a presence of a fluid in at least a portion of an air conditioning system (100),
   the device controller is configured to control the device network communication interface to transmit an update signal to the cleaner dispensing system via the network communication link based on processing the moisture warning signal to cause the dispenser controller to be configured to operate the dispenser device according to an updated one or more geographic parameter values, and
   the updated one or more geographic parameter values are different from the one or more geographic parameter values.

Example Embodiment 12: The system of any of Example Embodiments 1 to 11, further comprising:
   a plurality of cleaner dispensing systems (200), the plurality of cleaner dispensing systems including the cleaner dispensing system (200-1) and at least one separate cleaner dispensing system (200-2), the plurality of cleaner dispensing systems communicatively coupled to the computing device via the at least one communication network, and wherein the device controller is configured to control the device network communication interface to transmit the update signal to the at least one separate cleaner dispensing system via the at least one communication network based on processing the moisture warning signal to cause the at least one separate cleaner dispensing system to be configured to operate a dispenser device (206) of the at least one separate cleaner dispensing system according to the updated one or more geographic parameter values.

Example Embodiment 13: A computing device (410) configured to establish a network communication link (710) with a cleaner dispensing system (200), the cleaner dispensing system configured to operate a dispenser device (206) to dispense a cleaning composition (230) according to one or more dispenser parameters, the computing device comprising:

a device network communication interface (420) configured to establish the network communication link with the cleaner dispensing system; and a device controller (430) configured to determine a geographic location of the cleaner dispensing system, and control the device network communication interface to transmit a signal including geographic information associated with the geographic location to the cleaner dispensing system via the network communication link to cause the cleaner dispensing system to be configured to operate the dispenser device according to one or more geographic parameter values of the one or more dispenser parameters, the one or more geographic parameter values associated with the geographic location of the cleaner dispensing system.

Example Embodiment 14: The computing device of Example Embodiment 13, wherein the geographic information included in the signal includes at least one of the one or more geographic parameter values, or weather data associated with the geographic location.

Example Embodiment 15: The computing device of Example Embodiments 13 or 14, wherein the device controller is configured to determine the geographic location based on performing geolocating of the cleaner dispensing system.

Example Embodiment 16: The computing device of any of Example Embodiments 13 to 15, wherein the device controller is configured to determine the one or more geographic parameter values based on determining the geographic location, and transmit the signal based on determining the one or more geographic parameter values, such that the geographic information included in the signal indicates the one or more geographic parameter values.

Example Embodiment 17: The computing device of any of Example Embodiments 13 to 16, wherein the device controller is configured to determine the geographic information based on controlling the device network communication interface to obtain the weather data based on communication with a remote weather monitoring system (600) via at least one network communication link (712).

Example Embodiment 18: The computing device of any of Example Embodiments 13 to 17, wherein the weather data includes at least one of a temperature value associated with the geographic location, or a humidity value associated with the geographic location.

Example Embodiment 19: The computing device of any of Example Embodiments 13 to 18, wherein the weather data includes information indicating variation of at least one of a temperature value or a humidity value associated with the geographic location over a period of time.

Example Embodiment 20: The computing device of any of Example Embodiments 13 to 19, wherein the device controller is configured to control the device network communication interface to transmit the signal in response to at least one of an elapse of a signal time interval, or a determination that the one or more geographic parameter values have changed, or a determination that the geographic location has changed, or a determination that the geographical information has changed.

Example Embodiment 21: The computing device of any of Example Embodiments 13 to 20, wherein the cleaner dispensing system is configured to operate to dispense the cleaning composition for a dispensing duration in response to an elapse of a dispensing time interval, and the one or more geographic parameter values includes at least one of a value indicating a magnitude of the dispensing time interval, or a value indicating a magnitude of the dispensing duration.

Example Embodiment 22: The computing device of any of Example Embodiments 13 to 21, wherein the device controller is configured to process a moisture warning signal (182) received from the cleaner dispensing system via the network communication link to determine that the moisture warning signal indicates detection, at the cleaner dispensing system, of a moisture signal (180) from a moisture sensor (160), the moisture signal indicating a presence of a fluid in at least a portion of an air conditioning system (100), and control the device network communication interface to transmit an update signal to the cleaner dispensing system via the network communication link based on processing the moisture warning signal to cause the cleaner dispensing system to be configured to operate the dispenser device according to an updated one or more geographic parameter values, wherein the updated one or more geographic parameter values are different from the one or more geographic parameter values.

Example Embodiment 23: The computing device of any of Example Embodiments 13 to 22, wherein the computing device is communicatively coupled to a plurality of cleaner dispensing systems (200) via at least one communication network, the plurality of cleaner dispensing systems including the cleaner dispensing system (200-1) and at least one separate cleaner dispensing system (200-2), the plurality of cleaner dispensing systems communicatively coupled to the computing device via at least one communication network, and the device controller is configured to control the device network communication interface to transmit the update signal to the at least one separate cleaner dispensing system via the at least one communication network based on processing the moisture warning signal to cause the at least one separate cleaner dispensing system to be configured to operate a dispenser device (206) of the at least one separate cleaner dispensing system according to the updated one or more geographic parameter values.

Example Embodiment 24: A method for controlling a cleaner dispensing system (200), the cleaner dispensing system configured to operate a dispenser device (206) to dispense a cleaning composition (230) according to one or more dispenser parameters, the method comprising:
- establishing a network communication link (710) with the cleaner dispensing system via a communication network (700);
- determining a geographic location of the cleaner dispensing system; and
- transmitting a signal including geographic information associated with the geographic location to the cleaner dispensing system via the network communication link to cause the cleaner dispensing system to be configured to operate the dispenser device according to one or more geographic parameter values of the one or more dispenser parameters, the one or more geographic parameter values associated with the geographic location of the cleaner dispensing system.

Example Embodiment 25: The method of Example Embodiment 24, wherein the geographic information included in the signal includes at least one of
- the one or more geographic parameter values, or
- weather data associated with the geographic location.

Example Embodiment 26: The method of Example Embodiments 24 or 25, wherein the determining the geographic location is based on performing geolocating of the cleaner dispensing system.

Example Embodiment 27: The method of any of Example Embodiments 24 to 26, further comprising:
- determining the one or more geographic parameter values based on determining the geographic location, and
- transmitting the signal based on determining the one or more geographic parameter values, such that the geographic information included in the signal indicates the one or more geographic parameter values.

Example Embodiment 28: The method of any of Example Embodiments 24 to 27, wherein the geographic information is determined based on obtaining the weather data, and the weather data is received based on communication with a remote weather monitoring system (600) via at least one network communication link (712).

Example Embodiment 29: The method of any of Example Embodiments 24 to 28, wherein the weather data includes at least one of
- a temperature value associated with the geographic location, or
- a humidity value associated with the geographic location.

Example Embodiment 30: The method of any of Example Embodiments 24 to 29, wherein the weather data includes information indicating variation of at least one of a temperature value or a humidity value associated with the geographic location over a period of time.

Example Embodiment 31: The method of any of Example Embodiments 24 to 30, further comprising:
- transmitting the signal in response to at least one of
  - an elapse of a signal time interval, or
  - a determination that the one or more geographic parameter values have changed, or
  - a determination that the geographic location has changed, or
  - a determination that the geographical information has changed.

Example Embodiment 32: The method of any of Example Embodiments 24 to 31, wherein
- the cleaner dispensing system is configured to operate to dispense the cleaning composition for a dispensing duration in response to an elapse of a dispensing time interval, and
- the one or more geographic parameter values includes at least one of
  - a value indicating a magnitude of the dispensing time interval, or
  - a value indicating a magnitude of the dispensing duration.

Example Embodiment 33: The method of any of Example Embodiments 24 to 32, further comprising:
- processing a moisture warning signal (182) received from the cleaner dispensing system via the network communication link to determine that the moisture warning signal indicates detection, at the cleaner dispensing system, of a moisture signal (180) from a moisture sensor (160), the moisture signal indicating a presence of a fluid in at least a portion of an air conditioning system (100), and
- transmitting an update signal to the cleaner dispensing system via the network communication link based on processing the moisture warning signal to cause the cleaner dispensing system to be configured to operate the dispenser device according to an updated one or more geographic parameter values,
- wherein the updated one or more geographic parameter values are different from the one or more geographic parameter values.

Example Embodiment 34: The method of any of Example Embodiments 24 to 33, further comprising:
- transmitting the update signal to at least one separate cleaner dispensing system (200-2) via at least one communication network based on processing the moisture warning signal to cause the at least one separate cleaner dispensing system to be configured to operate a dispenser device (206) of the at least one separate cleaner dispensing system according to the updated one or more geographic parameter values.

Example Embodiment 35: A cleaner dispensing system (200), comprising:
- a dispenser device (206) configured to operate to dispense a cleaning composition;
- a dispenser network communication interface (224) configured to establish a network communication link (710) with a remote computing device (410); and
- a dispenser controller (212) configured to
  - operate the dispenser device to dispense the cleaning composition according to one or more geographic parameter values based on processing geographic information included in a signal received from the remote computing device via the network communication link, the one or more geographic parameter values associated with a geographic location of the cleaner dispensing system.

Example Embodiment 36: The cleaner dispensing system of Example Embodiment 35, wherein the dispenser controller is configured to
- control the dispenser network communication interface to transmit a geographic position signal that includes information associated with the geographic location of the cleaner dispensing system, such that the signal received from the remote computing device includes geographic information associated with the geographic location based on the remote computing device processing the geographic position signal.

Example Embodiment 37: The cleaner dispensing system of Example Embodiments 35 or 36, wherein the geographic information included in the signal includes at least one of
the one or more geographic parameter values, or
weather data associated with the geographic location.

Example Embodiment 38: The cleaner dispensing system of Example Embodiments 35 to 37, wherein the weather data includes at least one of
a temperature value associated with the geographic location, or
a humidity value associated with the geographic location.

Example Embodiment 39: The cleaner dispensing system of Example Embodiments 35 to 38, wherein the weather data includes information indicating variation of at least one of a temperature value or a humidity value associated with the geographic location over a period of time.

Example Embodiment 40: The cleaner dispensing system of Example Embodiments 35 to 39, wherein
the dispenser controller is configured to operate the dispenser device according to one or more local parameter values, the one or more local parameter values stored at the cleaner dispensing system; and
the dispenser controller is further configured to
determine the one or more geographic parameter values based on processing the geographic information included in the signal, and
update the one or more local parameter values stored at the cleaner dispensing system to be the one or more geographic parameter values, to configure the dispenser controller to operate the dispenser device according to the one or more geographic parameter values.

Example Embodiment 41: The cleaner dispensing system of Example Embodiments 35 to 40, wherein
the dispenser controller is configured to operate the dispenser device for a dispensing duration in response to an elapse of a dispensing time interval, and
the one or more geographic parameter values includes at least one of
a value indicating a magnitude of the dispensing time interval, or
a value indicating a magnitude of the dispensing duration.

Example Embodiment 42: The cleaner dispensing system of Example Embodiments 35 to 41, wherein
the dispenser controller is configured to control the dispenser network communication interface to transmit a moisture warning signal (182) to the remote computing device via the network communication link in response to detection of a moisture signal (180) from a moisture sensor (160), the moisture signal indicating a presence of a fluid in at least a portion of an air conditioning system (100).

Example Embodiment 43: The cleaner dispensing system of Example Embodiments 35 to 42, wherein
the dispenser controller is configured to update the one or more geographic parameter values in response to detection of a moisture signal (180) from a moisture sensor (160), the moisture signal indicating a presence of a fluid in at least a portion of an air conditioning system (100).

Example embodiments have been disclosed herein; it should be understood that other variations may be possible. Such variations are not to be regarded as a departure from the spirit and scope of the present inventive concepts, and all such modifications as would be obvious to one skilled in the art are intended to be included within the scope of the following claims.

What is claimed:

1. A system, comprising:
a cleaner dispensing system, including
a dispenser device configured to operate to dispense a cleaning composition,
a dispenser controller, including
a dispenser memory storing a program of dispenser instructions, and
a dispenser processor configured to execute the program of dispenser instructions to operate the dispenser device to dispense the cleaning composition according to one or more dispenser parameters, and
a dispenser network communication interface; and
a computing device, including
a computing device network communication interface configured to establish a network communication link with the dispenser network communication interface of the cleaner dispensing system over at least one communication network, and
a computing device controller, including
a computing device memory storing a program of computing device instructions, and
a computing device processor configured to execute the program of computing device instructions to
determine a geographic location of the cleaner dispensing system based on one of
processing one or more electronic device signals received from a separate electronic device supporting a user, the one or more electronic device signals including geographic location data indicating the geographic location of the cleaner dispensing system, or
processing one or more cleaner dispensing system signals received from the cleaner dispensing system over the network communication link to determine an IP address associated with the cleaner dispensing system, accessing a first database stored at the computing device memory and associating IP addresses with geographic locations to determine an identified geographic location indicated by the first database to be associated with the determined IP address, and determining the identified geographic location as the geographic location of the cleaner dispensing system,
determine geographic information associated with the geographic location of the cleaner dispensing system, based on determining the geographic location of the cleaner dispensing system, the geographic information including a first set of one or more geographic parameter values of the one or more dispenser parameters, the first set of one or more geographic parameter values associated with the geographic location of the cleaner dispensing system, and
control the computing device network communication interface to transmit a signal including the determined geographic information associated with the geographic location to the cleaner dispensing system via the network communication link to cause the dispenser processor to configure the dispenser controller to operate the dispenser device according to the first set of one or more geographic parameter values of the one or more dispenser parameters.

2. The system of claim 1, wherein the determining the geographic information includes
accessing a second database stored at the computing device memory and associating geographic locations with corresponding sets of one or more geographic parameter values,
determining an identified set of one or more geographic parameter values indicated by the second database to be associated with the geographic location of the cleaner dispensing system, and
determining the identified set of one or more geographic parameter values as the first set of one or more geographic parameter values.

3. The system of claim 1, wherein the computing device processor is configured to execute the program of computing device instructions to determine the geographic information based on controlling the computing device network communication interface to obtain weather data associated with the determined geographic location based on communication with a remote weather monitoring system via at least one network communication link.

4. The system of claim 3, wherein the weather data includes
a humidity value associated with the geographic location.

5. The system of claim 1, wherein
the dispenser processor is configured to execute the program of dispenser instructions to operate the dispenser device for a dispensing duration in response to an elapse of a dispensing time interval, and
the first set of one or more geographic parameter values includes at least one of
a value indicating a magnitude of the dispensing time interval, or
a value indicating a magnitude of the dispensing duration.

6. The system of claim 1, wherein
the dispenser processor is configured to execute the program of dispenser instructions to control the dispenser network communication interface to transmit a moisture warning signal to the computing device via the network communication link in response to detection of a moisture signal from a moisture sensor, the moisture signal indicating a presence of a fluid in at least a portion of an air conditioning system,
the computing device processor is configured to execute the program of computing device instructions to control the computing device network communication interface to transmit an update signal to the cleaner dispensing system via the network communication link based on processing the moisture warning signal to cause the dispenser processor to configure the dispenser controller to operate the dispenser device according to an updated set of one or more geographic parameter values, and
the updated set of one or more geographic parameter values are different from the first set of one or more geographic parameter values.

7. The system of claim 6, further comprising:
a plurality of cleaner dispensing systems, the plurality of cleaner dispensing systems including the cleaner dispensing system and at least one separate cleaner dispensing system, the plurality of cleaner dispensing systems communicatively coupled to the computing device via the at least one communication network, and
wherein the computing device processor is configured to execute the program of computing device instructions to, based on processing the moisture warning signal received from the cleaner dispensing system to determine that at least one moisture warning signal is transmitted by the cleaner dispensing system within a certain time period, control the computing device network communication interface to transmit the update signal to both the cleaner dispensing system and the at least one separate cleaner dispensing system via the at least one communication network to cause both the cleaner dispensing system and the at least one separate cleaner dispensing system to be configured to operate a separate, respective dispenser device according to the updated set of one or more geographic parameter values, wherein no moisture warning signals are transmitted by the at least one separate cleaner dispensing system within the certain time period.

8. A computing device configured to establish a network communication link with a cleaner dispensing system, the cleaner dispensing system configured to operate a dispenser device to dispense a cleaning composition according to one or more dispenser parameters, the computing device comprising:
a computing device network communication interface configured to establish the network communication link with the cleaner dispensing system; and
a computing device controller, including
a computing device memory storing a program of computing device instructions, and
a computing device processor configured to execute the program of computing device instructions to
determine a geographic location of the cleaner dispensing system, based on one of
processing one or more electronic device signals received from a separate electronic device supporting a user, the one or more electronic device signals including geographic location data indicating the geographic location of the cleaner dispensing system, or
processing one or more cleaner dispensing system signals received from the cleaner dispensing system over the network communication link to determine an IP address associated with the cleaner dispensing system, accessing a first database stored at the computing device memory and associating IP addresses with geographic locations to determine an identified geographic location indicated by the first database to be associated with the determined IP address, and determining the identified geographic location as the geographic location of the cleaner dispensing system,
determine geographic information associated with the geographic location of the cleaner dispensing system, based on determining the geographic location of the cleaner dispensing system, the geographic information including a first set of one or more geographic parameter values of the one or more dispenser parameters, the first set of one or more geographic parameter values associated with the geographic location of the cleaner dispensing system, and control the computing device network communication interface to transmit a signal including the determined geographic information associated with the geographic location to the cleaner dispensing system via the network communication link to cause the cleaner dispensing system to be configured to operate the dispenser device according to the first set of one or more geographic parameter values of the one or more dispenser parameters.

9. The computing device of claim 8, wherein the determining the geographic information includes
   accessing a second database stored at the computing device memory and associating geographic locations with corresponding sets of one or more geographic parameter values,
   determining an identified set of one or more geographic parameter values indicated by the second database to be associated with the geographic location of the cleaner dispensing system, and
   determining the identified set of one or more geographic parameter values as the first set of one or more geographic parameter values.

10. The computing device of claim 8, wherein the computing device processor is configured to execute the program of computing device instructions to determine the geographic information based on controlling the computing device network communication interface to obtain weather data associated with the determined geographic location based on communication with a remote weather monitoring system via at least one network communication link.

11. The computing device of claim 10, wherein the weather data includes
   a humidity value associated with the geographic location.

12. The computing device of claim 8, wherein the computing device processor is configured to execute the program of computing device instructions to
   process a moisture warning signal received from the cleaner dispensing system via the network communication link to determine that the moisture warning signal indicates detection, at the cleaner dispensing system, of a moisture signal from a moisture sensor, the moisture signal indicating a presence of a fluid in at least a portion of an air conditioning system, and
   control the computing device network communication interface to transmit an update signal to the cleaner dispensing system via the network communication link based on processing the moisture warning signal to cause the cleaner dispensing system to be configured to operate the dispenser device according to an updated set of one or more geographic parameter values,
   wherein the updated set of one or more geographic parameter values are different from the first set of one or more geographic parameter values.

13. The computing device of claim 12, wherein
   the computing device is communicatively coupled to a plurality of cleaner dispensing systems via at least one communication network, the plurality of cleaner dispensing systems including the cleaner dispensing system and at least one separate cleaner dispensing system, the plurality of cleaner dispensing systems communicatively coupled to the computing device via the at least one communication network, and
   the computing device processor is configured to execute the program of computing device instructions to, based on processing the moisture warning signal received from the cleaner dispensing system to determine that at least one moisture warning signal is received at the computing device from the cleaner dispensing system within a certain time period control the computing device network communication interface to transmit the update signal to both the cleaner dispensing system and the at least one separate cleaner dispensing system via the at least one communication network to cause both the cleaner dispensing system and the at least one separate cleaner dispensing system to be configured to operate a separate, respective dispenser device according to the updated set of one or more geographic parameter values, wherein no moisture warning signals are received at the computing device from the at least one separate cleaner dispensing system within the certain time period.

14. A method for controlling a cleaner dispensing system, the cleaner dispensing system configured to operate a dispenser device to dispense a cleaning composition according to one or more dispenser parameters, the method comprising:
   establishing a network communication link with the cleaner dispensing system via a communication network;
   determining a geographic location of the cleaner dispensing system;
   determining geographic information associated with the geographic location of the cleaner dispensing system, based on determining the geographic location of the cleaner dispensing system, the geographic information including a first set of one or more geographic parameter values of the one or more dispenser parameters, the first set of one or more geographic parameter values associated with the geographic location of the cleaner dispensing system; and
   transmitting a signal including the determined geographic information associated with the geographic location to the cleaner dispensing system via the network communication link to cause the cleaner dispensing system to be configured to operate the dispenser device according to the first set of one or more geographic parameter values of the one or more dispenser parameters.

15. The method of claim 14, wherein the determining the geographic information includes
   accessing a second database and associating geographic locations with corresponding sets of one or more geographic parameter values,
   determining an identified set of one or more geographic parameter values indicated by the second database to be associated with the geographic location of the cleaner dispensing system, and
   determining the identified set of one or more geographic parameter values as the first set of one or more geographic parameter values.

16. The method of claim 14, wherein the geographic information is determined based on obtaining weather data associated with the determined geographic location, and the weather data is received based on communication with a remote weather monitoring system via at least one network communication link.

17. The method of claim 16, wherein the weather data includes
   a humidity value associated with the geographic location.

18. The method of claim 14, further comprising:
   processing a moisture warning signal received from the cleaner dispensing system via the network communication link to determine that the moisture warning signal indicates detection, at the cleaner dispensing system, of a moisture signal from a moisture sensor, the moisture signal indicating a presence of a fluid in at least a portion of an air conditioning system, and transmitting an update signal to the cleaner dispensing system via the network communication link based on processing the moisture warning signal to cause the cleaner dispensing system to be configured to operate the dispenser device according to an updated set of one or more geographic parameter values, wherein the updated set of one or more geographic parameter values are different from the first set of one or more geographic parameter values.

19. The method of claim 18, further comprising:

transmitting the update signal to both the cleaner dispensing system and at least one separate cleaner dispensing system via at least one communication network based on processing the moisture warning signal received from the cleaner dispensing system to determine that at least one moisture warning signal is received from the cleaner dispensing system within a certain time period, to cause both the cleaner dispensing system and the at least one separate cleaner dispensing system to be configured to operate a separate, respective dispenser device according to the updated set of one or more geographic parameter values, wherein no moisture warning signals are received from the at least one separate cleaner dispensing system within the certain time period.

20. A cleaner dispensing system, comprising:

a dispenser device configured to operate to dispense a cleaning composition;

a dispenser network communication interface configured to establish a network communication link with a remote computing device; and a dispenser controller, including a dispenser memory storing a program of dispenser instructions, and a dispenser processor configured to execute the program of dispenser instructions to communicate with the remote computing device via the network communication link to enable the remote computing device to process one or more cleaner dispensing system signals received from the cleaner dispensing system over the network communication link to determine an IP address associated with the cleaner dispensing system, access a first database stored at a memory of the remote computing device and associating IP addresses with geographic locations to determine an identified geographic location indicated by the first database to be associated with the determined IP address, and determine the identified geographic location as a geographic location of the cleaner dispensing system, and configure the dispenser controller to operate the dispenser device to dispense the cleaning composition according to a first set of one or more geographic parameter values based on processing geographic information included in a signal received from the remote computing device via the network communication link, the first set of one or more geographic parameter values associated with the geographic location of the cleaner dispensing system, wherein the geographic information included in the signal indicates the first set of one or more geographic parameter values, and wherein the signal is received from the remote computing device based on the remote computing device determining the geographic information, the remote computing device determining the geographic information based on determining the geographic location of the cleaner dispensing system.

21. The cleaner dispensing system of claim 20, wherein the dispenser processor is configured to execute the program of dispenser instructions to control the dispenser network communication interface to transmit a geographic position signal that includes information associated with the geographic location of the cleaner dispensing system, such that the signal received from the remote computing device includes geographic information associated with the geographic location based on the remote computing device processing the geographic position signal.

22. The cleaner dispensing system of claim 20, wherein the dispenser processor is configured to execute the program of dispenser instructions to control the dispenser network communication interface to transmit a moisture warning signal to the remote computing device via the network communication link in response to detection of a moisture signal from a moisture sensor, the moisture signal indicating a presence of a fluid in at least a portion of an air conditioning system.

* * * * *